(12) United States Patent
Stauber et al.

(10) Patent No.: US 11,321,857 B2
(45) Date of Patent: May 3, 2022

(54) DISPLAYING AND EDITING IMAGES WITH DEPTH INFORMATION

(71) Applicant: Apple Inc., Cupertino, CA (US)

(72) Inventors: Matan Stauber, Tel Aviv (IL); Amir Hoffnung, Tel Aviv (IL); Matthaeus Krenn, San Francisco, CA (US); Jeffrey Traer Bernstein, San Francisco, CA (US); Joseph A. Malia, San Francisco, CA (US); Mark Hauenstein, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 230 days.

(21) Appl. No.: 16/528,257

(22) Filed: Jul. 31, 2019

(65) Prior Publication Data

US 2020/0105003 A1    Apr. 2, 2020

Related U.S. Application Data

(60) Provisional application No. 62/739,131, filed on Sep. 28, 2018.

(51) Int. Cl.
```
G09G 5/10       (2006.01)
G06T 7/50       (2017.01)
G06T 11/00      (2006.01)
```

(52) U.S. Cl.
CPC .............. *G06T 7/50* (2017.01); *G06T 11/001* (2013.01); *G09G 5/10* (2013.01); *G06T 2200/24* (2013.01);
(Continued)

(58) Field of Classification Search
CPC combination set(s) only.
See application file for complete search history.

(56) References Cited

U.S. PATENT DOCUMENTS

| 4,518,237 A | 5/1985 | Mizokami |
| 4,933,702 A | 6/1990 | Komatsuzaki et al. |

(Continued)

FOREIGN PATENT DOCUMENTS

| AU | 2013368443 B2 | 3/2016 |
| AU | 2017100683 B4 | 1/2018 |

(Continued)

OTHER PUBLICATIONS

Decision to Grant received for Japanese Patent Application No. 2018-243463, dated Aug. 17, 2020, 2 pages (1 page of English Translation and 1 page of Official Copy).

(Continued)

*Primary Examiner* — Wesner Sajous
(74) *Attorney, Agent, or Firm* — Dentons US LLP

(57) ABSTRACT

The present disclosure generally relates to displaying and editing image with depth information. Image data associated with an image includes depth information associated with a subject. In response to a request to display the image, a first modified image is displayed. Displaying the first modified image includes displaying, based on the depth information, a first level of simulated lighting on a first portion of the subject and a second level of simulated lighting on a second portion of the subject. After displaying the first modified image, a second modified image is displayed. Displaying the second modified image includes displaying, based on the depth information, a third level of simulated lighting on the first portion of the subject and a fourth level of simulated lighting on the second portion of the subject.

51 Claims, 38 Drawing Sheets

(52) U.S. Cl.
CPC ............. *G06T 2207/10028* (2013.01); *G09G 2320/0626* (2013.01)

(56) References Cited

U.S. PATENT DOCUMENTS

| | | | |
|---|---|---|---|
| 5,371,846 A | 12/1994 | Bates |
| 5,404,316 A | 4/1995 | Klingler et al. |
| 5,452,414 A | 9/1995 | Rosendahl et al. |
| 5,463,443 A | 10/1995 | Tanaka et al. |
| 5,533,110 A | 7/1996 | Pinard et al. |
| 5,557,358 A | 9/1996 | Mukai et al. |
| 5,615,384 A | 3/1997 | Allard et al. |
| 5,680,323 A | 10/1997 | Barnard |
| 5,680,619 A | 10/1997 | Gudmundson et al. |
| 5,808,662 A | 9/1998 | Kinney et al. |
| 5,825,353 A | 10/1998 | Will |
| 5,831,616 A | 11/1998 | Lee |
| 5,835,094 A | 11/1998 | Ermel et al. |
| 5,905,492 A | 5/1999 | Straub et al. |
| 5,929,857 A | 7/1999 | Dinallo et al. |
| 5,959,624 A | 9/1999 | Johnston et al. |
| 6,031,529 A | 2/2000 | Migos et al. |
| 6,061,695 A | 5/2000 | Slivka et al. |
| 6,081,817 A | 6/2000 | Taguchi |
| 6,091,411 A | 7/2000 | Straub et al. |
| 6,147,687 A | 11/2000 | Wanderski |
| 6,172,948 B1 | 1/2001 | Keller et al. |
| 6,205,112 B1 | 3/2001 | Weidner |
| 6,237,010 B1 | 5/2001 | Hui et al. |
| 6,262,724 B1 | 7/2001 | Crow et al. |
| 6,262,769 B1 | 7/2001 | Anderson et al. |
| 6,263,346 B1 | 7/2001 | Rodriquez |
| 6,268,864 B1 | 7/2001 | Chen et al. |
| 6,278,466 B1 | 8/2001 | Chen |
| 6,301,586 B1 | 10/2001 | Yang et al. |
| 6,356,971 B1 | 3/2002 | Katz et al. |
| 6,359,837 B1 | 3/2002 | Tsukamoto |
| 6,429,896 B1 | 8/2002 | Aruga et al. |
| 6,452,609 B1 | 9/2002 | Katinsky et al. |
| 6,522,347 B1 | 2/2003 | Tsuji et al. |
| 6,557,017 B1 | 4/2003 | Venable |
| 6,584,480 B1 | 6/2003 | Ferrel et al. |
| 6,621,524 B1 | 9/2003 | Iijima et al. |
| 6,677,981 B1 | 1/2004 | Mancuso et al. |
| 6,693,869 B1 | 2/2004 | Ballantyne |
| 6,784,925 B1 | 8/2004 | Tomat et al. |
| 6,809,724 B1 | 10/2004 | Shiraishi et al. |
| 6,809,759 B1 | 10/2004 | Chiang |
| 6,812,881 B1 | 11/2004 | Mullaly et al. |
| 6,819,867 B2 | 11/2004 | Mayer et al. |
| 6,900,840 B1 | 5/2005 | Schinner et al. |
| 6,970,859 B1 | 11/2005 | Brechner et al. |
| 7,370,016 B1 | 5/2008 | Hunter et al. |
| 7,403,643 B2 | 7/2008 | Tanculescu et al. |
| 7,463,304 B2 | 12/2008 | Murray |
| 7,515,178 B1 | 4/2009 | Fleischman et al. |
| 7,583,892 B2 | 9/2009 | Okumura |
| 8,185,839 B2 | 5/2012 | Jalon et al. |
| 8,189,087 B2 | 5/2012 | Misawa et al. |
| 8,203,640 B2 | 6/2012 | Kim et al. |
| 8,295,546 B2 | 10/2012 | Craig et al. |
| 8,405,680 B1 | 3/2013 | Cardoso Lopes et al. |
| 8,423,089 B2 | 4/2013 | Song et al. |
| 8,493,408 B2 | 7/2013 | Williamson et al. |
| 8,624,836 B1 | 1/2014 | Miller et al. |
| 8,638,371 B2 | 1/2014 | Laberge et al. |
| 8,675,084 B2 | 3/2014 | Bolton et al. |
| 8,723,988 B2 | 5/2014 | Thorn |
| 8,736,704 B2 | 5/2014 | Jasinski et al. |
| 8,736,716 B2 | 5/2014 | Prentice |
| 8,742,890 B2 | 6/2014 | Gocho |
| 8,762,895 B2 | 6/2014 | Mehta et al. |
| 8,817,158 B2 | 8/2014 | Saito |
| 8,839,111 B2 | 9/2014 | Geier et al. |
| 8,885,978 B2 | 11/2014 | Cote et al. |
| 8,896,652 B2 | 11/2014 | Ralston |
| 9,001,226 B1 | 4/2015 | Ng et al. |
| 9,094,576 B1 | 7/2015 | Karakotsios |
| 9,153,031 B2 | 10/2015 | El-Saban et al. |
| 9,172,866 B2 | 10/2015 | Ito et al. |
| 9,207,837 B2 | 12/2015 | Paretti et al. |
| 9,223,486 B2 | 12/2015 | Shin et al. |
| 9,230,241 B1 | 1/2016 | Singh et al. |
| 9,230,355 B1 | 1/2016 | Ahuja et al. |
| 9,245,177 B2 | 1/2016 | Perez |
| 9,246,961 B2 | 1/2016 | Walkin et al. |
| 9,250,797 B2 | 2/2016 | Roberts et al. |
| 9,264,660 B1 | 2/2016 | Petterson et al. |
| 9,288,476 B2 | 3/2016 | Sandrew et al. |
| 9,298,263 B2 | 3/2016 | Geisner et al. |
| 9,313,397 B2 | 4/2016 | Harris et al. |
| 9,313,401 B2 | 4/2016 | Frey et al. |
| 9,325,970 B2 | 4/2016 | Sakayori |
| 9,342,230 B2 | 5/2016 | Bastien et al. |
| 9,349,414 B1 | 5/2016 | Furment et al. |
| 9,360,671 B1 | 6/2016 | Zhou |
| 9,423,868 B2 | 8/2016 | Iwasaki |
| 9,448,708 B1 | 9/2016 | Bennett et al. |
| 9,451,144 B2 | 9/2016 | Dye et al. |
| 9,467,812 B2 | 10/2016 | Jung et al. |
| 9,544,563 B1 | 1/2017 | Chin |
| 9,592,428 B2 | 3/2017 | Binder |
| 9,602,559 B1 | 3/2017 | Barros et al. |
| 9,609,221 B2 | 3/2017 | Kim et al. |
| 9,628,416 B2 | 4/2017 | Henderson |
| 9,667,881 B2 | 5/2017 | Harris et al. |
| 9,686,497 B1 | 6/2017 | Terry |
| 9,704,250 B1 | 7/2017 | Shah et al. |
| 9,716,825 B1 | 7/2017 | Manzari et al. |
| 9,767,613 B1 | 9/2017 | Bedikian et al. |
| 9,819,912 B2 | 11/2017 | Maruta |
| 9,942,463 B2 | 4/2018 | Kuo |
| 9,948,589 B2 | 4/2018 | Gonnen et al. |
| 9,973,674 B2 | 5/2018 | Dye et al. |
| 10,021,294 B2 | 7/2018 | Kwon et al. |
| 10,055,887 B1 | 8/2018 | Gil et al. |
| 10,091,411 B2 | 10/2018 | Ha et al. |
| 10,095,385 B2 | 10/2018 | Walkin et al. |
| 10,152,222 B2 | 12/2018 | Ozawa et al. |
| 10,176,622 B1 | 1/2019 | Waggoner et al. |
| 10,187,587 B2 | 1/2019 | Hasinoff et al. |
| 10,225,463 B2 | 3/2019 | Yun et al. |
| 10,230,901 B2 | 3/2019 | Harris et al. |
| 10,270,983 B1 | 4/2019 | Van Os et al. |
| 10,289,265 B2 | 5/2019 | Kulkarni |
| 10,297,034 B2 | 5/2019 | Nash et al. |
| 10,304,231 B2 | 5/2019 | Saito |
| 10,313,652 B1 | 6/2019 | Falstrup et al. |
| 10,326,942 B2 | 6/2019 | Shabtay et al. |
| 10,375,313 B1 | 8/2019 | Van Os et al. |
| 10,379,719 B2 | 8/2019 | Scapel et al. |
| 10,397,469 B1 | 8/2019 | Yan et al. |
| 10,397,500 B1 | 8/2019 | Xu et al. |
| 10,447,908 B2 | 10/2019 | Lee et al. |
| 10,467,729 B1 | 11/2019 | Perera et al. |
| 10,467,775 B1 | 11/2019 | Waggoner et al. |
| 10,521,091 B2 | 12/2019 | Anzures et al. |
| 10,521,948 B2 | 12/2019 | Rickwald et al. |
| 10,523,879 B2 | 12/2019 | Dye et al. |
| 10,574,895 B2 | 2/2020 | Lee et al. |
| 10,585,551 B2 | 3/2020 | Lee et al. |
| 10,614,139 B2 | 4/2020 | Fujioka et al. |
| 10,645,294 B1 | 5/2020 | Manzari et al. |
| 10,652,470 B1 | 5/2020 | Manzari et al. |
| 10,657,695 B2 | 5/2020 | Chand et al. |
| 10,659,405 B1 | 5/2020 | Chang et al. |
| 10,674,072 B1 | 6/2020 | Manzari et al. |
| 10,681,282 B1 | 6/2020 | Manzari et al. |
| 10,698,575 B2 | 6/2020 | Walkin et al. |
| 10,798,035 B2 | 10/2020 | Lewis et al. |
| 10,845,968 B2 | 11/2020 | Scapel et al. |
| 10,902,661 B1 | 1/2021 | Mourkogiannis et al. |
| 10,958,850 B2 | 3/2021 | Kwak et al. |
| 11,039,074 B1 | 6/2021 | Manzari et al. |

(56) References Cited

U.S. PATENT DOCUMENTS

| | | |
|---|---|---|
| 11,212,449 B1 | 12/2021 | Manzari et al. |
| 2001/0005536 A1 | 6/2001 | Usami |
| 2002/0005907 A1 | 1/2002 | Alien |
| 2002/0070945 A1 | 6/2002 | Kage |
| 2002/0089540 A1 | 7/2002 | Geier et al. |
| 2002/0140803 A1 | 10/2002 | Gutta |
| 2002/0171737 A1 | 11/2002 | Tullis |
| 2003/0025802 A1 | 2/2003 | Mayer et al. |
| 2003/0043207 A1 | 3/2003 | Duarte |
| 2003/0107664 A1 | 6/2003 | Suzuki |
| 2003/0122930 A1 | 7/2003 | Schofield et al. |
| 2003/0174216 A1 | 9/2003 | Iguchi et al. |
| 2004/0041924 A1 | 3/2004 | White et al. |
| 2004/0061796 A1 | 4/2004 | Honda et al. |
| 2004/0090548 A1 | 5/2004 | Obrador |
| 2004/0095375 A1 | 5/2004 | Burmester et al. |
| 2004/0095473 A1 | 5/2004 | Park |
| 2004/0189861 A1 | 9/2004 | Tom |
| 2004/0201699 A1 | 10/2004 | Parulski et al. |
| 2005/0007382 A1 | 1/2005 | Schowtka |
| 2005/0134695 A1 | 6/2005 | Deshpande |
| 2005/0189419 A1 | 9/2005 | Igarashi et al. |
| 2005/0206981 A1 | 9/2005 | Hung |
| 2005/0237383 A1 | 10/2005 | Soga |
| 2005/0248660 A1 | 11/2005 | Stavely et al. |
| 2005/0270397 A1 | 12/2005 | Battles |
| 2006/0001650 A1 | 1/2006 | Robbins et al. |
| 2006/0026521 A1 | 2/2006 | Hotelling et al. |
| 2006/0033831 A1 | 2/2006 | Ejima et al. |
| 2006/0132482 A1 | 6/2006 | Oh et al. |
| 2006/0158730 A1 | 7/2006 | Kira |
| 2006/0187322 A1 | 8/2006 | Janson et al. |
| 2006/0188173 A1 | 8/2006 | Zhang et al. |
| 2006/0209067 A1 | 9/2006 | Pellacini et al. |
| 2006/0228040 A1 | 10/2006 | Simon et al. |
| 2006/0233192 A1 | 10/2006 | Mihara |
| 2006/0275025 A1 | 12/2006 | Labaziewicz et al. |
| 2007/0024614 A1 | 2/2007 | Tam et al. |
| 2007/0025711 A1 | 2/2007 | Marcus |
| 2007/0025714 A1 | 2/2007 | Shiraki |
| 2007/0025723 A1 | 2/2007 | Baudisch et al. |
| 2007/0031062 A1 | 2/2007 | Pal et al. |
| 2007/0040810 A1 | 2/2007 | Dowe et al. |
| 2007/0097088 A1 | 5/2007 | Battles |
| 2007/0109417 A1 | 5/2007 | Hyttfors et al. |
| 2007/0113099 A1 | 5/2007 | Takikawa et al. |
| 2007/0120979 A1 | 5/2007 | Zhang et al. |
| 2007/0140675 A1 | 6/2007 | Yanagi |
| 2007/0153112 A1 | 7/2007 | Ueda et al. |
| 2007/0165103 A1 | 7/2007 | Arima et al. |
| 2007/0174774 A1 | 7/2007 | Lerman et al. |
| 2007/0228259 A1 | 10/2007 | Hohenberger |
| 2007/0254640 A1 | 11/2007 | Bliss |
| 2007/0257992 A1 | 11/2007 | Kato |
| 2007/0273769 A1 | 11/2007 | Takahashi |
| 2007/0291152 A1 | 12/2007 | Suekane et al. |
| 2008/0030592 A1 | 2/2008 | Border et al. |
| 2008/0084484 A1 | 4/2008 | Ochi et al. |
| 2008/0106601 A1 | 5/2008 | Matsuda |
| 2008/0129759 A1 | 6/2008 | Jeon et al. |
| 2008/0129825 A1 | 6/2008 | Deangelis et al. |
| 2008/0143840 A1 | 6/2008 | Corkum et al. |
| 2008/0192020 A1 | 8/2008 | Kang et al. |
| 2008/0218611 A1 | 9/2008 | Parulski et al. |
| 2008/0222530 A1 | 9/2008 | Lakshmanan et al. |
| 2008/0222558 A1 | 9/2008 | Cho et al. |
| 2008/0260347 A1 | 10/2008 | Widdowson |
| 2008/0284855 A1 | 11/2008 | Umeyama et al. |
| 2008/0297587 A1 | 12/2008 | Kurtz et al. |
| 2008/0298571 A1 | 12/2008 | Kurtz et al. |
| 2008/0309811 A1 | 12/2008 | Fujinawa et al. |
| 2009/0021576 A1 | 1/2009 | Linder et al. |
| 2009/0021600 A1 | 1/2009 | Watanabe |
| 2009/0022422 A1 | 1/2009 | Sorek et al. |
| 2009/0027515 A1 | 1/2009 | Maruyama et al. |
| 2009/0027539 A1 | 1/2009 | Kunou |
| 2009/0040332 A1 | 2/2009 | Yoshino et al. |
| 2009/0046097 A1 | 2/2009 | Franklin |
| 2009/0051783 A1 | 2/2009 | Kim et al. |
| 2009/0066817 A1 | 3/2009 | Sakamaki |
| 2009/0073285 A1 | 3/2009 | Terashima |
| 2009/0102918 A1 | 4/2009 | Sakamoto et al. |
| 2009/0102933 A1 | 4/2009 | Harris et al. |
| 2009/0109316 A1 | 4/2009 | Matsui |
| 2009/0144639 A1 | 6/2009 | Nims et al. |
| 2009/0167671 A1 | 7/2009 | Kerofsky |
| 2009/0167672 A1 | 7/2009 | Kerofsky |
| 2009/0175511 A1 | 7/2009 | Lee et al. |
| 2009/0244318 A1 | 10/2009 | Makii |
| 2009/0251484 A1 | 10/2009 | Zhao et al. |
| 2009/0315671 A1 | 12/2009 | Gocho |
| 2009/0319887 A1 | 12/2009 | Waltman et al. |
| 2010/0020221 A1 | 1/2010 | Tupman et al. |
| 2010/0020222 A1 | 1/2010 | Jones et al. |
| 2010/0021141 A1 | 1/2010 | Yamashita et al. |
| 2010/0033615 A1 | 2/2010 | Mori |
| 2010/0039522 A1 | 2/2010 | Huang |
| 2010/0053342 A1 | 3/2010 | Hwang et al. |
| 2010/0066853 A1 | 3/2010 | Aoki et al. |
| 2010/0066889 A1 | 3/2010 | Ueda et al. |
| 2010/0066890 A1 | 3/2010 | Ueda et al. |
| 2010/0066895 A1 | 3/2010 | Ueda et al. |
| 2010/0093400 A1 | 4/2010 | Ju et al. |
| 2010/0097322 A1 | 4/2010 | Hu et al. |
| 2010/0123737 A1 | 5/2010 | Williamson et al. |
| 2010/0124941 A1 | 5/2010 | Cho |
| 2010/0153847 A1 | 6/2010 | Fama |
| 2010/0162160 A1 | 6/2010 | Stallings et al. |
| 2010/0164893 A1 | 7/2010 | Shin et al. |
| 2010/0171848 A1 | 7/2010 | Peters et al. |
| 2010/0188426 A1 | 7/2010 | Ohmori et al. |
| 2010/0194931 A1 | 8/2010 | Kawaguchi et al. |
| 2010/0208122 A1 | 8/2010 | Yumiki |
| 2010/0231735 A1 | 9/2010 | Burian et al. |
| 2010/0231777 A1 | 9/2010 | Shintani et al. |
| 2010/0232703 A1 | 9/2010 | Also |
| 2010/0232704 A1 | 9/2010 | Thorn |
| 2010/0238327 A1 | 9/2010 | Griffith et al. |
| 2010/0259645 A1 | 10/2010 | Kaplan et al. |
| 2010/0277470 A1 | 11/2010 | Margolis |
| 2010/0283743 A1 | 11/2010 | Coddington |
| 2010/0289825 A1 | 11/2010 | Shin et al. |
| 2010/0289910 A1 | 11/2010 | Kamshilin |
| 2010/0302280 A1 | 12/2010 | Szeliski et al. |
| 2010/0317410 A1 | 12/2010 | Song et al. |
| 2011/0008033 A1 | 1/2011 | Ichimiya |
| 2011/0013049 A1 | 1/2011 | Thorn |
| 2011/0016419 A1 | 1/2011 | Grosz et al. |
| 2011/0018970 A1 | 1/2011 | Wakabayashi |
| 2011/0019058 A1 | 1/2011 | Sakai et al. |
| 2011/0058052 A1 | 3/2011 | Bolton |
| 2011/0072394 A1 | 3/2011 | Victor |
| 2011/0074710 A1 | 3/2011 | Weeldreyer et al. |
| 2011/0074830 A1 | 3/2011 | Rapp et al. |
| 2011/0085016 A1 | 4/2011 | Kristiansen et al. |
| 2011/0109581 A1 | 5/2011 | Ozawa et al. |
| 2011/0115932 A1 | 5/2011 | Shin et al. |
| 2011/0138332 A1 | 6/2011 | Miyagawa |
| 2011/0157379 A1 | 6/2011 | Kimura |
| 2011/0167337 A1 | 7/2011 | Paley et al. |
| 2011/0176039 A1 | 7/2011 | Lo |
| 2011/0187879 A1 | 8/2011 | Ochiai |
| 2011/0191719 A1 | 8/2011 | Hinckley et al. |
| 2011/0199495 A1 | 8/2011 | Laberge et al. |
| 2011/0221755 A1 | 9/2011 | Geisner et al. |
| 2011/0234853 A1 | 9/2011 | Hayashi et al. |
| 2011/0242369 A1 | 10/2011 | Misawa et al. |
| 2011/0249073 A1 | 10/2011 | Cranfill et al. |
| 2011/0249078 A1 | 10/2011 | Abuan et al. |
| 2011/0296163 A1 | 12/2011 | Abernethy et al. |
| 2011/0304632 A1 | 12/2011 | Evertt et al. |
| 2012/0002898 A1 | 1/2012 | Côté et al. |
| 2012/0011456 A1 | 1/2012 | Noda et al. |
| 2012/0026378 A1 | 2/2012 | Pang et al. |

(56) References Cited

U.S. PATENT DOCUMENTS

| | | |
|---|---|---|
| 2012/0056997 A1 | 3/2012 | Jang |
| 2012/0057064 A1 | 3/2012 | Gardiner et al. |
| 2012/0069028 A1 | 3/2012 | Bouguerra |
| 2012/0069206 A1 | 3/2012 | Hsieh |
| 2012/0105579 A1 | 5/2012 | Jeon et al. |
| 2012/0120277 A1 | 5/2012 | Tsai |
| 2012/0127346 A1 | 5/2012 | Sato et al. |
| 2012/0133797 A1 | 5/2012 | Sato et al. |
| 2012/0162242 A1 | 6/2012 | Amano et al. |
| 2012/0169776 A1 | 7/2012 | Rissa et al. |
| 2012/0188394 A1 | 7/2012 | Park et al. |
| 2012/0194559 A1 | 8/2012 | Lim |
| 2012/0206452 A1 | 8/2012 | Geisner et al. |
| 2012/0206621 A1 | 8/2012 | Chen et al. |
| 2012/0235990 A1 | 9/2012 | Yamaji |
| 2012/0243802 A1 | 9/2012 | Fintel et al. |
| 2012/0249853 A1 | 10/2012 | Kroiczyk et al. |
| 2012/0274830 A1 | 11/2012 | Kameyama et al. |
| 2012/0293611 A1 | 11/2012 | Lee |
| 2012/0309520 A1 | 12/2012 | Evertt et al. |
| 2012/0320141 A1 | 12/2012 | Bowen et al. |
| 2013/0009858 A1 | 1/2013 | Lacey |
| 2013/0010170 A1 | 1/2013 | Matsuzawa et al. |
| 2013/0038546 A1 | 2/2013 | Mineo |
| 2013/0038771 A1 | 2/2013 | Brunner et al. |
| 2013/0055087 A1 | 2/2013 | Flint |
| 2013/0055119 A1 | 2/2013 | Luong |
| 2013/0057472 A1 | 3/2013 | Dizac et al. |
| 2013/0076908 A1 | 3/2013 | Bratton et al. |
| 2013/0083222 A1 | 4/2013 | Matsuzawa et al. |
| 2013/0088413 A1 | 4/2013 | Raffle et al. |
| 2013/0091298 A1 | 4/2013 | Ozzie et al. |
| 2013/0093904 A1 | 4/2013 | Wagner |
| 2013/0101164 A1 | 4/2013 | Leclerc et al. |
| 2013/0135315 A1 | 5/2013 | Bares et al. |
| 2013/0141362 A1 | 6/2013 | Asanuma |
| 2013/0141513 A1 | 6/2013 | Setton et al. |
| 2013/0147933 A1 | 6/2013 | Kulas et al. |
| 2013/0155308 A1 | 6/2013 | Wu et al. |
| 2013/0159900 A1 | 6/2013 | Pendharkar |
| 2013/0165186 A1 * | 6/2013 | Choi ............ G02B 30/25 455/566 |
| 2013/0179831 A1 | 7/2013 | Izaki |
| 2013/0194378 A1 | 8/2013 | Brown |
| 2013/0201104 A1 | 8/2013 | Ptucha et al. |
| 2013/0201307 A1 | 8/2013 | Schloter et al. |
| 2013/0208136 A1 | 8/2013 | Takatsuka et al. |
| 2013/0210563 A1 | 8/2013 | Hollinger |
| 2013/0222663 A1 | 8/2013 | Rydenhag et al. |
| 2013/0239057 A1 | 9/2013 | Ubillos et al. |
| 2013/0246948 A1 | 9/2013 | Chen et al. |
| 2013/0265311 A1 | 10/2013 | Na et al. |
| 2013/0265467 A1 | 10/2013 | Matsuzawa |
| 2013/0278576 A1 | 10/2013 | Lee et al. |
| 2013/0286251 A1 | 10/2013 | Wood et al. |
| 2013/0290905 A1 | 10/2013 | Luvogt et al. |
| 2013/0329074 A1 | 12/2013 | Zhang et al. |
| 2013/0346916 A1 | 12/2013 | Williamson et al. |
| 2014/0007021 A1 | 1/2014 | Akiyama |
| 2014/0009639 A1 | 1/2014 | Lee |
| 2014/0022399 A1 | 1/2014 | Rashid |
| 2014/0028872 A1 | 1/2014 | Lee et al. |
| 2014/0028885 A1 | 1/2014 | Ma et al. |
| 2014/0033043 A1 | 1/2014 | Kashima |
| 2014/0033100 A1 | 1/2014 | Noda et al. |
| 2014/0037178 A1 | 2/2014 | Park |
| 2014/0043368 A1 | 2/2014 | Yu |
| 2014/0043517 A1 | 2/2014 | Yim et al. |
| 2014/0047389 A1 | 2/2014 | Aarabi |
| 2014/0049536 A1 | 2/2014 | Neuman et al. |
| 2014/0055554 A1 | 2/2014 | Du et al. |
| 2014/0063175 A1 | 3/2014 | Jafry et al. |
| 2014/0063313 A1 | 3/2014 | Choi et al. |
| 2014/0071061 A1 | 3/2014 | Lin et al. |
| 2014/0071325 A1 | 3/2014 | Kawahara et al. |
| 2014/0078371 A1 | 3/2014 | Kinoshita |
| 2014/0092272 A1 | 4/2014 | Choi |
| 2014/0095122 A1 | 4/2014 | Appleman et al. |
| 2014/0099994 A1 | 4/2014 | Bishop et al. |
| 2014/0104449 A1 | 4/2014 | Masarik et al. |
| 2014/0108928 A1 | 4/2014 | Mumick |
| 2014/0118563 A1 | 5/2014 | Mehta et al. |
| 2014/0132735 A1 | 5/2014 | Lee et al. |
| 2014/0143678 A1 | 5/2014 | Mistry et al. |
| 2014/0152886 A1 | 6/2014 | Morgan-Mar et al. |
| 2014/0160231 A1 | 6/2014 | Middleton et al. |
| 2014/0160304 A1 | 6/2014 | Galor et al. |
| 2014/0176469 A1 | 6/2014 | Lim |
| 2014/0176565 A1 | 6/2014 | Adeyoola et al. |
| 2014/0184524 A1 | 7/2014 | Schiefer et al. |
| 2014/0192212 A1 | 7/2014 | He et al. |
| 2014/0192233 A1 | 7/2014 | Kakkori et al. |
| 2014/0204229 A1 | 7/2014 | Leung |
| 2014/0218371 A1 | 8/2014 | Du et al. |
| 2014/0218599 A1 | 8/2014 | Nakamura |
| 2014/0232838 A1 | 8/2014 | Jorgensen et al. |
| 2014/0240471 A1 | 8/2014 | Srinivasa et al. |
| 2014/0240531 A1 | 8/2014 | Nakai et al. |
| 2014/0240577 A1 | 8/2014 | Masugi |
| 2014/0267126 A1 | 9/2014 | Berg et al. |
| 2014/0267867 A1 | 9/2014 | Lee et al. |
| 2014/0282223 A1 | 9/2014 | Bastien et al. |
| 2014/0285698 A1 | 9/2014 | Geiss |
| 2014/0300635 A1 * | 10/2014 | Suzuki ............ G06T 11/00 345/633 |
| 2014/0300779 A1 | 10/2014 | Yeo et al. |
| 2014/0310598 A1 | 10/2014 | Sprague et al. |
| 2014/0327639 A1 | 11/2014 | Papakipos et al. |
| 2014/0333671 A1 | 11/2014 | Phang et al. |
| 2014/0333824 A1 | 11/2014 | Xiu |
| 2014/0351753 A1 | 11/2014 | Shin et al. |
| 2014/0359438 A1 | 12/2014 | Matsuki |
| 2014/0362091 A1 | 12/2014 | Bouaziz et al. |
| 2014/0362274 A1 | 12/2014 | Christie et al. |
| 2014/0368601 A1 * | 12/2014 | deCharms ............ H04L 67/26 348/14.02 |
| 2014/0368719 A1 | 12/2014 | Kaneko et al. |
| 2014/0372856 A1 | 12/2014 | Radakovitz et al. |
| 2015/0022674 A1 | 1/2015 | Blair et al. |
| 2015/0033192 A1 | 1/2015 | Bohannon et al. |
| 2015/0035825 A1 | 2/2015 | Zhou et al. |
| 2015/0042852 A1 | 2/2015 | Lee et al. |
| 2015/0043806 A1 | 2/2015 | Karsch et al. |
| 2015/0049233 A1 | 2/2015 | Choi |
| 2015/0058754 A1 | 2/2015 | Rauh |
| 2015/0067513 A1 | 3/2015 | Zambetti et al. |
| 2015/0070362 A1 | 3/2015 | Hirai |
| 2015/0078621 A1 | 3/2015 | Choi et al. |
| 2015/0078726 A1 | 3/2015 | Shakib et al. |
| 2015/0085174 A1 | 3/2015 | Shabtay et al. |
| 2015/0092077 A1 | 4/2015 | Feder et al. |
| 2015/0109417 A1 | 4/2015 | Zimheld |
| 2015/0116353 A1 | 4/2015 | Miura et al. |
| 2015/0116448 A1 | 4/2015 | Gottlieb |
| 2015/0135109 A1 | 5/2015 | Zambetti et al. |
| 2015/0135234 A1 | 5/2015 | Hall |
| 2015/0138079 A1 | 5/2015 | Lannsjo |
| 2015/0145950 A1 | 5/2015 | Murphy et al. |
| 2015/0146079 A1 | 5/2015 | Kim |
| 2015/0149927 A1 | 5/2015 | Walkin et al. |
| 2015/0150141 A1 | 5/2015 | Szymanski et al. |
| 2015/0154448 A1 | 6/2015 | Murayama et al. |
| 2015/0172534 A1 | 6/2015 | Miyakawa et al. |
| 2015/0181135 A1 | 6/2015 | Shimosato |
| 2015/0189138 A1 | 7/2015 | Xie et al. |
| 2015/0189162 A1 | 7/2015 | Kuo et al. |
| 2015/0194186 A1 | 7/2015 | Lee et al. |
| 2015/0208001 A1 | 7/2015 | Kaneko et al. |
| 2015/0212723 A1 | 7/2015 | Lim et al. |
| 2015/0220249 A1 | 8/2015 | Snibbe et al. |
| 2015/0248198 A1 | 9/2015 | Somlai-Fisher et al. |
| 2015/0248583 A1 | 9/2015 | Sugita et al. |
| 2015/0249775 A1 | 9/2015 | Jacumet |
| 2015/0249785 A1 | 9/2015 | Mehta et al. |

(56) References Cited

U.S. PATENT DOCUMENTS

| | | |
|---|---|---|
| 2015/0254855 A1 | 9/2015 | Patankar et al. |
| 2015/0256749 A1 | 9/2015 | Frey et al. |
| 2015/0264202 A1 | 9/2015 | Pawlowski |
| 2015/0271389 A1 | 9/2015 | Huang et al. |
| 2015/0277686 A1 | 10/2015 | Laforge et al. |
| 2015/0286724 A1 | 10/2015 | Knaapen et al. |
| 2015/0289104 A1 | 10/2015 | Jung et al. |
| 2015/0297185 A1 | 10/2015 | Mander et al. |
| 2015/0301731 A1 | 10/2015 | Okamoto et al. |
| 2015/0310583 A1 | 10/2015 | Hume et al. |
| 2015/0312182 A1 | 10/2015 | Langholz |
| 2015/0312184 A1 | 10/2015 | Langholz et al. |
| 2015/0312185 A1* | 10/2015 | Langholz ............... G06F 3/0482 348/14.03 |
| 2015/0334075 A1 | 11/2015 | Wang et al. |
| 2015/0334291 A1 | 11/2015 | Cho et al. |
| 2015/0341536 A1 | 11/2015 | Huang et al. |
| 2015/0350141 A1 | 12/2015 | Yang et al. |
| 2015/0350533 A1 | 12/2015 | Harris et al. |
| 2015/0350535 A1 | 12/2015 | Voss |
| 2015/0362998 A1 | 12/2015 | Park et al. |
| 2015/0370458 A1 | 12/2015 | Chen |
| 2016/0012567 A1 | 1/2016 | Siddiqui et al. |
| 2016/0026371 A1* | 1/2016 | Lu ....................... G06F 3/04886 715/765 |
| 2016/0044236 A1 | 2/2016 | Matsuzawa et al. |
| 2016/0048598 A1 | 2/2016 | Fujioka et al. |
| 2016/0048599 A1 | 2/2016 | Fujioka et al. |
| 2016/0048725 A1 | 2/2016 | Holz et al. |
| 2016/0048903 A1 | 2/2016 | Fujioka et al. |
| 2016/0050169 A1 | 2/2016 | Ben Atar et al. |
| 2016/0050351 A1 | 2/2016 | Lee et al. |
| 2016/0050446 A1 | 2/2016 | Fujioka et al. |
| 2016/0065832 A1 | 3/2016 | Kim et al. |
| 2016/0065861 A1 | 3/2016 | Steinberg et al. |
| 2016/0077725 A1 | 3/2016 | Maeda |
| 2016/0080639 A1 | 3/2016 | Choi et al. |
| 2016/0080657 A1 | 3/2016 | Chou et al. |
| 2016/0088280 A1 | 3/2016 | Sadi et al. |
| 2016/0092035 A1 | 3/2016 | Crocker et al. |
| 2016/0117829 A1 | 4/2016 | Yoon et al. |
| 2016/0127636 A1 | 5/2016 | Ito et al. |
| 2016/0132200 A1 | 5/2016 | Walkin et al. |
| 2016/0132201 A1 | 5/2016 | Shaw et al. |
| 2016/0142649 A1 | 5/2016 | Yim |
| 2016/0148384 A1 | 5/2016 | Bud et al. |
| 2016/0162039 A1 | 6/2016 | Eilat et al. |
| 2016/0163084 A1 | 6/2016 | Corazza et al. |
| 2016/0173869 A1 | 6/2016 | Wang et al. |
| 2016/0188181 A1 | 6/2016 | Smith |
| 2016/0212319 A1 | 7/2016 | Harris et al. |
| 2016/0217601 A1 | 7/2016 | Tsuda et al. |
| 2016/0219217 A1 | 7/2016 | Williams et al. |
| 2016/0225175 A1 | 8/2016 | Kim et al. |
| 2016/0226926 A1 | 8/2016 | Singh et al. |
| 2016/0227016 A1 | 8/2016 | Kim et al. |
| 2016/0241777 A1 | 8/2016 | Rav-acha et al. |
| 2016/0241793 A1 | 8/2016 | Ravirala et al. |
| 2016/0247309 A1 | 8/2016 | Li et al. |
| 2016/0255268 A1 | 9/2016 | Kang et al. |
| 2016/0259413 A1 | 9/2016 | Anzures |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0283097 A1 | 9/2016 | Voss |
| 2016/0284123 A1 | 9/2016 | Hare et al. |
| 2016/0307324 A1 | 10/2016 | Nakada et al. |
| 2016/0316147 A1 | 10/2016 | Bernstein et al. |
| 2016/0337570 A1 | 11/2016 | Tan et al. |
| 2016/0337582 A1 | 11/2016 | Shimauchi et al. |
| 2016/0353030 A1 | 12/2016 | Gao |
| 2016/0357353 A1 | 12/2016 | Miura et al. |
| 2016/0357387 A1 | 12/2016 | Penha et al. |
| 2016/0360097 A1 | 12/2016 | Penha et al. |
| 2016/0360116 A1 | 12/2016 | Penha et al. |
| 2016/0366323 A1 | 12/2016 | Chan |
| 2016/0366344 A1 | 12/2016 | Pan et al. |
| 2016/0370974 A1 | 12/2016 | Stenneth |
| 2016/0373631 A1 | 12/2016 | Kocienda et al. |
| 2016/0373650 A1 | 12/2016 | Kim et al. |
| 2017/0006210 A1 | 1/2017 | Dye et al. |
| 2017/0011773 A1 | 1/2017 | Lee |
| 2017/0013179 A1 | 1/2017 | Kang et al. |
| 2017/0018289 A1 | 1/2017 | Morgenstern |
| 2017/0019604 A1 | 1/2017 | Kim et al. |
| 2017/0024872 A1 | 1/2017 | Olsson et al. |
| 2017/0026565 A1 | 1/2017 | Hong et al. |
| 2017/0034449 A1 | 2/2017 | Eum et al. |
| 2017/0039686 A1 | 2/2017 | Miura et al. |
| 2017/0041549 A1 | 2/2017 | Kim et al. |
| 2017/0041677 A1 | 2/2017 | Anderson et al. |
| 2017/0046065 A1 | 2/2017 | Zeng et al. |
| 2017/0048450 A1 | 2/2017 | Lee et al. |
| 2017/0048461 A1 | 2/2017 | Lee et al. |
| 2017/0048494 A1 | 2/2017 | Boyle et al. |
| 2017/0054960 A1 | 2/2017 | Chien et al. |
| 2017/0061635 A1 | 3/2017 | Oberheu et al. |
| 2017/0094019 A1 | 3/2017 | Ahmed et al. |
| 2017/0109912 A1 | 4/2017 | Lee et al. |
| 2017/0111616 A1 | 4/2017 | Li et al. |
| 2617/6111567 | 4/2017 | Piia |
| 2017/0178287 A1 | 6/2017 | Anderson |
| 2017/0186162 A1 | 6/2017 | Mihic et al. |
| 2017/0220212 A1 | 8/2017 | Yang et al. |
| 2017/0230576 A1 | 8/2017 | Sparks et al. |
| 2017/0230585 A1 | 8/2017 | Nash et al. |
| 2017/0237888 A1 | 8/2017 | Harris et al. |
| 2017/0243389 A1 | 8/2017 | Wild et al. |
| 2017/0244896 A1 | 8/2017 | Chien et al. |
| 2017/0244897 A1 | 8/2017 | Jung et al. |
| 2017/0257559 A1 | 9/2017 | Stricker |
| 2017/0257596 A1 | 9/2017 | Murata et al. |
| 2017/0264817 A1 | 9/2017 | Yan et al. |
| 2017/0272654 A1 | 9/2017 | Poindexter, Jr. |
| 2017/0285764 A1 | 10/2017 | Kim et al. |
| 2017/0287220 A1 | 10/2017 | Khalid et al. |
| 2017/0302840 A1 | 10/2017 | Hasinoff et al. |
| 2017/0315772 A1 | 11/2017 | Lee et al. |
| 2017/0324784 A1 | 11/2017 | Taine et al. |
| 2017/0336926 A1 | 11/2017 | Chaudhri et al. |
| 2017/0336928 A1 | 11/2017 | Chaudhri |
| 2017/0336961 A1 | 11/2017 | Heo et al. |
| 2017/0352379 A1 | 12/2017 | Oh et al. |
| 2017/0354888 A1 | 12/2017 | Benedetto et al. |
| 2017/0358071 A1 | 12/2017 | Yamaoka et al. |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2017/0366729 A1 | 12/2017 | Itoh |
| 2018/0007315 A1 | 1/2018 | Kim et al. |
| 2018/0021684 A1 | 1/2018 | Benedetto |
| 2018/0035031 A1 | 2/2018 | Kwak et al. |
| 2018/0047200 A1 | 2/2018 | O'hara et al. |
| 2018/0077332 A1 | 3/2018 | Shimura et al. |
| 2018/0091728 A1 | 3/2018 | Brown et al. |
| 2018/0091732 A1 | 3/2018 | Wilson et al. |
| 2018/0095649 A1 | 4/2018 | Valdivia et al. |
| 2018/0096487 A1 | 4/2018 | Nash et al. |
| 2018/0109722 A1* | 4/2018 | Laroia ................... H04N 5/772 |
| 2018/0113577 A1 | 4/2018 | Burns et al. |
| 2018/0114543 A1 | 4/2018 | Novikoff |
| 2018/0120661 A1 | 5/2018 | Kilgore et al. |
| 2018/0124299 A1 | 5/2018 | Brook |
| 2018/0129224 A1 | 5/2018 | Hur |
| 2018/0131876 A1 | 5/2018 | Bernstein et al. |
| 2018/0131878 A1 | 5/2018 | Charlton et al. |
| 2018/0146132 A1 | 5/2018 | Manzari |
| 2018/0152611 A1 | 5/2018 | Li et al. |
| 2018/0184061 A1 | 6/2018 | Kitsunai et al. |

(56) References Cited

U.S. PATENT DOCUMENTS

| | | |
|---|---|---|
| 2018/0191944 A1 | 7/2018 | Carbonell et al. |
| 2018/0198985 A1 | 7/2018 | Ishitsuka |
| 2018/0199025 A1 | 7/2018 | Holzer et al. |
| 2018/0227479 A1 | 8/2018 | Parameswaran et al. |
| 2018/0227482 A1 | 8/2018 | Holzer et al. |
| 2018/0227505 A1 | 8/2018 | Baltz et al. |
| 2018/0234608 A1 | 8/2018 | Sudo et al. |
| 2018/0262677 A1 | 9/2018 | Dye et al. |
| 2018/0267703 A1 | 9/2018 | Kamimaru |
| 2018/0270420 A1 | 9/2018 | Lee et al. |
| 2018/0278823 A1 | 9/2018 | Horesh |
| 2018/0284979 A1 | 10/2018 | Choi et al. |
| 2018/0288310 A1 | 10/2018 | Goldenberg |
| 2018/0302551 A1 | 10/2018 | Yamajo et al. |
| 2018/0302568 A1 | 10/2018 | Kim et al. |
| 2018/0308282 A1 | 10/2018 | Yokoi |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |
| 2018/0349008 A1 | 12/2018 | Manzari |
| 2018/0352165 A1 | 12/2018 | Zhen et al. |
| 2018/0376122 A1 | 12/2018 | Park et al. |
| 2019/0007589 A1 | 1/2019 | Kadambala et al. |
| 2019/0028650 A1 | 1/2019 | Bernstein et al. |
| 2019/0029513 A1 | 1/2019 | Gunnerson et al. |
| 2019/0051032 A1 | 2/2019 | Chu et al. |
| 2019/0082097 A1 | 3/2019 | Manzari et al. |
| 2019/0089873 A1 | 3/2019 | Misawa et al. |
| 2019/0114740 A1 | 4/2019 | Ogino et al. |
| 2019/0121216 A1 | 4/2019 | Shabtay et al. |
| 2019/0138259 A1 | 5/2019 | Bagaria et al. |
| 2019/0149706 A1 | 5/2019 | Rivard et al. |
| 2019/0174054 A1 | 6/2019 | Srivastava et al. |
| 2019/0199926 A1 | 6/2019 | An et al. |
| 2019/0205861 A1 | 7/2019 | Bace |
| 2019/0206031 A1 | 7/2019 | Kim et al. |
| 2019/0222769 A1 | 7/2019 | Srivastava et al. |
| 2019/0235743 A1 | 8/2019 | Ono |
| 2019/0250812 A1 | 8/2019 | Davydov et al. |
| 2019/0253619 A1 | 8/2019 | Davydov et al. |
| 2019/0289201 A1 | 9/2019 | Nishimura et al. |
| 2019/0318538 A1 | 10/2019 | Li et al. |
| 2019/0342507 A1 | 11/2019 | Dye et al. |
| 2019/0379821 A1 | 12/2019 | Kobayashi et al. |
| 2019/0379837 A1 | 12/2019 | Kim et al. |
| 2020/0045245 A1 | 2/2020 | Van Os et al. |
| 2020/0053288 A1 | 2/2020 | Kim et al. |
| 2020/0059605 A1 | 2/2020 | Liu et al. |
| 2020/0068121 A1 | 2/2020 | Wang |
| 2020/0082599 A1 | 3/2020 | Manzari |
| 2020/0106952 A1 | 4/2020 | Missig et al. |
| 2020/0128191 A1 | 4/2020 | Sun et al. |
| 2020/0142577 A1 | 5/2020 | Manzari et al. |
| 2020/0204725 A1 | 6/2020 | Li |
| 2020/0221020 A1 | 7/2020 | Manzari et al. |
| 2020/0234508 A1 | 7/2020 | Shaburov et al. |
| 2020/0236278 A1 | 7/2020 | Yeung et al. |
| 2020/0244879 A1 | 7/2020 | Hohjoh |
| 2020/0285806 A1 | 9/2020 | Radakovitz et al. |
| 2020/0285851 A1 | 9/2020 | Lin et al. |
| 2020/0336660 A1 | 10/2020 | Dong et al. |
| 2020/0336674 A1 | 10/2020 | Bernstein et al. |
| 2020/0358963 A1 | 11/2020 | Manzari et al. |
| 2020/0380768 A1 | 12/2020 | Harris et al. |
| 2020/0380781 A1 | 12/2020 | Barlier et al. |
| 2020/0410763 A1 | 12/2020 | Hare et al. |
| 2020/0412975 A1 | 12/2020 | Al Majid et al. |
| 2021/0005003 A1 | 1/2021 | Chong et al. |
| 2021/0058351 A1 | 2/2021 | Viklund et al. |
| 2021/0065448 A1 | 3/2021 | Goodrich et al. |
| 2021/0065454 A1 | 3/2021 | Goodrich et al. |
| 2021/0096703 A1 | 4/2021 | Anzures et al. |
| 2021/0099568 A1 | 4/2021 | DePue et al. |
| 2021/0099761 A1 | 4/2021 | Zhang |
| 2021/0146838 A1 | 5/2021 | Goseberg et al. |
| 2021/0152505 A1 | 5/2021 | Baldwin et al. |
| 2021/0168108 A1 | 6/2021 | Antmen et al. |
| 2021/0195093 A1 | 6/2021 | Manzari et al. |
| 2021/0264656 A1 | 8/2021 | Barlier et al. |
| 2021/0318798 A1 | 10/2021 | Manzari et al. |
| 2021/0373750 A1 | 12/2021 | Manzari et al. |
| 2021/0397338 A1 | 12/2021 | Davydov et al. |

FOREIGN PATENT DOCUMENTS

| | | |
|---|---|---|
| AU | 2015297035 B2 | 6/2018 |
| CA | 2729392 A1 | 8/2011 |
| CA | 2965700 A1 | 5/2016 |
| CA | 2729392 C | 5/2017 |
| CN | 1437365 A | 8/2003 |
| CN | 1705346 A | 12/2005 |
| CN | 101068311 A | 11/2007 |
| CN | 101243383 A | 8/2008 |
| CN | 101282422 A | 10/2008 |
| CN | 101310519 A | 11/2008 |
| CN | 101364031 A | 2/2009 |
| CN | 101388965 A | 3/2009 |
| CN | 101427574 A | 5/2009 |
| CN | 101576996 A | 11/2009 |
| CN | 101778220 A | 7/2010 |
| CN | 101883213 A | 11/2010 |
| CN | 102075727 A | 5/2011 |
| CN | 102084327 A | 6/2011 |
| CN | 102088554 A | 6/2011 |
| CN | 102272700 A | 12/2011 |
| CN | 102428655 A | 4/2012 |
| CN | 102457661 A | 5/2012 |
| CN | 102474560 A | 5/2012 |
| CN | 102567953 A | 7/2012 |
| CN | 202309894 U | 7/2012 |
| CN | 202330968 U | 7/2012 |
| CN | 103051837 A | 4/2013 |
| CN | 103051841 A | 4/2013 |
| CN | 103297719 A | 9/2013 |
| CN | 103309602 A | 9/2013 |
| CN | 103324329 A | 9/2013 |
| CN | 103491298 A | 1/2014 |
| CN | 103685925 A | 3/2014 |
| CN | 103702039 A | 4/2014 |
| CN | 103777742 A | 5/2014 |
| CN | 103916582 A | 7/2014 |
| CN | 103947190 A | 7/2014 |
| CN | 103970472 A | 8/2014 |
| CN | 104270597 A | 1/2015 |
| CN | 104346080 A | 2/2015 |
| CN | 104423946 A | 3/2015 |
| CN | 104461288 A | 3/2015 |
| CN | 104754203 A | 7/2015 |
| CN | 104813322 A | 7/2015 |
| CN | 104836947 A | 8/2015 |
| CN | 104952063 A | 9/2015 |
| CN | 105138259 A | 12/2015 |
| CN | 105190511 A | 12/2015 |
| CN | 105229571 A | 1/2016 |
| CN | 105474163 A | 4/2016 |
| CN | 105493138 A | 4/2016 |
| CN | 105589637 A | 5/2016 |
| CN | 105611215 A | 5/2016 |
| CN | 105620393 A | 6/2016 |
| CN | 105630290 A | 6/2016 |
| CN | 105653031 A | 6/2016 |
| CN | 105765967 A | 7/2016 |
| CN | 105981372 A | 9/2016 |
| CN | 105991915 A | 10/2016 |
| CN | 106067947 A | 11/2016 |
| CN | 106161956 A | 11/2016 |
| CN | 106210184 A | 12/2016 |
| CN | 106210550 A | 12/2016 |
| CN | 106257909 A | 12/2016 |
| CN | 106303280 A | 1/2017 |
| CN | 106303690 A | 1/2017 |
| CN | 106341611 A | 1/2017 |
| CN | 106375662 A | 2/2017 |

(56) References Cited

FOREIGN PATENT DOCUMENTS

| | | |
|---|---|---|
| CN | 106412214 A | 2/2017 |
| CN | 106412412 A | 2/2017 |
| CN | 106412445 A | 2/2017 |
| CN | 106445219 A | 2/2017 |
| CN | 106791377 A | 5/2017 |
| CN | 106921829 A | 7/2017 |
| CN | 107077274 A | 8/2017 |
| CN | 107079141 A | 8/2017 |
| CN | 107533356 A | 1/2018 |
| CN | 107566721 A | 1/2018 |
| CN | 107580693 A | 1/2018 |
| CN | 107770448 A | 3/2018 |
| CN | 107800945 A | 3/2018 |
| CN | 107820011 A | 3/2018 |
| CN | 107924113 A | 4/2018 |
| CN | 108353126 A | 7/2018 |
| CN | 108391053 A | 8/2018 |
| CN | 108513070 A | 9/2018 |
| CN | 108668083 A | 10/2018 |
| CN | 108848308 A | 11/2018 |
| CN | 108886569 A | 11/2018 |
| CN | 109005366 A | 12/2018 |
| CN | 109061985 A | 12/2018 |
| CN | 109496425 A | 3/2019 |
| CN | 109639970 A | 4/2019 |
| CN | 109644229 A | 4/2019 |
| DK | 201670753 A1 | 1/2018 |
| DK | 201670755 A1 | 1/2018 |
| DK | 201670627 A1 | 2/2018 |
| EP | 0651543 A2 | 5/1995 |
| EP | 0651543 A3 | 12/1997 |
| EP | 1278099 A1 | 1/2003 |
| EP | 1592212 A1 | 11/2005 |
| EP | 1953663 A1 | 8/2008 |
| EP | 0651543 B1 | 9/2008 |
| EP | 1981262 A1 | 10/2008 |
| EP | 2194508 A1 | 6/2010 |
| EP | 2430766 A2 | 3/2012 |
| EP | 2454872 A1 | 5/2012 |
| EP | 2482179 A2 | 8/2012 |
| EP | 2487613 A1 | 8/2012 |
| EP | 2487913 A2 | 8/2012 |
| EP | 2430766 A4 | 12/2012 |
| EP | 2579572 A1 | 4/2013 |
| EP | 2627073 A1 | 8/2013 |
| EP | 2640060 A1 | 9/2013 |
| EP | 2682855 A2 | 1/2014 |
| EP | 2950198 A1 | 12/2015 |
| EP | 2966855 A2 | 1/2016 |
| EP | 2972677 A1 | 1/2016 |
| EP | 2430766 B1 | 3/2016 |
| EP | 3008575 A1 | 4/2016 |
| EP | 3012732 A1 | 4/2016 |
| EP | 3026636 A1 | 6/2016 |
| EP | 3033837 A1 | 6/2016 |
| EP | 3051525 A1 | 8/2016 |
| EP | 3107065 A1 | 12/2016 |
| EP | 3033837 A4 | 3/2017 |
| EP | 3209012 A1 | 8/2017 |
| EP | 3211587 A1 | 8/2017 |
| EP | 2194508 B1 | 12/2017 |
| EP | 3333544 A1 | 6/2018 |
| EP | 2556665 B1 | 8/2018 |
| EP | 3033837 B1 | 10/2018 |
| EP | 3393119 A1 | 10/2018 |
| EP | 3135028 B1 | 1/2019 |
| EP | 3457680 A1 | 3/2019 |
| EP | 3008575 B1 | 7/2019 |
| EP | 3633975 A1 | 4/2020 |
| GB | 2515797 A | 1/2015 |
| GB | 2519363 A | 4/2015 |
| GB | 2523670 A | 9/2015 |
| JP | 2-179078 A | 7/1990 |
| JP | 9-116792 A | 5/1997 |
| JP | 11-355617 A | 12/1999 |
| JP | 2000-207549 A | 7/2000 |
| JP | 2000-244905 A | 9/2000 |
| JP | 2001-298649 A | 10/2001 |
| JP | 2003-8964 A | 1/2003 |
| JP | 2003-18438 A | 1/2003 |
| JP | 2003-32597 A | 1/2003 |
| JP | 2003-241293 A | 8/2003 |
| JP | 2004-15595 A | 1/2004 |
| JP | 2004-135074 A | 4/2004 |
| JP | 2005-31466 A | 2/2005 |
| JP | 2005-191641 A | 7/2005 |
| JP | 3872041 B2 | 1/2007 |
| JP | 2007-28211 A | 2/2007 |
| JP | 2007-124398 A | 5/2007 |
| JP | 2008-66978 A | 3/2008 |
| JP | 2008-104069 A | 5/2008 |
| JP | 2008-236534 A | 10/2008 |
| JP | 2009-105919 A | 5/2009 |
| JP | 2009-212899 A | 9/2009 |
| JP | 2009-545256 A | 12/2009 |
| JP | 2010-119147 A | 5/2010 |
| JP | 2010-160581 A | 7/2010 |
| JP | 2010-182023 A | 8/2010 |
| JP | 2010-268052 A | 11/2010 |
| JP | 2011-87167 A | 4/2011 |
| JP | 2011-91570 A | 5/2011 |
| JP | 2011-124864 A | 6/2011 |
| JP | 2011-211552 A | 10/2011 |
| JP | 2012-79302 A | 4/2012 |
| JP | 2012-89973 A | 5/2012 |
| JP | 2012-124608 A | 6/2012 |
| JP | 2012-147379 A | 8/2012 |
| JP | 2013-70303 A | 4/2013 |
| JP | 2013-106289 A | 5/2013 |
| JP | 2013-546238 A | 12/2013 |
| JP | 2014-23083 A | 2/2014 |
| JP | 2014-60501 A | 4/2014 |
| JP | 2014-212415 A | 11/2014 |
| JP | 2015-1716 A | 1/2015 |
| JP | 2015-5255 A | 1/2015 |
| JP | 2015-22716 A | 2/2015 |
| JP | 2015-50713 A | 3/2015 |
| JP | 2015-76717 A | 4/2015 |
| JP | 2015-146619 A | 8/2015 |
| JP | 2015-149095 A | 8/2015 |
| JP | 2015-180987 A | 10/2015 |
| JP | 2015-201839 | 11/2015 |
| JP | 2016-66978 A | 4/2016 |
| JP | 2016-72965 A | 5/2016 |
| JP | 2016-129315 A | 7/2016 |
| JP | 2017-34474 A | 2/2017 |
| JP | 2019-62556 A | 4/2019 |
| JP | 2019-145108 A | 8/2019 |
| KR | 10-2012-0004928 A | 1/2012 |
| KR | 10-2012-0025872 A | 3/2012 |
| KR | 10-2012-0048397 A | 5/2012 |
| KR | 10-2012-0057696 A | 6/2012 |
| KR | 10-2012-0093322 A | 8/2012 |
| KR | 10-2013-0033445 A | 4/2013 |
| KR | 10-1341095 B1 | 12/2013 |
| KR | 10-1343591 B1 | 12/2013 |
| KR | 10-2014-0049850 A | 4/2014 |
| KR | 10-2014-0062801 A | 5/2014 |
| KR | 10-2015-0014290 A | 2/2015 |
| KR | 10-2015-0024899 A | 3/2015 |
| KR | 10-2016-0016910 A | 2/2016 |
| KR | 10-2016-0019145 A | 2/2016 |
| KR | 10-2016-0020791 A | 2/2016 |
| KR | 10-2016-0075583 A | 6/2016 |
| KR | 10-1674959 B1 | 11/2016 |
| KR | 10-2017-0123125 A | 11/2017 |
| KR | 10-2017-0135575 A | 12/2017 |
| KR | 10-2018-0017227 A | 2/2018 |
| KR | 10-2018-0037076 A | 4/2018 |
| KR | 10-2018-0095331 A | 8/2018 |
| KR | 10-2018-0108847 A | 10/2018 |
| KR | 10-2018-0137610 A | 12/2018 |
| KR | 10-2019-0034248 A | 4/2019 |
| WO | 1999/39307 A1 | 8/1999 |

(56) References Cited

FOREIGN PATENT DOCUMENTS

| | | |
|---|---|---|
| WO | 2000/63766 A1 | 10/2000 |
| WO | 2005/043892 A1 | 5/2005 |
| WO | 2007/126707 A1 | 11/2007 |
| WO | 2008/014301 A2 | 1/2008 |
| WO | 2008/025120 A1 | 3/2008 |
| WO | 2009/076974 A1 | 6/2009 |
| WO | 2010/059426 A2 | 5/2010 |
| WO | 2010/077048 A2 | 7/2010 |
| WO | 2010/102678 A1 | 9/2010 |
| WO | 2010/077048 A3 | 10/2010 |
| WO | 2010/131869 A2 | 11/2010 |
| WO | 2010/134275 A1 | 11/2010 |
| WO | 2011/007264 A1 | 1/2011 |
| WO | 2010/131869 A3 | 2/2011 |
| WO | 2010/059426 A3 | 5/2011 |
| WO | 2012/001947 A1 | 1/2012 |
| WO | 2012/006251 A1 | 1/2012 |
| WO | 2012/051720 A2 | 4/2012 |
| WO | 2013/082325 A1 | 6/2013 |
| WO | 2013/152453 A1 | 10/2013 |
| WO | 2013/152454 A1 | 10/2013 |
| WO | 2013/189058 A1 | 12/2013 |
| WO | 2014/066115 A1 | 5/2014 |
| WO | 2014/105276 A1 | 7/2014 |
| WO | 2014/159779 A1 | 10/2014 |
| WO | 2014/160819 A1 | 10/2014 |
| WO | 2014/165141 A1 | 10/2014 |
| WO | 2014/200734 A1 | 12/2014 |
| WO | 2014/200798 A1 | 12/2014 |
| WO | 2015/023044 A1 | 2/2015 |
| WO | 2015/037211 A1 | 3/2015 |
| WO | 2015/080744 A1 | 6/2015 |
| WO | 2015/085042 A1 | 6/2015 |
| WO | 2015/112868 A1 | 7/2015 |
| WO | 2014/200798 A8 | 8/2015 |
| WO | 2015/144209 A1 | 10/2015 |
| WO | 2015/166684 A1 | 11/2015 |
| WO | 2015/183438 A1 | 12/2015 |
| WO | 2015/187494 A1 | 12/2015 |
| WO | 2015/190666 A1 | 12/2015 |
| WO | 2016/028806 A1 | 2/2016 |
| WO | 2016/028807 A1 | 2/2016 |
| WO | 2016/028808 A1 | 2/2016 |
| WO | 2016/028809 A1 | 2/2016 |
| WO | 2016/064435 A1 | 4/2016 |
| WO | 2016/073804 A2 | 5/2016 |
| WO | 2016/073804 A3 | 7/2016 |
| WO | 2016/145129 A1 | 9/2016 |
| WO | 2016/172619 A1 | 10/2016 |
| WO | 2016/204936 A1 | 12/2016 |
| WO | 2017/058834 A1 | 4/2017 |
| WO | 2017/153771 A1 | 9/2017 |
| WO | 2017/201326 A1 | 11/2017 |
| WO | 2017/218193 A1 | 12/2017 |
| WO | 2018/006053 A1 | 1/2018 |
| WO | 2018/048838 A1 | 3/2018 |
| WO | 2018/049430 A2 | 3/2018 |
| WO | 2018/057268 A1 | 3/2018 |
| WO | 2018/099037 A1 | 6/2018 |
| WO | 2018/159864 A1 | 9/2018 |
| WO | 2018/212802 A1 | 11/2018 |

OTHER PUBLICATIONS

International Preliminary Report on Patentability received for PCT Patent Application No. PCT/US2019/017363, dated Aug. 20, 2020, 9 pages.
Office Action received for Australian Patent Application No. 2020101043, dated Aug. 14, 2020, 5 pages.
Office Action received for Chinese Patent Application No. 201911219525.3, dated Jul. 10, 2020, 7 pages (1 page of English Translation and 6 pages of Official Copy).
Office Action received for Danish Patent Application No. PA201970601, dated Aug. 13, 2020, 3 pages.
Office Action received for Japanese Patent Application No. 2018-182607, dated Jul. 20, 2020, 5 pages (2 pages of English Translation and 3 pages of Official Copy).
Applicant-Initiated Interview Summary received for U.S. Appl. No. 15/995,040, dated Nov. 24, 2020, 4 pages.
Applicant-Initiated Interview Summary received for U.S. Appl. No. 16/144,629, dated Nov. 23, 2020, 3 pages.
Certificate of Examination received for Australian Patent Application No. 2020100720, dated Nov. 11, 2020, 2 pages.
International Preliminary Report on Patentability received for PCT Patent Application No. PCT/US2019/024067, dated Nov. 19, 2020, 12 pages.
International Search Report and Written Opinion received for PCT Patent Application No. PCT/US2020/031643, dated Nov. 2, 2020, 34 pages.
Notice of Allowance received for Korean Patent Application No. 10-2020-0143726, dated Nov. 10, 2020, 5 pages (2 pages of English Translation and 3 pages of Official Copy).
Office Action received for Australian Patent Application No. 2020101043, dated Oct. 30, 2020, 4 pages.
Office Action received for Danish Patent Application No. PA201770719, dated Nov. 16, 2020, 5 pages.
Office Action received for Danish Patent Application No. PA201970603, dated Nov. 4, 2020, 3 pages.
Result of Consultation received for European Patent Application No. 19204230.7, dated Nov. 16, 2020, 3 pages.
Clover Juli, "Moment Pro Camera App for iOS Gains Zebra Striping for Displaying Over and Underexposed Areas", Online Available at: https://web.archive.org/web/20190502081353/https://www.macrumors.com/2019/05/01/momentcamera-app-zebra-striping-and-more/, May 1, 2019, 8 pages.
Decision to Refuse received for European Patent Application No. 19724959.2, dated Jun. 22, 2021, 13 pages.
IMAGESPACETV, "Olympus OM-D E-M1 Mark II—Highlights & Shadows with Gavin Hoey", Online available at: https://www.youtube.com/watch?v=goEhh1n--hQ, Aug. 3, 2018, 3 pages.
Intention to Grant received for European Patent Application No. 17809168.2, dated Jun. 25, 2021, 8 pages.
Office Action received for Australian Patent Application No. 2020239717, dated Jun. 23, 2021, 7 pages.
Office Action received for Australian Patent Application No. 2020260413, dated Jun. 24, 2021, 2 pages.
Office Action received for Danish Patent Application No. PA201770719, dated Jun. 30, 2021, 3 pages.
"Procamera Capture the Moment", Online Available at: http://www.procamera-app.com/procamera_manual/ProCamera_Manual_EN.pdf, Apr. 21, 2016, 63 pages.
Final Office Action received for U.S. Appl. No. 15/995,040, dated Oct. 17, 2019, 20 pages.
International Search Report and Written Opinion received for PCT Patent Application No. PCT/US2019/024067, dated Oct. 9, 2019, 18 pages.
Notice of Allowance received for Brazilian Patent Application No. 112018074765-3, dated Oct. 8, 2019, 2 pages (1 page of English Translation and 1 page of Official Copy).
Notice of Allowance received for U.S. Appl. No. 16/191,117, dated Oct. 29, 2019, 9 pages.
Office Action received for Australian Patent Application No. 2019100794, dated Oct. 3, 2019, 4 pages.
Office Action received for Chinese Patent Application No. 201710657424.9, dated Sep. 17, 2019, 23 pages (11 pages of English Translation and 12 pages of Official Copy).
Corrected Notice of Allowance received for U.S. Appl. No. 16/143,396, dated Jan. 30, 2020, 2 pages.
Office Action received for Danish Patent Application No. PA201770563, dated Jan. 28, 2020, 3 pages.
Notice of Allowance received for Chinese Patent Application No. 201811512767.7, dated Jul. 27, 2020, 4 pages (1 page of English Translation and 3 pages of Official Copy).
Office Action received for Danish Patent Application No. PA201870368, dated Oct. 1, 2019, 6 pages.
Summons to Attend Oral Proceedings received for European Patent Application No. 17184710.6, mailed on Sep. 17, 2019, 7 pages.

(56) References Cited

OTHER PUBLICATIONS

Certificate of Examination received for Australian Patent Application No. 2020100189, dated May 12, 2020, 2 pages.
Notice of Allowance received for Chinese Patent Application No. 201710657424.9, dated May 8, 2020, 2 pages (1 page of English Translation and 1 page of Official Copy).
Office Action received for Chinese Patent Application No. 201811446867.4, dated May 6, 2020, 10 pages (5 pages of English Translation and 5 pages of Official Copy).
Office Action received for Korean Patent Application No. 10-2019-7027042, dated May 13, 2020, 6 pages (2 pages of English Translation and 4 pages of Official Copy).
Decision to Grant received for Danish Patent Application No. PA201970603, dated May 21, 2021, 2 pages.
Invitation to Pay Search Fees received for European Patent Application No. 18704732.9, mailed on Jun. 2, 2021, 3 pages.
Notice of Allowance received for U.S. Appl. No. 16/835,651, dated Jun. 1, 2021, 10 pages.
Office Action received for Chinese Patent Application No. 202010600151.6, dated Apr. 29, 2021, 11 pages (5 pages of English Translation and 6 pages of Official copy).
Office Action received for Japanese Patent Application No. 2020-184471, dated May 10, 2021, 3 pages (1 page of English Translation and 2 pages of Official Copy).
Summons to Attend Oral Proceedings received for European Patent Application No. 19204230.7, mailed on May 25, 2021, 10 pages.
Advisory Action received for U.S. Appl. No. 16/144,629, dated Dec. 13, 2019, 9 pages.
Applicant-Initiated Interview Summary received for U.S. Appl. No. 16/271,583 dated Mar. 2, 2020, 3 pages.
Brief Communication regarding Oral Proceedings received for European Patent Application No. 17184710.6, dated Feb. 19, 2020, 2 pages.
Corrected Notice of Allowance received for U.S. Appl. No. 16/191,117, dated Feb. 28, 2020, 2 pages.
Extended European Search Report received for European Patent Application No. 19204230.7, dated Feb. 21, 2020, 7 pages.
Final Office Action received for U.S. Appl. No. 16/144,629, dated Sep. 18, 2019, 22 pages.
Intention to Grant received for European Patent Application No. 18176890.4, dated Feb. 28, 2020, 8 pages.
International Search Report and Written Opinion received for PCT Patent Application No. PCT/US2019/049101, dated Dec. 16, 2019, 26 pages.
Invitation to Pay Additional Fees and Partial International Search Report received for PCT Patent Application No. PCT/US2019/049101, dated Oct. 24, 2019, 17 pages.
Invitation to Pay Search Fees received for European Patent Application No. 19724959.2, mailed on Feb. 25, 2020, 3 pages.
Non-Final Office Action received for U.S. Appl. No. 16/144,629, dated Mar. 29, 2019, 18 pages.
Office Action received for Chinese Patent Application No. 201780002533.5, dated Feb. 3, 2020, 6 pages (3 pages of English Translation and 3 pages of Official Copy).
Office Action received for Danish Patent Application No. PA201870623, dated Jan. 30, 2020, 2 pages.
Office Action received for Danish Patent Application No. PA201870623, dated Jul. 12, 2019, 4 pages.
Office Action received for European Patent Application No. 18183054.8, dated Feb. 24, 2020, 6 pages.
PreAppeal Review Report received for Japanese Patent Application No. 2018-225131, mailed on Jan. 24, 2020, 8 pages (4 pages of English Translation and 4 pages of Official Copy).
PreAppeal Review Report received for Japanese Patent Application No. 2018-545502, mailed on Jan. 24, 2020, 8 pages (3 pages of English Translation and 5 pages of Official Copy).
Result of Consultation received for European Patent Application No. 17184710.6, dated Feb. 21, 2020, 6 pages.
Result of Consultation received for European Patent Application No. 17184710.6, dated Feb. 28, 2020, 3 pages.
Search Report and Opinion received for Danish Patent Application No. PA201870623, dated Dec. 20, 2018, 8 pages.
Applicant-Initiated Interview Summary received for U.S. Appl. No. 16/144,629, dated Jul. 2, 2020, 5 pages.
Decision to Grant received for European Patent Application No. 18176890.4, dated Jul. 9, 2020, 3 pages.
Final Office Action received for U.S. Appl. No. 16/528,941, dated Jul. 13, 2020, 15 pages.
Johnson Dave, "What is the Clips app on an iPhone?': How to use your iPhone's free video-editing app, and make custom videos for social media", Available online at: https://www.businessinsider.com/what-is-clips-on-iphone?IR=T, Oct. 26, 2019, 14 pages.
Office Action received for Australian Patent Application No. 2019213341, dated Jun. 30, 2020, 6 pages.
Office Action received for Australian Patent Application No. 2020100720, dated Jul. 9, 2020, 7 pages.
Office Action received for European Patent Application No. 16784025.5, dated Jul. 17, 2020, 6 pages.
OSXDAILY, "How to Zoom the Camera on iPhone", Available Online at: https://osxdaily.com/2012/04/18/zoom-camera-iphone/, Apr. 18, 2012, 6 pages.
Peckham James, "What is Apple Clips? Plus we teach you how to use it", Available online at: https://www.techradar.com/how-to/what-is-apple-clips-and-how-to-use-it, Jul. 20, 2017, 11 pages.
Ritchie Rene, "Clips app: The ultimate guide", Available online at: https://www.imore.com/clips, May 13, 2017, 16 pages.
Schiffhauer Alexander, "See the Light with Night Sight", Available online at: https://www.blog.google/products/pixel/see-light-night-sight, Nov. 14, 2018, 6 pages.
European Search Report received for European Patent Application No. 21163791.3, dated May 6, 2021, 5 pages.
Non-Final Office Action received for U.S. Appl. No. 16/825,879, dated May 5, 2021, 12 pages.
Notice of Allowance received for Korean Patent Application No. 10-2020-7021870, dated Apr. 26, 2021, 4 pages (1 page of English Translation and 3 pages of Official Copy).
Notice of Allowance received for U.S. Appl. No. 16/271,583, dated May 10, 2021, 3 pages.
Notice of Allowance received for U.S. Appl. No. 16/840,719, dated Apr. 30, 2021, 13 pages.
Office Action received for European Patent Application No. 21157252.4, dated Apr. 23, 2021, 8 pages.
Office Action received for Indian Patent Application No. 202018006172, dated May 5, 2021, 6 pages.
Corrected Notice of Allowance received for U.S. Appl. No. 16/840,719, dated May 14, 2021, 4 pages.
Notice of Allowance received for U.S. Appl. No. 16/528,941, dated May 19, 2021, 5 pages.
Notice of Allowance received for U.S. Appl. No. 16/599,433, dated May 14, 2021, 11 pages.
Office Action received for European Patent Application No. 20210373.5, dated May 10, 2021, 9 pages.
Decision on Appeal received for Japanese Patent Application No. 2018-225131, mailed on Mar. 11, 2021, 5 pages (4 pages of English Translation and 1 page of Official Copy).
Decision on Appeal received for Japanese Patent Application No. 2018-545502, mailed on Mar. 25, 2021, 3 pages (1 page of English Translation and 2 pages of Official Copy).
International Preliminary Report on Patentability received for PCT Patent Application No. PCT/US2019/049101, dated Mar. 25, 2021, 17 pages.
Notice of Allowance received for Chinese Patent Application No. 201910864074.2, dated Mar. 10, 2021, 2 pages (1 page of English Translation and 1 page of Official Copy).
Notice of Allowance received for Chinese Patent Application No. 202010287953.6, dated Mar. 18, 2021, 7 pages (3 pages of English Translation and 4 pages of Official Copy).
Office Action received for Chinese Patent Application No. 202010287950.2, dated Feb. 20, 2021, 22 pages (10 pages of English Translation and 12 pages of Official Copy).
Office Action received for Indian Patent Application No. 201917053025, dated Mar. 19, 2021, 7 pages.

(56) References Cited

OTHER PUBLICATIONS

Supplemental Notice of Allowance received for U.S. Appl. No. 16/733,718, dated Mar. 29, 2021, 2 pages.
Non-Final Office Action received for U.S. Appl. No. 16/528,941, dated Jan. 30, 2020, 14 pages.
Office Action received for Australian Patent Application No. 2020100189, dated Apr. 1, 2020, 3 pages.
Certificate of Examination received for Australian Patent Application No. 2020101043, dated Dec. 22, 2020, 2 pages.
Decision to Grant received for European Patent Application No. 18183054.8, dated Jan. 21, 2021, 3 pages.
Intention to Grant received for Danish Patent Application No. PA201970603, dated Jan. 13, 2021, 2 pages.
Intention to Grant received for European Patent Application No. 18209460.7, dated Jan. 15, 2021, 8 pages.
Office Action received for European Patent Application No. 20206196.6, dated Jan. 13, 2021, 10 pages.
Office Action received for European Patent Application No. 20206197.4, dated Jan. 12, 2021, 9 pages.
Notice of Allowance received for Chinese Patent Application No. 202010287961.0, dated Mar. 9, 2021, 8 pages (4 pages of English Translation and 4 pages of Official Copy).
Notice of Allowance received for Chinese Patent Application No. 202010287975.2, dated Mar. 1, 2021, 7 pages (3 pages of English Translation and 4 pages of Official Copy).
Office Action received for Chinese Patent Application No. 202010218168.5, dated Feb. 9, 2021, 21 pages (9 pages of English Translation and 12 pages of Official Copy).
Office Action received for Indian Patent Application No. 201814036470, dated Feb. 26, 2021, 7 pages.
Office Action received for Korean Patent Application No. 10-2021-0022053, dated Mar. 1, 2021, 11 pages (5 pages of English Translation and 6 pages of Official Copy).
Supplemental Notice of Allowance received for U.S. Appl. No. 16/733,718, dated Mar. 9, 2021, 21 pages.
European Search Report received for European Patent Application No. 20206197.4, dated Nov. 30, 2020, 4 pages.
Examiner Initiated-Interview Summary received for U.S. Appl. No. 16/528,941, dated Dec. 1, 2020, 2 pages.
Non-Final Office Action received for U.S. Appl. No. 16/528,941, dated Dec. 7, 2020, 15 pages.
Notice of Acceptance received for Australian Patent Application No. 2019266049, dated Nov. 24, 2020, 3 pages.
Notice of Allowance received for Korean Patent Application No. 10-2019-7027042, dated Nov. 26, 2020, 4 pages (1 page of English Translation and 3 pages of Official Copy).
Notice of Allowance received for Korean Patent Application No. 10-2020-0155924, dated Nov. 23, 2020, 7 pages (2 pages of English Translation and 5 pages of Official Copy).
Notice of Allowance received for U.S. Appl. No. 16/271,583, dated Dec. 9, 2020, 6 pages.
Office Action received for Chinese Patent Application No. 201910692978.1, dated Nov. 4, 2020, 4 pages (1 page of English Translation and 3 pages of Official Copy).
Office Action received for Korean Patent Application No. 10-2020-7021870, dated Nov. 11, 2020, 11 pages (5 pages of English Translation and 6 pages of Official Copy).
Office Action received for Korean Patent Application No. 10-2020-7031855, dated Nov. 24, 2020, 6 pages (2 pages of English Translation and 4 pages of Official Copy).
AstroVideo, "AstroVideo enables you to use a low-cost, low-light video camera to capture astronomical images", Available online at: https://www.coaa.co.uk/astrovideo.htm, Retrieved on: Nov. 18, 2019, 5 pages.
Corrected Notice of Allowance received for U.S. Appl. No. 16/143,097, dated Nov. 8, 2019, 3 pages.
Corrected Notice of Allowance received for U.S. Appl. No. 16/191,117, dated Nov. 20, 2019, 2 pages.
Gibson, Andrew'S., "Aspect Ratio: What it is and Why it Matters", Retrieved from: https://web.archive.org/web/20190331225429/https:/digital-photography-school.com/aspect-ratio-what-it-is-and-why-it-matters/, Mar. 31, 2019, 10 pages.
Hernández, Carlos, "Lens Blur in the New Google Camera App" Available online at: https://research.googleblog.com/2014/04/lens-blur-in-new-google-camera-app.html, Apr. 16, 2014, 6 pages.
ILUVTRADING, "Galaxy S10 / S10+ How to Use Bright Night Mode for Photos (Super Night Mode)", Online Available at: https://www.youtube.com/watch?v=SfZ7Us1S1Mk, Mar. 11, 2019, 4 pages.
ILUVTRADING, "Super Bright Night Mode: *Samsung Galaxy S10* vs. *Huawei P30 Pro* (Review/How to/Explained)", Online Available at: https://www.youtube.com/watch?v=d4r3PWioY4Y, Apr. 26, 2019, 4 pages.
KK World, "Redmi Note 7 Pro Night Camera Test | Night Photography with Night Sight & Mode", Online Available at: https://www.youtube.com/watch?v=3EKJGBjX3PY, Mar. 26, 2019, 4 pages.
Office Action received for Chinese Patent Application No. 201780002533.5, dated Sep. 26, 2019, 21 pages (9 pages of English Translation and 12 pages of Official Copy).
Shaw et al., "Skills for Closeups Photography", Watson-Guptill Publications, Nov. 1999, 5 pages (Official Copy Only) {See Communication under 37 CFR § 1.98(a) (3)}.
shiftdelete.net, "Oppo Reno 10× Zoom on Inceleme—Huawei P30 Pro'ya rakip mi geliyor?", Available online at: https://www.youtube.com/watch?v=ev2wlUzldrg, Apr. 24, 2019, 2 pages.
"Sony Xperia XZ3 Camera Review—The Colors, Duke, The Colors!", Android Headlines—Android News & Tech News, Available online at: https://www.youtube.com/watch?v=mwpYXzVWOgw, Nov. 3, 2018, 3 pages.
Sony, "User Guide, Xperia XZ3, H8416/H9436/H9493" Sony Mobile Communications Inc., Retrieved from: https://www-support-downloads.sonymobile.com/h8416/userguide_EN_H8416-H9436-H9493_2_Android9.0.pdf, 2018, 121 pages.
The Nitpicker, "Sony Xperia | In-depth Preview", Available online at: https://www.youtube.com/watch?v=TGCKxBuiO5c, Oct. 7, 2018, 3 pages.
XEETECHCARE, "Samsung Galaxy S10—Super Night Mode & Ultra Fast Charging!", Online Available at: htips://www.youtube.com/watch?v=3bguV4FX6aA, Mar. 28, 2019, 4 pages.
Applicant Initiated Interview Summary received for U.S. Appl. No. 16/528,941, dated Nov. 10, 2020, 2 pages.
Applicant-Initiated Interview Summary received for U.S. Appl. No. 16/733,718, dated Nov. 2, 2020, 4 pages.
Intention to Grant received for European Patent Application No. 18183054.8, dated Nov. 5, 2020, 6 pages.
Office Action received for Chinese Patent Application No. 201910864074.2, dated Sep. 23, 2020, 11 pages (5 pages of English Translation and 6 pages of Official Copy).
Office Action received for Danish Patent Application No. PA201970592, dated Oct. 26, 2020, 5 pages.
Office Action received for European Patent Application 17809168.2, dated Oct. 8, 2020, 4 pages.
Corrected Notice of Allowance received for U.S. Appl. No. 16/191,117, dated Dec. 9, 2019, 2 pages.
Non-Final Office Action received for U.S. Appl. No. 16/271,583, dated Nov. 29, 2019, 18 pages.
Non-Final Office Action received for U.S. Appl. No. 16/582,595, dated Nov. 26, 2019, 17 pages.
Notice of Allowance received for U.S. Appl. No. 16/143,396, dated Nov. 27, 2019, 8 pages.
Notice of Allowance received for U.S. Appl. No. 16/584,044, dated Dec. 11, 2019, 15 pages.
European Search Report received for European Patent Application No. 20206196.6, dated Dec. 8, 2020, 4 pages.
International Search Report and Written Opinion received for PCT Patent Application No. PCT/US2020/031643, dated Dec. 2, 2020, 33 pages.
Notice of Acceptance received for Australian Patent Application No. 2020267151, dated Dec. 9, 2020, 3 pages.
International Search Report and Written Opinion received for PCT Patent Application No. PCT/US2019/017363, dated Aug. 12, 2019, 12 pages.
Invitation to Pay Additional Fees received for PCT Patent Application No. PCT/US2019/017363, dated Jun. 17, 2019, 8 pages.

(56) References Cited

OTHER PUBLICATIONS

Non-Final Office Action received for U.S. Appl. No. 15/995,040, dated May 16, 2019, 24 pages.
Notice of Allowance received for U.S. Appl. No. 15/728,147, dated Aug. 19, 2019, 13 pages.
Notice of Allowance received for U.S. Appl. No. 16/143,097, dated Aug. 29, 2019, 23 pages.
Office Action received for Chinese Patent Application No. 201810566134.8, dated Aug. 13, 2019, 14 pages (8 pages of English Translation and 6 pages of Official Copy).
Office Action received for Danish Patent Application No. PA201870366, dated Aug. 22, 2019, 3 pages.
Applicant-Initiated Interview Summary received for U.S. Appl. No. 16/271,583, dated Jul. 14, 2020, 4 pages.
Applicant-Initiated Interview Summary received for U.S. Appl. No. 15/995,040, dated Jul. 27, 2020, 4 pages.
Intention to Grant received for Danish Patent Application No. PA201970601, dated Sep. 21, 2020, 2 pages.
Invitation to Pay Additional Fees received for PCT Patent Application No. PCT/US2020/031643, dated Sep. 9, 2020, 30 pages.
Notice of Allowance received for Chinese Patent Application No. 201911219525.3, dated Sep. 29, 2020, 2 pages (1 page of English Translation and 1 page of Official Copy).
Office Action received for Australian Patent Application No. 2020201969, dated Sep. 25, 2020, 5 pages.
Office Action received for European Patent Application No. 19204230.7, dated Sep. 28, 2020, 6 pages.
Result of Consultation received for European Patent Application No. 19204230.7, dated Sep. 24, 2020, 5 pages.
Advisory Action received for U.S. Appl. No. 16/144,629, dated Jan. 6, 2021, 10 pages.
Office Action received for Australian Patent Application No. 2020277216, dated Dec. 17, 2020, 5 pages.
Office Action received for Chinese Patent Application No. 202010287961.0, dated Dec. 30, 2020, 16 pages (8 pages of English Translation and 8 pages of Official Copy).
Office Action received for Chinese Patent Application No. 202010287975.2, dated Dec. 30, 2020, 17 pages (9 pages of English Translation and 8 pages of Official Copy).
Brief Communication regarding Oral Proceedings received for European Patent Application No. 17184710.6, mailed Mar. 9, 2020, 2 pages.
Non-Final Office Action received for U.S. Appl. No. 16/144,629, dated Mar. 13, 2020, 24 pages.
Applicant-Initiated Interview Summary received for U.S. Appl. No. 16/599,433, dated Apr. 20, 2021, 7 pages.
European Search Report received for European Patent Application No. 20210373.5, dated Apr. 13, 2021, 4 pages.
European Search Report received for European Patent Application No. 21157252.4, dated Apr. 16, 2021, 4 pages.
Intention to Grant received for Danish Patent Application No. PA201970593, dated Apr. 13, 2021, 2 pages.
Notice of Acceptance received for Australian Patent Application No. 2020201969, dated Mar. 26, 2021, 3 pages.
Notice of Acceptance received for Australian Patent Application No. 2020277216, dated Mar. 15, 2021, 3 pages.
Office Action received for European Patent Application No. 20168009.7, dated Apr. 20, 2021, 6 pages.
Office Action received for Japanese Patent Application No. 2020-193703, dated Apr. 19, 2021, 4 pages (2 pages of English Translation and 2 pages of Official Copy).
Notice of Acceptance received for Australian Patent Application No. 2021254567, dated Nov. 17, 2021, 3 pages.
Notice of Allowance received for Chinese Patent Application No. 202010601484.0, dated Nov. 23, 2021, 2 pages (1 page of English Translation and 1 page of Official Copy).
Notice of Allowance received for Korean Patent Application No. 10-2021-0022053, dated Nov. 23, 2021, 5 pages (2 pages of English Translation and 3 pages of Official Copy).
Office Action received for European Patent Application No. 20210373.5, dated Dec. 9, 2021, 7 pages.
Applicant Initiated Interview Summary received for U.S. Appl. No. 17/190,879, dated Oct. 26, 2021, 3 pages.
Corrected Notice of Allowance received for U.S. Appl. No. 16/599,433, dated Oct. 14, 2021, 3 pages.
Decision to Grant received for European Patent Application No. 17809168.2, dated Oct. 21, 2021, 3 pages.
Decision to Grant received for Japanese Patent Application No. 2019-203399, dated Oct. 20, 2021, 3 pages (1 page of English Translation and 2 pages of Official Copy).
International Search Report and Written Opinion received for PCT Patent Application No. PCT/US2021/034304, dated Oct. 11, 2021, 24 pages.
Non-Final Office Action received for U.S. Appl. No. 17/190,879, dated Oct. 13, 2021, 10 pages.
Notice of Acceptance received for Australian Patent Application No. 2020260413, dated Oct. 14, 2021, 3 pages.
Notice of Allowance received for U.S. Appl. No. 16/733,718, dated Oct. 20, 2021, 24 pages.
Office Action received for Indian Patent Application No. 201818045872, dated Oct. 13, 2021, 7 pages.
Corrected Notice of Allowance received for U.S. Appl. No. 16/599,433, dated Aug. 13, 2021, 5 pages.
Corrected Notice of Allowance received for U.S. Appl. No. 16/733,718, dated Aug. 18, 2021, 2 pages.
Corrected Notice of Allowance received for U.S. Appl. No. 16/825,879, dated Aug. 13, 2021, 2 pages.
Corrected Notice of Allowance received for U.S. Appl. No. 16/835,651, dated Aug. 10, 2021, 4 pages.
Corrected Notice of Allowance received for U.S. Appl. No. 16/835,651, dated Aug. 13, 2021, 2 pages.
Decision to Grant received for Japanese Patent Application No. 2020-193703, dated Aug. 10, 2021, 3 pages (1 page of English Translation and 2 pages of Official Copy).
Notice of Allowance received for U.S. Appl. No. 16/528,941, dated Aug. 10, 2021, 5 pages.
Office Action received for Chinese Patent Application No. 202010600197.8, dated Jul. 2, 2021, 14 pages (6 pages of English Translation and 8 pages of Official Copy).
Office Action received for Japanese Patent Application No. 2019-203399, dated Aug. 10, 2021, 4 pages (2 pages of English Translation and 2 pages of Official Copy).
Advisory Action received for U.S. Appl. No. 09/757,006, dated Apr. 11, 2006, 3 pages.
Advisory Action received for U.S. Appl. No. 09/757,006, dated Feb. 11, 2005, 3 pages.
Advisory Action received for U.S. Appl. No. 09/757,006, dated Jul. 6, 2004, 3 pages.
Android Police, "Galaxy S9+ In-depth Camera Review", See Especially 0:43-0:53; 1:13-1:25; 1:25-1:27; 5:11-5:38; 6:12-6:26, Available Online at https://www.youtube.com/watch?v=GZHYCdMCv-w, Apr. 19, 2018, 3 pages.
Brett, "How to Create Your AR Emoji on the Galaxy S9 and S9+", Available online at: https://www.youtube.com/watch?v=HHMdcBpC8MQ, Mar. 16, 2018, 5 pages.
Certificate of Examination received for Australian Patent Application No. 2017100683, dated Jan. 16, 2018, 2 pages.
Certificate of Examination received for Australian Patent Application No. 2019100420, dated Jul. 3, 2019, 2 pages.
Channel Highway, "Virtual Makeover in Real-time and in Full 3d", Available online at:—https://www.youtube.com/watch?v=NgUbBzb5qZg, Feb. 16, 2016, 1 page.
Corrected Notice of Allowance received for U.S. Appl. No. 14/641,251, dated Jun. 17, 2016, 2 pages.
Corrected Notice of Allowance received for U.S. Appl. No. 15/268,115, dated Apr. 13, 2018, 11 pages.
Corrected Notice of Allowance received for U.S. Appl. No. 15/268,115, dated Mar. 21, 2018, 9 pages.
Corrected Notice of Allowance received for U.S. Appl. No. 15/273,453, dated Dec. 21, 2017, 3 pages.
Corrected Notice of Allowance received for U.S. Appl. No. 15/273,453, dated Feb. 8, 2018, 2 pages.

(56) References Cited

OTHER PUBLICATIONS

Corrected Notice of Allowance received for U.S. Appl. No. 15/273,453, dated Nov. 27, 2017, 2 pages.
Corrected Notice of Allowance received for U.S. Appl. No. 15/273,503, dated Nov. 2, 2017, 2 pages.
Corrected Notice of Allowance received for U.S. Appl. No. 15/273,503, dated Nov. 24, 2017, 2 pages.
Corrected Notice of Allowance received for U.S. Appl. No. 15/858,175, dated Sep. 21, 2018, 2 pages.
Dan, "Teaches Windows 98,", 1998, pp. 281, 286, 503.
Decision of Refusal received for Japanese Patent Application No. 2018-243463, dated Feb. 25, 2019, 8 pages (5 pages of English Translation and 3 pages of Official copy).
Decision of Refusal received for Japanese Patent Application No. 2018-545502, dated Feb. 25, 2019, 11 pages (7 pages of English Translation and 4 pages of Official copy).
Decision to Grant received for Danish Patent Application No. PA201570788, dated Jul. 10, 2017, 2 pages.
Decision to Grant received for Danish Patent Application No. PA201570791, dated Jun. 7, 2017, 2 pages.
Decision to Grant received for Danish Patent Application No. PA201670627, dated Nov. 29, 2018, 2 pages.
Decision to Grant received for Danish Patent Application No. PA201670753, dated Mar. 6, 2019, 2 pages.
Decision to Grant received for Danish Patent Application No. PA201670755, dated Mar. 6, 2019, 2 pages.
Decision to Grant received for European Patent Application No. 12181460.2, dated Mar. 3, 2016, 2 pages.
Decision to Grant received for European Patent Application No. 15712218.5, dated Jun. 7, 2018, 2 pages.
Decision to Refuse received for European Patent Application No. 02708976.2, dated Mar. 10, 2014, 4 pages.
Decision to Refuse received for Japanese Patent Application No. 2018-225131, dated Jul. 8, 2019, 6 pages (4 pages of English Translation and 2 pages of Official copy).
Decision to Refuse received for Japanese Patent Application No. 2018-243463, dated Jul. 8, 2019, 5 pages (3 pages of English Translation and 2 pages of Official copy).
Decision to Refuse received for Japanese Patent Application No. 2018-545502, dated Jul. 8, 2019, 5 pages (3 pages of English Translation and 2 pages of Official copy).
Digital Trends, "Modiface Partners with Samsung to Bring AR Makeup to the Galaxy S9", Available online at:—https://www.digitaltrends.com/mobile/modiface-samsung-partnership-ar-makeup-galaxy-s9/, 2018, 16 pages.
European Search Report received for European Patent Application No. 12181460.2, dated Mar. 4, 2013, 8 pages.
European Search Report received for European Patent Application No. 18209460.7, dated Mar. 15, 2019, 4 pages.
European Search Report received for European Patent Application No. 18214698.5, dated Mar. 21, 2019, 5 pages.
Examiner's Answer to Appeal Brief received for U.S. Appl. No. 09/757,006, mailed on Oct. 11, 2006, 13 pages.
Extended European Search Report (includes Supplementary European Search Report and Search Opinion) received for European Patent Application No. 17184710.6, dated Nov. 28, 2017, 10 pages.
Extended European Search Report received for European Patent Application No. 16784025.5, dated Apr. 16, 2018, 11 pages.
Extended Search Report received for European Patent Application 17809168.2, dated Jun. 28, 2018, 9 pages.
Fedko, Daria, "AR Hair Styles", Online Available at https://www.youtube.com/watch?v=FrS6tHRbFE0, Jan. 24, 2017, 2 pages.
Final Office Action received for U.S. Appl. No. 09/757,006, dated Dec. 2, 2005, 9 pages.
Final Office Action received for U.S. Appl. No. 09/757,006, dated Feb. 11, 2004, 13 pages.
Final Office Action received for U.S. Appl. No. 09/757,006, dated Oct. 22, 2004, 13 pages.
Final Office Action received for U.S. Appl. No. 11/980,571, dated Aug. 18, 2011, 13 pages.

Final Office Action received for U.S. Appl. No. 13/335,838, dated Feb. 27, 2017, 13 pages.
Final Office Action received for U.S. Appl. No. 13/335,838, dated Jul. 15, 2016, 12 pages.
Final Office Action received for U.S. Appl. No. 13/335,838, dated Oct. 8, 2015, 12 pages.
Final Office Action received for U.S. Appl. No. 15/268,115, dated Oct. 11, 2017, 48 pages.
Final Office Action received for U.S. Appl. No. 15/728,147, dated Aug. 29, 2018, 39 pages.
Final Office Action received for U.S. Appl. No. 15/728,147, dated May 28, 2019, 45 pages.
Final Office Action received for U.S. Appl. No. 16/143,396, dated Jun. 20, 2019, 14 pages.
Franks Tech Help, "DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely: Free iphone/android App Fuji Film Camera Remote", Available at <http://app.fujifilm-dsc.com/en/camera_remote/guide05.html>, Apr. 22, 2014, 3 pages.
Gadgets Portal, "Galaxy J5 Prime Camera Review! (vs J7 Prime) 4k", Available Online at:—https://www.youtube.com/watch?v=Rf2Gy8QmDqc, Oct. 24, 2016, 3 pages.
Gavin's Gadgets, "Honor 10 Camera App Tutorial—How to Use All Modes +90 Photos Camera Showcase", See Especially 2:58-4:32, Available Online at <https:/www.youtube.com/watch?v=M5XZwXJcK74>, May 26, 2018, 3 pages.
GSM Arena, "Honor 10 Review—Page 5 Camera", Available Online at <https://web.archive.org/web/20180823142417/https://www.gsmarena.com/honor_10-review-1771p5.php>, Aug. 23, 2018, 11 pages.
Hall, Brent, "Samsung Galaxy Phones Pro Mode (s7/s8/s9/note 8/note 9): When, Why, & How to Use It", See Especially 3:18-5:57, Available Online at <https://www.youtube.com/watch?v=KwPxGUDRkTg>, Jun. 19, 2018, 3 pages.
HELPVIDEOSTV, "How to Use Snap Filters on Snapchat", Retrieved from <https://www.youtube.com/watch?v=oR-7cIWPszU&feature=youtu.be>, Mar. 22, 2017, pp. 1-2.
Huawei Mobile PH, "Huawei P10 Tips & Tricks: Compose Portraits with Wide Aperture (bokeh)", Available Online at <https://www.youtube.com/watch?v=WM4yo5-hrrE>, Mar. 30, 2017, 2 pages.
Intention to Grant received for Danish Patent Application No. PA201570788, dated Mar. 27, 2017, 2 pages.
Intention to Grant received for Danish Patent Application No. PA201570791, dated Mar. 7, 2017, 2 pages.
Intention to Grant received for Danish Patent Application No. PA201670627, dated Jun. 11, 2018, 2 pages.
Intention to Grant received for Danish Patent Application No. PA201670753, dated Oct. 29, 2018, 2 pages.
Intention to Grant received for Danish Patent Application No. PA201670755, dated Nov. 13, 2018, 2 pages.
Intention to Grant received for European Patent Application No. 12181460.2 dated Sep. 22, 2015, 6 pages.
Intention to Grant received for European Patent Application No. 15712218.5, dated Jan. 24, 2018, 7 pages.
International Preliminary Report on Patentability and Written Opinion received for PCT Application No. PCT/US2016/029030, dated Nov. 2, 2017, 35 pages.
International Preliminary Report on Patentability received for PCT Patent Application No. PCT/US2002/000483, completed on Mar. 17, 2003, 4 pages.
International Preliminary Report on Patentability received for PCT Patent Application No. PCT/US2015/019298, dated Mar. 16, 2017, 12 pages.
International Preliminary Report on Patentability received for PCT Patent Application No. PCT/US2017/035321, dated Dec. 27, 2018, 11 pages.
International Search Report & Written Opinion received for PCT Patent Application No. PCT/US2016/029030, dated Aug. 5, 2016, 37 pages.

(56) References Cited

OTHER PUBLICATIONS

International Search Report and Written Opinion received for PCT Patent Application No. PCT/US2015/019298, dated Jul. 13, 2015, 17 pages.
International Search Report and Written Opinion received for PCT Patent Application No. PCT/US2017/035321, dated Oct. 6, 2017, 15 pages.
International Search Report and Written Opinion received for PCT Patent Application No. PCT/US2018/015591, dated Jun. 14, 2018, 14 pages.
International Search Report received for PCT Patent Application No. PCT/US2002/000483, dated May 17, 2002, 1 page.
Invitation to Pay Addition Fees received for PCT Patent Application No. PCT/US2017/035321, dated Aug. 17, 2017, 3 pages.
Invitation to Pay Additional Fees and Partial International Search Report received for PCT Patent Application No. PCT/US2019/024067, dated Jul. 16, 2019, 13 pages.
"Iphone User Guide for ios 4.2 and 4.3 Software", Available at: https://manuals.info.apple.com/MANUALS/1000/MA1539/en_US/iPhone_iOS4_User_Guide.pdf, 2011, 274 pages.
Kozak, Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Lang, Brian, "How to Audio & Video Chat with Multiple Users at the Same Time in Groups", Snapchat 101, Online Available at: <https://smartphones.gadgethacks.com/how-to/snapchal-101-audio-video-chat-with-multiple-users-same-time-groups-0184113/>, Apr. 17, 2018, 4 pages.
MOBISCRUB, "Galaxy S4 Mini Camera Review", Available Online at:—https://www.youtube.com/watch?v=KYKOydw8QT8, Aug. 10, 2013, 3 pages.
MOBISCRUB, "Samsung Galaxy S5 Camera Review—HD Video", Available Online on: —https://www.youtube.com/watch?v=BFgwDtNKMjg, Mar. 27, 2014, 3 pages.
MODIFACECHANNEL, "Sephora 3d Augmented Reality Mirror", Available Online at: https://www.youtube.com/watch?v=wwBO4PU9EXI, May 15, 2014, 1 page.
"Nero5 Burning Rom Brief Instructions", Ahead Software GMBH, Available at URL:http://www.liteonit.com/ODD/Zip/nero_eng.pdf, 2001, 34 pages.
Non-Final Office Action received for U.S. Appl. No. 13/335,838, dated Jan. 16, 2015, 10 pages.
Non-Final Office Action received for U.S. Appl. No. 13/335,838, dated Mar. 24, 2016, 12 pages.
Non-Final Office Action received for U.S. Appl. No. 13/335,838, dated Nov. 4, 2016, 12 pages.
Non-Final Office Action received for U.S. Appl. No. 14/869,807, dated Dec. 2, 2016, 23 pages.
Non-Final Office Action received for U.S. Appl. No. 15/136,323, dated Apr. 6, 2017, 27 pages.
Non-Final Office Action received for U.S. Appl. No. 15/268,115, dated Apr. 13, 2017, 44 pages.
Non-Final Office Action received for U.S. Appl. No. 15/273,522, dated Nov. 30, 2016, 15 pages.
Non-Final Office Action received for U.S. Appl. No. 15/273,544, dated May 25, 2017, 18 pages.
Non-Final Office Action received for U.S. Appl. No. 15/728,147, dated Feb. 22, 2018, 20 pages.
Nou-Final Office Action received for U.S. Appl. No. 15/728,147, dated Jan. 31, 2019, 41 pages.
Non-Final Office Action received for U.S. Appl. No. 15/863,369, dated Apr. 4, 2018, 15 pages.
Non-Final Office Action received for U.S. Appl. No. 16/143,396, dated Jan. 7, 2019, 13 pages.
Non-Final Office Action received for U.S. Appl. No. 09/757,006, dated May 20, 2005, 12 pages.
Non-Final Office Action received for U.S. Appl. No. 09/757,006, dated Sep. 5, 2003, 23 pages.
Non-Final Office Action received for U.S. Appl. No. 11/980,571, dated Dec. 23, 2010, 10 pages.
Non-Final Office Action received for U.S. Appl. No. 11/980,571, dated Jun. 7, 2013, 14 pages.
Non-Final Office Action received for U.S. Appl. No. 16/143,097, dated Feb. 28, 2019, 17 pages.
Notice of Acceptance received for Australian Patent Application No. 2016252993, dated Dec. 19, 2017, 3 pages.
Notice of Acceptance received for Australian Patent Application No. 2017286130, dated Apr. 26, 2019, 3 pages.
Notice of Allowance received for Chinese Patent Application No. 201210308862.1, dated Jul. 7, 2016, 4 pages (2 pages of English Translation and 2 pages of Official copy).
Notice of Allowance received for Chinese Patent Application No. 201580046237.6, dated Aug. 29, 2018, 4 pages (1 page of English Translation and 3 pages of Official copy).
Notice of Allowance received for Chinese Patent Application No. 201680023520.1, dated Jun. 28, 2019, 2 pages (1 page of English Translation and 1 page of Official copy).
Notice of Allowance received for Chinese Patent Application No. 201810664927.3, dated Jul. 19, 2019, 2 pages (1 page of English Translation and 1 page of Official copy).
Notice of Allowance received for Japanese Patent Application No. 2018-171188, dated Jul. 16, 2019, 3 pages (1 page of English Translation and 2 pages of Official copy).
Notice of Allowance received for Korean Patent Application No. 10-2018-7026743, dated Mar. 20, 2019, 7 pages (1 page of English Translation and 6 pages of Official copy).
Notice of Allowance received for Korean Patent Application No. 10-2018-7028849, dated Feb. 1, 2019, 4 pages (1 page of English Translation and 3 pages of Official copy).
Notice of Allowance received for Korean Patent Application No. 10-2018-7034780, dated Jun. 19, 2019, 4 pages (1 page of English Translation and 3 pages of Official copy).
Notice of Allowance received for Korean Patent Application No. 10-2018-7036893, dated Jun. 12, 2019, 4 pages (1 page of English Translation and 3 pages of Official copy).
Notice of Allowance received for Taiwanese Patent Application No. 104107328, dated Jun. 12, 2017, 3 pages (Official copy only) (See Communication under 37 CFR§ 1.98(a) (3)).
Notice of Allowance received for U.S. Appl. No. 11/980,571, dated May 9, 2014, 9 pages.
Notice of Allowance received for U.S. Appl. No. 13/335,838, dated Nov. 24, 2017, 7 pages.
Notice of Allowance received for U.S. Appl. No. 14/641,251, dated May 18, 2016, 13 pages.
Notice of Allowance received for U.S. Appl. No. 14/869,807, dated Jun. 21, 2017, 9 pages.
Notice of Allowance received for U.S. Appl. No. 14/869,807, dated Oct. 10, 2017, 9 pages.
Notice of Allowance received for U.S. Appl. No. 15/136,323, dated Feb. 28, 2018, 9 pages.
Notice of Allowance received for U.S. Appl. No. 15/136,323, dated Oct. 12, 2017, 8 pages.
Notice of Allowance received for U.S. Appl. No. 15/268,115, dated Mar. 7, 2018, 15 pages.
Notice of Allowance received for U.S. Appl. No. 15/273,453, dated Oct. 12, 2017, 11 pages.
Notice of Allowance received for U.S. Appl. No. 15/273,503, dated Aug. 14, 2017, 9 pages.
Notice of Allowance received for U.S. Appl. No. 15/273,522, dated Mar. 28, 2017, 9 pages.
Notice of Allowance received for U.S. Appl. No. 15/273,522, dated May 19, 2017, 2 pages.
Notice of Allowance received for U.S. Appl. No. 15/273,522, dated May 23, 2017, 2 pages.
Notice of Allowance received for U.S. Appl. No. 15/273,544, dated Mar. 13, 2018, 8 pages.
Notice of Allowance received for U.S. Appl. No. 15/273,544, dated Oct. 27, 2017, 8 pages.
Notice of Allowance received for U.S. Appl. No. 15/858,175, dated Jun. 1, 2018, 8 pages.

(56) References Cited

OTHER PUBLICATIONS

Notice of Allowance received for U.S. Appl. No. 15/858,175, dated Sep. 12, 2018, 8 pages.
Notice of Allowance received for U.S. Appl. No. 15/863,369, dated Jun. 28, 2018, 8 pages.
Notice of Allowance received for U.S. Appl. No. 15/975,581, dated Oct. 3, 2018, 25 pages.
Notice of Allowance received for U.S. Appl. No. 16/110,514, dated Apr. 29, 2019, 9 pages.
Notice of Allowance received for U.S. Appl. No. 16/110,514, dated Mar. 13, 2019, 11 pages.
Notice of Allowance received for U.S. Appl. No. 16/143,201, dated Feb. 8, 2019, 9 pages.
Notice of Allowance received for U.S. Appl. No. 16/143,201, dated Nov. 28, 2018, 14 pages.
Office Action received for Australian Patent Application No. 2017100683, dated Sep. 20, 2017, 3 pages.
Office Action received for Australian Patent Application No. 2017100684, dated Jan. 24, 2018, 4 pages.
Office Action received for Australian Patent Application No. 2017100684, dated Oct. 5, 2017, 4 pages.
Office Action received for Australian Patent Application No. 2017286130, dated Jan. 21, 2019, 4 pages.
Office Action received for Chinese Patent Application No. 201210308862.1, dated Apr. 23, 2015, 10 pages (3 pages of English Translation and 7 pages of Official copy).
Office Action received for Chinese Patent Application No. 201210308862.1, dated Jan. 26, 2016, 8 pages (3 pages of English Translation and 5 pages of Official copy).
Office Action received for Chinese Patent Application No. 201580046237.6, dated Feb. 6, 2018, 10 pages (5 pages of English Translation and 5 pages of Official copy).
Office Action received for Chinese Patent Application No. 201680023520.1, dated Jan. 3, 2019, 10 pages (5 pages of English Translation and 5 pages of Official copy).
Office Action received for Chinese Patent Application No. 201780002533.5, dated Apr. 25, 2019, 17 pages (7 pages of English Translation and 10 pages of Official copy).
Office Action received for Chinese Patent Application No. 201810664927.3, dated Mar. 28, 2019, 11 pages (5 pages of English Translation and 6 pages of Official copy).
Office Action received for Danish Patent Application No. PA201570788, dated Apr. 8, 2016, 11 pages.
Office Action received for Danish Patent Application No. PA201570788, dated Sep. 13, 2016, 3 pages.
Office Action received for Danish Patent Application No. PA201570791, dated Apr. 6, 2016, 12 pages.
Office Action received for Danish Patent Application No. PA201570791, dated Sep. 6, 2016, 4 pages.
Office Action received for Danish Patent Application No. PA201670627, dated Apr. 5, 2017, 3 pages.
Office Action received for Danish Patent Application No. PA201670627, dated Nov. 6, 2017, 2 pages.
Office Action received for Danish Patent Application No. PA201670627, dated Oct. 11, 2016, 8 pages.
Office Action received for Danish Patent Application No. PA201670753, dated Dec. 20, 2016, 7 pages.
Office Action received for Danish Patent Application No. PA201670753, dated Jul. 5, 2017, 4 pages.
Office Action received for Danish Patent Application No. PA201670753, dated Mar. 23, 2018, 5 pages.
Office Action received for Danish Patent Application No. PA201670755, dated Apr. 6, 2017, 5 pages.
Office Action received for Danish Patent Application No. PA201670755, dated Apr. 20, 2018, 2 pages.
Office Action received for Danish Patent Application No. PA201670755, dated Dec. 22, 2016, 6 pages.
Office Action received for Danish Patent Application No. PA201670755, dated Oct. 20, 2017, 4 pages.
Office Action received for Danish Patent Application No. PA201770563, dated Aug. 13, 2018, 5 pages.
Office Action received for Danish Patent Application No. PA201770563, dated Jun. 28, 2019, 5 pages.
Office Action received for Danish Patent Application No. PA201770719, dated Aug. 14, 2018, 6 pages.
Office Action received for Danish Patent Application No. PA201770719, dated Feb. 19, 2019, 4 pages.
Office Action received for Danish Patent Application No. PA201870366, dated Dec. 12, 2018, 3 pages.
Office Action received for Danish Patent Application No. PA201870367, dated Dec. 20, 2018, 5 pages.
Office Action received for Danish Patent Application No. PA201870368, dated Dec. 20, 2018, 5 pages.
Office Action received for European Patent Application No. 02708976.2, dated Jan. 11, 2011, 7 pages.
Office Action received for European Patent Application No. 02708976.2, dated Mar. 18, 2010, 6 pages.
Office Action received for European Patent Application No. 12181460.2, dated Jan. 16, 2014, 6 pages.
Office Action received for European Patent Application No. 15712218.5, dated Aug. 3, 2017, 4 pages.
Office Action received for European Patent Application No. 17184710.6, dated Dec. 21, 2018, 7 pages.
Office Action received for European Patent Application No. 18176890.4, dated Oct. 16, 2018, 8 pages.
Office Action received for European Patent Application No. 18183054.8, dated Nov. 16, 2018, 8 pages.
Office Action received for European Patent Application No. 18209460.7, dated Apr. 10, 2019, 7 pages.
Office Action received for European Patent Application No. 18214698.5, dated Apr. 2, 2019, 8 pages.
Office Action received for Japanese Patent Application No. 2018-225131, dated Mar. 4, 2019, 10 pages (6 pages of English Translation and 4 pages of Official copy).
Office Action received for Korean Patent Application No. 10-2018-7026743, dated Jan. 17, 2019, 5 pages (2 pages of English Translation and 3 pages of Official copy).
Office Action received for Korean Patent Application No. 10-2018-7034780, dated Apr. 4, 2019, 11 pages (5 pages of English Translation and 6 pages of Official copy).
Office Action received for Korean Patent Application No. 10-2018-7036893, dated Apr. 9, 2019, 6 pages (2 pages of English Translation and 4 pages of Official copy).
Office Action received for Taiwanese Patent Application No. 104107328, dated Dec. 28, 2016, 4 pages (1 page of Search Report and 3 pages of Official copy).
Paine, Steve, "Samsung Galaxy Camera Detailed Overview—User Interface", Retrieved from: https://www.youtube.com/watch?v=td8UYSySulo&feature=youtu.be, Sep. 18, 2012, pp. 1-2.
PC World, "How to Make AR Emojis on the Samsung Galaxy S9", You Tube, Available Online: https://www.youtube.com/watch?v=8wQICfulkz0, Feb. 25, 2018, 2 pages.
PHONEARENA, "Sony Xperia Z5 Camera App and UI Overview", Retrieved from https://www.youtube.com/watch?v=UtDzdTsmkfU&feature=youtu.be, Sep. 8, 2015, pp. 1-3.
Playmemories Camera Apps, "Playmemories Camera Apps Help Guide", available at: https://www.playmemoriescameraapps.com/portal/manual/IS9104-NPIA09014_00-F00002/en/index.html, 2012, 3 pages.
"Remote Shot for Smartwatch 2", Available online at:—https://play.google.com/store/apps/details?id=net.watea.sw2.rshot&hl=en, Nov. 21, 2017, 3 pages.
Search Report and Opinion received for Danish Patent Application No. PA201770563, dated Oct. 10, 2017, 9 pages.
Search Report and Opinion received for Danish Patent Application No. PA201870366, dated Aug. 27, 2018, 9 pages.
Search Report and Opinion received for Danish Patent Application No. PA201870367, dated Aug. 27, 2018, 9 pages.
Search Report and Opinion received for Danish Patent Application No. PA201870368, dated Sep. 6, 2018, 7 pages.
Search Report received for Danish Patent Application No. PA201770719, dated Oct. 17, 2017, 9 pages.

(56) References Cited

OTHER PUBLICATIONS

Smart Reviews, "Honor10 Ai Camera's In-Depth Review", See Especially 2:37-2:48; 6:39-6:49, Available Online at https://www.youtube.com/watch?v=oKFqRvxeDBQ, May 31, 2018, 2 pages.
Snapchat Lenses, "How to Get All Snapchat Lenses Face Effect Filter on Android", Retrieved from: https://www.youtube.com/watch?v=0PfnF1RInfw&feature=youtu.be, Sep. 21, 2015, pp. 1-2.
Summons to Attend Oral Proceedings received for European Patent Application No. 02708976.2, mailed on Sep. 24, 2013, 9 pages.
Supplemental Notice of Allowance received for U.S. Appl. No. 15/136,323, dated Jan. 31, 2018, 6 pages.
Supplemental Notice of Allowance received for U.S. Appl. No. 15/863,369, dated Aug. 8, 2018, 4 pages.
Supplemental Notice of Allowance received for U.S. Appl. No. 16/143,201, dated Dec. 13, 2018, 2 pages.
Supplemental Notice of Allowance received for U.S. Appl. No. 16/143,201, dated Dec. 19, 2018, 2 pages.
Supplemental Notice of Allowance received for U.S. Appl. No. 16/143,201, dated Jan. 10, 2019, 2 pages.
Supplementary European Search Report received for European Patent Application No. 02708976.2, dated Mar. 11, 2009, 3 pages.
Supplementary European Search Report received for European Patent Application No. 18176890.4, dated Sep. 20, 2018, 4 pages.
Supplementary European Search Report received for European Patent Application No. 18183054.8, dated Oct. 11, 2018, 4 pages.
Tech, Smith, "Snagit 11 Snagit 11.4 Help", Available at: http://assets.techsmith.com/Downloads/ua-tutorials-snagit-11/Snagit_11.pdf, Jan. 2014, 2 pages.
TECHSMITH, "Snagit ® 11 Snagit 11.4 Help", available at http://assets.techsmith.com/Downloads/ua-tutorials-snagit-11/Snagit_11.pdf, Jan. 2014, 146 pages.
TECHTAG, "Samsung J5 Prime Camera Review | True Review", Available online at:—https://www.youtube.com/watch?v=a_p906ai6PQ, Oct. 26, 2016, 3 pages.
TECHTAG, "Samsung J7 Prime Camera Review (technical Camera)", Available Online at:—https://www.youtube.com/watch?v=AJPcLP8GpFQ, Oct. 4, 2016, 3 pages.
Travel Tech Sports Channel, "New Whatsapp Update—voice Message Recording Made Easy-want to Record Long Voice Messages", Available Online at: https://www.youtube.com/watch?v=SEviqgsAdUk, Nov. 30, 2017, 13 pages.
VICKGEEK, "Canon 80d Live View Tutorial | Enhance Your Image Quality", Available online at: —https://www.youtube.com/watch?v=JGNCiy6W19c, Sep. 27, 2016, 3 pages.
Vivo India, "Bokeh Mode | Vivo V9", Available Online at <https://www.youtube.com/watch?v=B5AIHhH5Rxs>, Mar. 25, 2018, 3 pages.
Wong, Richard, "Huawei Smartphone (p20/p10/p9, mate 10/9) Wide Aperture Mode Demo", Available Online at https://www.youtube.com/watch?v=eLY3LsZGDPA, May 7, 2017, 2 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
XPERIA Blog, "Action Camera Extension Gives Smartwatch/Smartband Owners Ability to Control Sony Wireless Cameras", Available at http://www.xperiablog.net/2014/06/13/action-camera-extension-gives-smartwatchsmartband-owners-ability-to-control-sony-wireless-cameras/, Jun. 13, 2014, 10 pages.
X-TECH, "Test Make up via Slick Augmented Reality Mirror Without Putting It on", Available Online at: http://x-tech.am/test-make-up-via-slick-augmented-reality-mirror-without-putting-it-on/, Nov. 29, 2014, 5 pages.
[B612] Addition of facial recognition bear/cat stamps and AR background function having moving sparkles or hearts, URL, htpps://apptopi.jp/2017/0I/22/b612, Jan. 22, 2017, 11 pages, Official copy only (See Communication under 37 CFR § 1.98(a) (3)).
Non-Final Office Action received for U.S. Appl. No. 15/995,040, dated Apr. 15, 2020, 19 pages.
Notice of Allowance received for Chinese Patent Application No. 201810566134.8, dated Apr. 7, 2020, 3 pages (1 page of English Translation and 2 pages of Official Copy).
Office Action received for Japanese Patent Application No. 2018-182607, dated Apr. 6, 2020, 6 pages (3 pages of English Translation and 3 pages of Official Copy).
Corrected Notice of Allowance received for U.S. Appl. No. 16/825,879, dated Sep. 15, 2021, 2 pages.
Decision to Grant received for Danish Patent Application No. PA201970593, dated Sep. 7, 2021, 2 pages.
Notice of Allowance received for Chinese Patent Application No. 202010218168.5, dated Aug. 25, 2021, 6 pages (3 pages of English Translation and 3 pages of Official Copy).
Notice of Allowance received for Chinese Patent Application No. 202010287958.9, dated Aug. 27, 2021, 6 pages (3 pages of English Translation and 3 pages of Official Copy).
Office Action received for European Patent Application No. 18704732.9, dated Sep. 7, 2021, 10 pages.
Office Action received for European Patent Application No. 20206197.4, dated Aug. 27, 2021, 6 pages.
Decision to Grant received for Danish Patent Application No. PA201970601, dated Feb. 3, 2021, 2 pages.
NEUROTECHNOLOGY,"Sentimask SDK", Available at: https://www.neurotechnology.com/sentimask.html, Apr. 22, 2018, 5 pages.
Non-Final Office Action received for U.S. Appl. No. 16/599,433, dated Jan. 28, 2021, 16 pages.
Notice of Allowance received for U.S. Appl. No. 16/733,718, dated Feb. 5, 2021, 14 pages.
Office Action received for Chinese Patent Application No. 202010287953.6, dated Jan. 14, 2021, 14 pages (7 pages of English Translation and 7 pages of Official Copy).
Office Action received for Chinese Patent Application No. 202010287958.9, dated Jan. 5, 2021, 16 pages (8 pages of English Translation and 8 pages of Official Copy).
Office Action received for Danish Patent Application No. PA201970593, dated Feb. 2, 2021, 2 pages.
Office Action received for Korean Patent Application No. 10-2021-7000954, dated Jan. 28, 2021, 5 pages (2 pages of English Translation and 3 pages of Official Copy).
Pre-Appeal Review Report received for Japanese Patent Application No. 2018-182607, mailed on Jan. 21, 2021, 4 pages (2 pages of English Translation and 2 pages of Official Copy).
Summons to Attend Oral Proceedings received for European Patent Application No. 19724959.2, mailed on Feb. 1, 2021,9 pages.
Applicant-Initiated Interview Summary received for U.S. Appl. No. 15/995,040, dated Dec. 23, 2019, 5 pages.
Certificate of Examination received for Australian Patent Application No. 2019100794, mailed on Dec. 19, 2019, 2 pages.
International Preliminary Report on Patentability received for PCT Patent Application No. PCT/US2018/015591, dated Dec. 19, 2019, 10 pages.
Notice of Acceptance received for Australian Patent Application No. 2018279787, dated Dec. 10, 2019, 3 pages.
Corrected Notice of Allowance received for U.S. Appl. No. 16/825,879, dated Jul. 23, 2021, 2 pages.
Corrected Notice of Allowance received for U.S. Appl. No. 16/835,651, dated Jul. 28, 2021, 4 pages.
Notice of Allowance received for Korean Patent Application No. 10-2021-7019525, dated Jul. 13, 2021, 5 pages (1 page of English Translation and 4 pages of Official Copy).
Notice of Allowance received for U.S. Appl. No. 16/271,583, dated Jul. 23, 2021, 6 pages.
Notice of Allowance received for U.S. Appl. No. 16/733,718, dated Jul. 29, 2021, 26 pages.
Notice of Allowance received for U.S. Appl. No. 16/835,651, dated Jul. 23, 2021, 8 pages.
Office Action received for Korean Patent Application No. 10-2021-7020693, dated Jul. 14, 2021, 7 pages (3 pages of English Translation and 4 pages of Official Copy).
Decision to Grant received for Japanese Patent Application No. 2020-070418, dated Feb. 8, 2021, 3 pages (1 page of English Translation and 2 pages of Official Copy).

(56) References Cited

OTHER PUBLICATIONS

Notice of Allowance received for Chinese Patent Application No. 201910692978.1, dated Feb. 4, 2021, 6 pages (3 pages of English Translation and 3 pages of Official Copy).
Notice of Allowance received for Chinese Patent Application No. 201911202668.3, dated Feb. 4, 2021, 5 pages (2 pages of English Translation and 3 pages of Official Copy).
Invitation to Pay Additional Fees received for PCT Patent Application No. PCT/US2021/034304, dated Aug. 20, 2021, 16 pages.
Notice of Allowance received for Chinese Patent Application No. 202010600151.6, dated Aug. 13, 2021, 2 pages (1 page of English Translation and 1 page of Official Copy).
Notice of Allowance received for Korean Patent Application No. 10-2021-7000954, dated Aug. 18, 2021, 5 pages (2 pages of English Translation and 3 pages of Official Copy).
Office Action received for Australian Patent Application No. 2021103004, dated Aug. 12, 2021, 5 pages.
Office Action received for Chinese Patent Application No. 202010287950.2, dated Aug. 10, 2021, 12 pages (6 pages of English Translation and 6 pages of Official Copy).
Office Action received for Chinese Patent Application No. 202011480411.7, dated Aug. 2, 2021, 12 pages (6 pages of English Translation and 6 pages of Official Copy).
Office Action received for Korean Patent Application No. 10-2020-7022663, dated Aug. 17, 2021, 11 pages (5 pages of English Translation and 6 pages of Official Copy).
Corrected Notice of Allowance received for U.S. Appl. No. 16/733,718, dated Nov. 17, 2021, 2 pages.
Corrected Notice of Allowance received for U.S. Appl. No. 17/190,879, dated Nov. 19, 2021, 2 pages.
Decision to Grant received for European Patent Application No. 16784025.5, dated Nov. 11, 2021, 2 pages.
International Preliminary Report on Patentability received for PCT Patent Application No. PCT/US2020/031643, dated Nov. 18, 2021, 27 pages.
Office Action received for Danish Patent Application No. PA201770719, dated Nov. 16, 2021, 2 pages.
Applicant-Initiated Interview Summary received for U.S. Appl. No. 16/584,100, dated Feb. 19, 2020, 3 pages.
Applicant-Initiated interview Summary received for U.S. Appl. No. 16/586,344, dated Feb. 27, 2020, 3 pages.
Corrected Notice of Allowance received for U.S. Appl. No. 16/582,595, dated Apr. 7, 2020, 5 pages.
Corrected Notice of Allowance received for U.S. Appl. No. 16/582,595, dated Apr. 22, 2020, 5 pages.
Corrected Notice of Allowance received for U.S. Appl. No. 16/583,020, dated Mar. 24, 2020, 2 pages.
Corrected Notice of Allowance received for U.S. Appl. No. 16/584,044, dated Apr. 16, 2020, 3 pages.
Corrected Notice of Allowance received for U.S. Appl. No. 16/584,044, dated Jan. 29, 2020, 3 pages.
Corrected Notice of Allowance received for U.S. Appl. No. 16/584,044, dated Mar. 4, 2020. 2 pages.
Corrected Notice of Allowance received for U.S. Appl. No. 16/584,100, dated Feb. 21, 2020, 9 pages.
Corrected Notice of Allowance received for U.S. Appl. No. 16/584,693, dated Feb. 21, 2020, 15 pages.
Corrected Notice of Allowance received for U.S. Appl. No. 16/584,693, dated Mar. 4, 2020, 2 pages.
Corrected Notice of Allowance received for U.S. Appl. No. 16/584,693, dated Mar. 20, 2020, 2 pages.
Corrected Notice of Allowance received for U.S. Appl. No. 16/586,314, dated Apr. 8, 2020, 5 pages.
Corrected Notice of Allowance received for U.S. Appl. No. 16/586,314, dated Mar. 4, 2020, 3 pages.
Corrected Notice of Allowance received for U.S. Appl. No. 16/586,344, dated Apr. 7, 2020, 4 pages.
Corrected Notice of Allowance received for U.S. Appl. No. 16/586,344, dated Jan. 23, 2020, 4 pages.
Corrected Notice of Allowance received for U.S. Appl. No. 16/586,344, dated Mar. 17, 2020, 4 pages.
Intention to Grant received for European Patent Application No. 18214698.5, dated Apr. 21, 2020, 8 pages.
Non-Final Office Action received for U.S. Appl. No. 16/271,583, dated May 6, 2020, 24 pages.
Non-Final Office Action received for U.S. Appl. No. 16/583,020, dated Nov. 14, 2019, 9 pages.
Notice of Allowance received for Chinese Patent Application No. 201780002533.5, dated Apr. 14, 2020, 2 pages (1 page of English Translation and 1 page of Official Copy).
Notice of Allowance received for Korean Patent Application No. 10-2019-7035478, dated Apr. 24, 2020, 4 pages (1 page of English Translation and 3 pages of Official Copy).
Notice of Allowance received for U.S. Appl. No. 16/582,595, dated Mar. 20, 2020, 9 pages.
Notice of Allowance received for U.S. Appl. No. 16/583,020, dated Apr. 1, 2020, 5 pages.
Notice of Allowance received for U.S. Appl. No. 16/583,020, dated Feb. 28, 2020, 5 pages.
Notice of Allowance received for U.S. Appl. No. 16/584,044, dated Mar. 30, 2020, 16 pages.
Notice of Allowance received for U.S. Appl. No. 16/584,044, dated Nov. 14, 2019, 13 pages.
Notice of Allowance received for U.S. Appl. No. 16/584,100, dated Apr. 8, 2020, 12 pages.
Notice of Allowance received for U.S. Appl. No. 16/584,100, dated Jan. 14, 2020, 13 pages.
Notice of Allowance received for U.S. Appl. No. 16/584,693, dated Jan. 15, 2020, 15 pages.
Notice of Allowance received for U.S. Appl. No. 16/584,693, dated May 4, 2020, 12 pages.
Notice of Allowance received for U.S. Appl. No. 16/586,314, dated Apr. 1, 2020, 8 pages.
Notice of Allowance received for U.S. Appl. No. 16/586,314, dated Jan. 9, 2020, 10 pages.
Notice of Allowance received for U.S. Appl. No. 16/586,344, dated Dec. 16, 2019, 12 pages.
Notice of Allowance received for U.S. Appl. No. 16/586,344, dated Mar. 27, 2020, 12 pages.
Office Action received for Danish Patent Application No. PA201970592, dated Mar. 2, 2020, 5 pages.
Office Action received for Danish Patent Application No. PA201970593, dated Apr. 16, 2020, 2 pages.
Office Action received for Danish Patent Application No. PA201970593, dated Mar. 10, 2020, 4 pages.
Office Action received for Danish Patent Application No. PA201970595, dated Mar. 10, 2020, 4 pages.
Office Action received for Danish Patent Application No. PA201970600, dated Mar. 9, 2020, 5 pages.
Office Action received for Danish Patent Application No. PA201970601, dated Jan. 31, 2020, 3 pages.
Office Action received for Danish Patent Application No. PA201970601, dated Nov. 11, 2019, 8 pages.
Office Action received for Danish Patent Application No. PA201970605, dated Mar. 10, 2020, 5 pages.
Office Action received for European Patent Application No. 18209460.7, dated Apr. 21, 2020, 5 pages.
Office Action received for European Patent Application No. 19724959.2, dated Apr. 23, 2020, 10 pages.
Search Report and Opinion received for Danish Patent Application No. PA201970592, dated Nov. 7, 2019, 8 pages.
Search Report and Opinion received for Danish Patent Application No. PA201970593, dated Oct. 29, 2019, 10 pages.
Search Report and Opinion received for Danish Patent Application No. PA201970595, dated Nov. 8, 2019, 16 pages.
Search Report and Opinion received for Danish Patent Application No. PA201970600, dated Nov. 5, 2019, 11 pages.
Search Report and Opinion received for Danish Patent Application No. PA201970603, dated Nov. 15, 2019, 9 pages.
Search Report and Opinion received for Danish Patent Application No. PA201970605, dated Nov. 12, 2019, 10 pages.

(56) References Cited

OTHER PUBLICATIONS

Decision to Grant received for European Patent Application No. 18214698.5, dated Sep. 10, 2020, 3 pages.
Extended European Search Report received for European Patent Application No. 20168009.7, dated Sep. 11, 2020, 12 pages.
Final Office Action received for U.S. Appl. No. 16/144,629, dated Sep. 11, 2020, 22 pages.
Non-Final Office Action received for U.S. Appl. No. 16/733,718, dated Sep. 16, 2020, 25 pages.
Office Action received for Chinese Patent Application No. 201811446867.4, dated Sep. 8, 2020, 9 pages (4 pages of English Translation and 5 pages of Official Copy).
Telleen et al., "Synthetic Shutter Speed Imaging", University of California, Santa Cruz, vol. 26, No. 3, 2007, 8 pages.
Tico et al., "Robust method of digital 1-15 image stabilization", Nokia Research Center, ISCCSP, Malta, Mar. 12-14, 2008, pp. 316-321.
Certificate of Examination received for Australian Patent Application No. 2020104220, dated Apr. 1, 2021, 2 pages.
Decision to Grant received for European Patent Application No. 18209460.7, dated Apr. 9, 2021, 2 pages.
Notice of Acceptance received for Australian Patent Application No. 2021201167, dated Mar. 15, 2021, 3 pages.
Notice of Allowance received for Korean Patent Application No. 10-2020-0052618, dated Mar. 23, 2021, 5 pages (2 page of English Translation and 3 pages of Official Copy).
Notice of Allowance received for Korean Patent Application No. 10-2020-7031855, dated Mar. 22, 2021, 5 pages (1 page of English Translation and 4 pages of Official Copy).
Notice of Allowance received for U.S. Appl. No. 16/271,583, dated Apr. 14, 2021, 6 pages.
Office Action received for Australian Patent Application No. 2019218241, dated Apr. 1, 2021, 3 pages.
Summons to Attend Oral Proceedings received for European Patent Application No. 19724959.2, mailed on Mar. 31, 2021, 3 pages.
Corrected Notice of Allowance received for U.S. Appl. No. 16/840,719, dated Jul. 8, 2021, 8 pages.
Decision to Grant received for Japanese Patent Application No. 2020-184470, dated Jul. 1, 2021, 3 pages (1 page of English Translation and 2 pages of Official Copy).
Decision to Grant received for Japanese Patent Application No. 2020-184471, dated Jul. 1, 2021, 3 pages (1 page of English Translation and 2 pages of Official Copy).
Decision to Grant received for Japanese Patent Application No. 2021-051385, dated Jul. 8, 2021, 3 pages (1 page of English Translation and 2 pages of Official Copy).
Examiner's Answer to Appeal Brief received for U.S. Appl. No. 16/144,629, dated Jul. 21, 2021, 21 pages.
Feng et al., "3D Direct Human-Computer Interface Paradigm Based on Free Hand Tracking", Chinese Journal of Computers, vol. 37, No. 6, Jun. 30, 2014, 15 pages (Official copy only) (See Communication under 37 CFR § 1.98(a) (3)).
Intention to Grant received for European Patent Application No. 16784025.5, dated Jul. 15, 2021, 8 pages.
Notice of Acceptance received for Australian Patent Application No. 2021203210, dated Jul. 9, 2021, 3 pages.
Notice of Allowance received for U.S. Appl. No. 16/825,879, dated Jul. 13, 2021, 9 pages.
Office Action received for Chinese Patent Application No. 202010601484.0, dated Jun. 3, 2021, 13 pages (6 pages of English Translation and 7 pages of Official Copy).
Applicant-Initiated Interview Summary received for U.S. Appl. No. 17/027,317, dated Dec. 21, 2020, 4 pages.
Corrected Notice of Allowance received for U.S. Appl. No. 16/835,651, dated Jun. 14, 2021, 2 pages.
Corrected Notice of Allowance received for U.S. Appl. No. 17/027,484, dated May 14, 2021, 5 pages.
Corrected Notice of Allowance received for U.S. Appl. No. 17/027,484, dated May 28, 2021, 5 pages.
Examiner's Answer to Appeal Brief received for U.S. Appl. No. 15/995,040, dated Jun. 23, 2021, 31 pages.
Intention to Grant received for Danish Patent Application No. PA202070611, dated May 5, 2021, 2 pages.
Minutes of the Oral Proceedings received for European Patent Application No. 19724959.2, mailed on Jun. 14, 2021, 6 pages.
Non-Final Office Action received for U.S. Appl. No. 17/027,317, dated Nov. 17, 2020, 17 pages.
Notice of Allowance received for U.S. Appl. No. 17/027,317, dated Apr. 12, 2021, 7 pages.
Notice of Allowance received for U.S. Appl. No. 17/027,317, dated Jan. 13, 2021, 10 pages.
Notice of Allowance received for U.S. Appl. No. 17/027,484, dated May 3, 2021, 11 pages.
Office Action received for Danish Patent Application No. PA202070611, dated Dec. 22, 2020, 7 pages.
Office Action received for European Patent Application No. 21163791.3, dated Jun. 2, 2021, 8 pages.
Office Action received for Japanese Patent Application No. 2020-184470, dated May 10, 2021, 3 pages (1 page of English Translation and 2 pages of Official Copy).
Office Action received for Chinese Patent Application No. 201811446867.4, dated Dec. 31, 2019, 12 pages (5 pages of English Translation and 7 pages of Official Copy).
Office Action received for Chinese Patent Application No. 201811512767.7, dated Dec. 20, 2019, 14 pages (7 pages of English Translation and 7 pages of Official Copy).
Office Action received for Danish Patent Application No. PA201770719, dated Jan. 17, 2020, 4 pages.
Office Action received for European Patent Application 17809168.2, dated Jan. 7, 2020, 5 pages.
Office Action received for Korean Patent Application No. 10-2019-7035478, dated Jan. 17, 2020, 17 pages (9 pages of English Translation and 8 pages of Official Copy).
"Nikon Digital Camera D7200 User's Manual", Online available at: https://download.nikonimglib.com/archive3/dbHI400jWws903mGr6q98a4k8F90/D7200UM_SG(En)05.pdf, 2005, 416 pages.
Notice of Allowance received for U.S. Appl. No. 16/599,433, dated Oct. 4, 2021, 13 pages.
Office Action received for Australian Patent Application No. 2020239717, dated Sep. 28, 2021, 6 pages.
Office Action received for Indian Patent Application No. 201817024430, dated Sep. 27, 2021, 8 pages.
Office Action received for Japanese Patent Application No. 2020-542592, dated Sep. 21, 2021, 5 pages (3 pages of English Translation and 2 pages of Official Copy).
Certificate of Examination received for Australian Patent Application No. 2021103004, dated Sep. 13, 2021, 2 pages.
Notice of Allowance received for U.S. Appl. No. 16/825,879, dated Sep. 28, 2021, 8 pages.
Office Action received for European Patent Application No. 20168009.7, dated Sep. 13, 2021, 8 pages.
Office Action received for Japanese Patent Application No. 2018-182607, dated Sep. 8, 2021, 7 pages (4 pages of English Translation and 3 pages of Official Copy).
Office Action received for Chinese Patent Application No. 201910692978.1, dated Apr. 3, 2020, 19 pages (8 pages of English Translation and 11 pages of Official Copy).
Notice of Allowance received for U.S. Appl. No. 16/835,651, dated Nov. 10, 2021, 9 pages.
Notice of Allowance received for U.S. Appl. No. 17/190,879, dated Nov. 10, 2021, 8 pages.
Office Action received for Japanese Patent Application No. 2019-566087, dated Oct. 18, 2021, 10 pages (6 pages of English Translation and 4 pages of Official Copy).
Applicant-Initiated Interview Summary received for U.S. Appl. No. 16/528,941, dated Jun. 19, 2020, 3 pages.
Decision to Refuse received for European Patent Application No. 17184710.6, dated Jun. 16, 2020, 9 pages.
Office Action received for Chinese Patent Application No. 201811512767.7, dated Jun. 4, 2020, 6 pages (3 pages of English Translation and 3 pages of Official Copy).

(56) References Cited

OTHER PUBLICATIONS

Result of Consultation received for European Patent Application No. 19724959.2, dated Sep. 4, 2020, 3 pages.
Applicant-Initiated Interview Summary received for U.S. Appl. No. 17/220,596, dated Aug. 18, 2021, 3 pages.
Corrected Notice of Allowance received for U.S. Appl. No. 17/220,596, dated Nov. 4, 2021, 3 pages.
Corrected Notice of Allowance received for U.S. Appl. No. 17/220,596, dated Nov. 18, 2021, 27 pages.
Decision on Appeal received for U.S. Appl. No. 15/995,040, dated Dec. 29, 2021, 14 pages.
Examiner-Initiated Interview Summary received for U.S. Appl. No. 17/220,596, dated Oct. 7, 2021, 2 pages.
Extended European Search Report received for European Patent Application No. 21202358.4, dated Dec. 6, 2021, 8 pages.
King, Julie A., "How to Check the Exposure Meter on Your Nikon D5500", Online available at: https://www.dummies.com/article/home-auto-hobbies/photography/how-to-check-the-exposuremeter-on-your-nikon-d5500-142677, Mar. 26, 2016, 6 pages.
Non-Final Office Action received for U.S. Appl. No. 17/220,596, dated Jun. 10, 2021, 31 pages.
Notice of Allowance received for U.S. Appl. No. 17/220,596, dated Oct. 21, 2021, 43 pages.
Office Action received for Australian Patent Application No. 2020239717, dated Dec. 15, 2021, 6 pages.
Office Action received for Chinese Patent Application No. 202010287950.2, dated Nov. 19, 2021, 8 pages (5 pages of English Translation and 3 pages of Official Copy).
Office Action received for Indian Patent Application No. 202014041530, dated Dec. 8, 2021, 7 pages.
Office Action received for Korean Patent Application No. 10-2021-7036337, dated Dec. 8, 2021, 6 pages (2 pages of English Translation and 4 pages of Official Copy).
Whitacre, Michele, "Photography 101 | Exposure Meter", Online available at: https://web.archive.org/web/20160223055834/http://www.michelewhitacrephotographyblog.com, Feb. 23, 2016, 4 pages.
Final Office Action received for U.S. Appl. No. 15/995,040, dated Sep. 2, 2020, 21 pages.
Final Office Action received for U.S. Appl. No. 16/271,583, dated Aug. 26, 2020, 18 pages.
Notice of Acceptance received for Australian Patent Application No. 2019213341, dated Aug. 25, 2020, 3 pages.
Office Action received for Australian Patent Application No. 2020100720, dated Sep. 1, 2020, 5 pages.
Office Action received for Chinese Patent Application No. 201911202668.3, dated Aug. 4, 2020, 13 pages (7 pages of English Translation and 6 pages of Official Copy).
Office Action received for Japanese Patent Application No. 2018-225131, dated Aug. 17, 2020, 21 pages (6 pages of English Translation and 15 pages of Official Copy).
Office Action received for Japanese Patent Application No. 2018-545502, dated Aug. 17, 2020, 14 pages (6 pages of English Translation and 8 pages of Official Copy).
Office Action received for Japanese Patent Application No. 2020-070418, dated Aug. 3, 2020, 22 pages (14 pages of English Translation and 8 pages of Official Copy).
Office Action received for Korean Patent Application No. 10-2020-0052618, dated Aug. 18, 2020, 11 pages (5 pages of English Translation and 6 pages of Official Copy).

* cited by examiner

DISPLAYING AND EDITING IMAGES WITH DEPTH INFORMATION

CROSS-REFERENCE TO RELATED APPLICATIONS

This application claims priority to U.S. Provisional Application No. 62/739,131 filed Sep. 28, 2018, entitled "DISPLAYING AND EDITING IMAGES WITH DEPTH INFORMATION", the content of which is hereby incorporated by reference in its entirety.

FIELD

The present disclosure relates generally to computer user interfaces, and more specifically to techniques for displaying and editing images with depth information.

BACKGROUND

Users are increasingly using electronic devices to display and edit images. Most electronic devices are capable of displaying a static image for viewing. As an example, some electronic devices provide interactive interfaces to display and edit images.

BRIEF SUMMARY

Some techniques for displaying and editing images using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for displaying and editing images. Such methods and interfaces optionally complement or replace other methods for displaying and editing images. Such methods and interfaces reduce the cognitive burden on a user and produce a more efficient human-machine interface. For battery-operated computing devices, such methods and interfaces conserve power and increase the time between battery charges.

In some embodiments, a method is performed at an electronic device with a display. The method includes: receiving a request to display an image that includes a subject, wherein image data associated with the image includes depth information associated with the subject; in response to the request: displaying a first modified image on the display, wherein displaying the first modified image includes displaying, based on the depth information, a first level of simulated lighting on a first portion of the subject and a second level of simulated lighting on a second portion of the subject, the first level being greater than the second level; and subsequent to displaying the first modified image, displaying a second modified image, wherein displaying the second modified image includes displaying, based on the depth information, a third level of simulated lighting on the first portion of the subject and a fourth level of simulated lighting on the second portion of the subject, the fourth level being greater than the second level.

In some embodiments, a non-transitory computer-readable storage medium stores one or more programs configured to be executed by one or more processors of an electronic device with a display. The one or more programs include instructions for: receiving a request to display an image that includes a subject, wherein image data associated with the image includes depth information associated with the subject; in response to the request: displaying a first modified image on the display, wherein displaying the first modified image includes displaying, based on the depth information, a first level of simulated lighting on a first portion of the subject and a second level of simulated lighting on a second portion of the subject, the first level being greater than the second level; and subsequent to displaying the first modified image, displaying a second modified image, wherein displaying the second modified image includes displaying, based on the depth information, a third level of simulated lighting on the first portion of the subject and a fourth level of simulated lighting on the second portion of the subject, the fourth level being greater than the second level.

In some embodiments, a transitory computer-readable storage medium stores one or more programs configured to be executed by one or more processors of an electronic device with a display. The one or more programs include instructions for: receiving a request to display an image that includes a subject, wherein image data associated with the image includes depth information associated with the subject; in response to the request: displaying a first modified image on the display, wherein displaying the first modified image includes displaying, based on the depth information, a first level of simulated lighting on a first portion of the subject and a second level of simulated lighting on a second portion of the subject, the first level being greater than the second level; and subsequent to displaying the first modified image, displaying a second modified image, wherein displaying the second modified image includes displaying, based on the depth information, a third level of simulated lighting on the first portion of the subject and a fourth level of simulated lighting on the second portion of the subject, the fourth level being greater than the second level.

In some embodiments, an electronic device includes a display, one or more processors, and memory. The memory stores one or more programs configured to be executed by the one or more processors. The one or more programs including instructions for: receiving a request to display an image that includes a subject, wherein image data associated with the image includes depth information associated with the subject; in response to the request: displaying a first modified image on the display, wherein displaying the first modified image includes displaying, based on the depth information, a first level of simulated lighting on a first portion of the subject and a second level of simulated lighting on a second portion of the subject, the first level being greater than the second level; and subsequent to displaying the first modified image, displaying a second modified image, wherein displaying the second modified image includes displaying, based on the depth information, a third level of simulated lighting on the first portion of the subject and a fourth level of simulated lighting on the second portion of the subject, the fourth level being greater than the second level.

In some embodiments, an electronic device includes: a display; means for receiving a request to display an image that includes a subject, wherein image data associated with the image includes depth information associated with the subject; means for, in response to the request: displaying a first modified image on the display, wherein displaying the first modified image includes displaying, based on the depth information, a first level of simulated lighting on a first portion of the subject and a second level of simulated lighting on a second portion of the subject, the first level being greater than the second level; and subsequent to displaying the first modified image, displaying a second modified image, wherein displaying the second modified image includes displaying, based on the depth information, a third level of simulated lighting on the first portion of the subject and a fourth level of simulated lighting on the second portion of the subject, the fourth level being greater than the second level.

In some embodiments, a method is performed at an electronic device with a display. The method includes: displaying, on the display, an image including a plurality of elements, wherein the plurality of elements are associated with depth information that specifies different depths for different elements in the plurality of elements; while displaying the image on the display, receiving a request to edit a portion of the image; and in response to receiving the request to edit the portion of the image, modifying, based on the depth information, visual characteristics of one or more elements of the plurality of elements in a first depth range without modifying visual characteristics of elements that are not in the first depth range.

In some embodiments, a non-transitory computer-readable storage medium stores one or more programs configured to be executed by one or more processors of an electronic device with a display. The one or more programs include instructions for: displaying, on the display, an image including a plurality of elements, wherein the plurality of elements are associated with depth information that specifies different depths for different elements in the plurality of elements; while displaying the image on the display, receiving a request to edit a portion of the image; and in response to receiving the request to edit the portion of the image, modifying, based on the depth information, visual characteristics of one or more elements of the plurality of elements in a first depth range without modifying visual characteristics of elements that are not in the first depth range.

In some embodiments, a transitory computer-readable storage medium stores one or more programs configured to be executed by one or more processors of an electronic device with a display. The one or more programs include instructions for: displaying, on the display, an image including a plurality of elements, wherein the plurality of elements are associated with depth information that specifies different depths for different elements in the plurality of elements; while displaying the image on the display, receiving a request to edit a portion of the image; and in response to receiving the request to edit the portion of the image, modifying, based on the depth information, visual characteristics of one or more elements of the plurality of elements in a first depth range without modifying visual characteristics of elements that are not in the first depth range.

In some embodiments, an electronic device includes a display, one or more processors, and memory. The memory stores one or more programs configured to be executed by the one or more processors. The one or more programs including instructions for: displaying, on the display, an image including a plurality of elements, wherein the plurality of elements are associated with depth information that specifies different depths for different elements in the plurality of elements; while displaying the image on the display, receiving a request to edit a portion of the image; and in response to receiving the request to edit the portion of the image, modifying, based on the depth information, visual characteristics of one or more elements of the plurality of elements in a first depth range without modifying visual characteristics of elements that are not in the first depth range.

In some embodiments, an electronic device includes: a display; means displaying, on the display, an image including a plurality of elements, wherein the plurality of elements are associated with depth information that specifies different depths for different elements in the plurality of elements; means for, while displaying the image on the display, receiving a request to edit a portion of the image; and means for, in response to receiving the request to edit the portion of the image, modifying, based on the depth information, visual characteristics of one or more elements of the plurality of elements in a first depth range without modifying visual characteristics of elements that are not in the first depth range.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying and editing images with depth information, thereby increasing the effectiveness, efficiency, and user satisfaction with such devices. Such methods and interfaces may complement or replace other methods for displaying and editing images.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
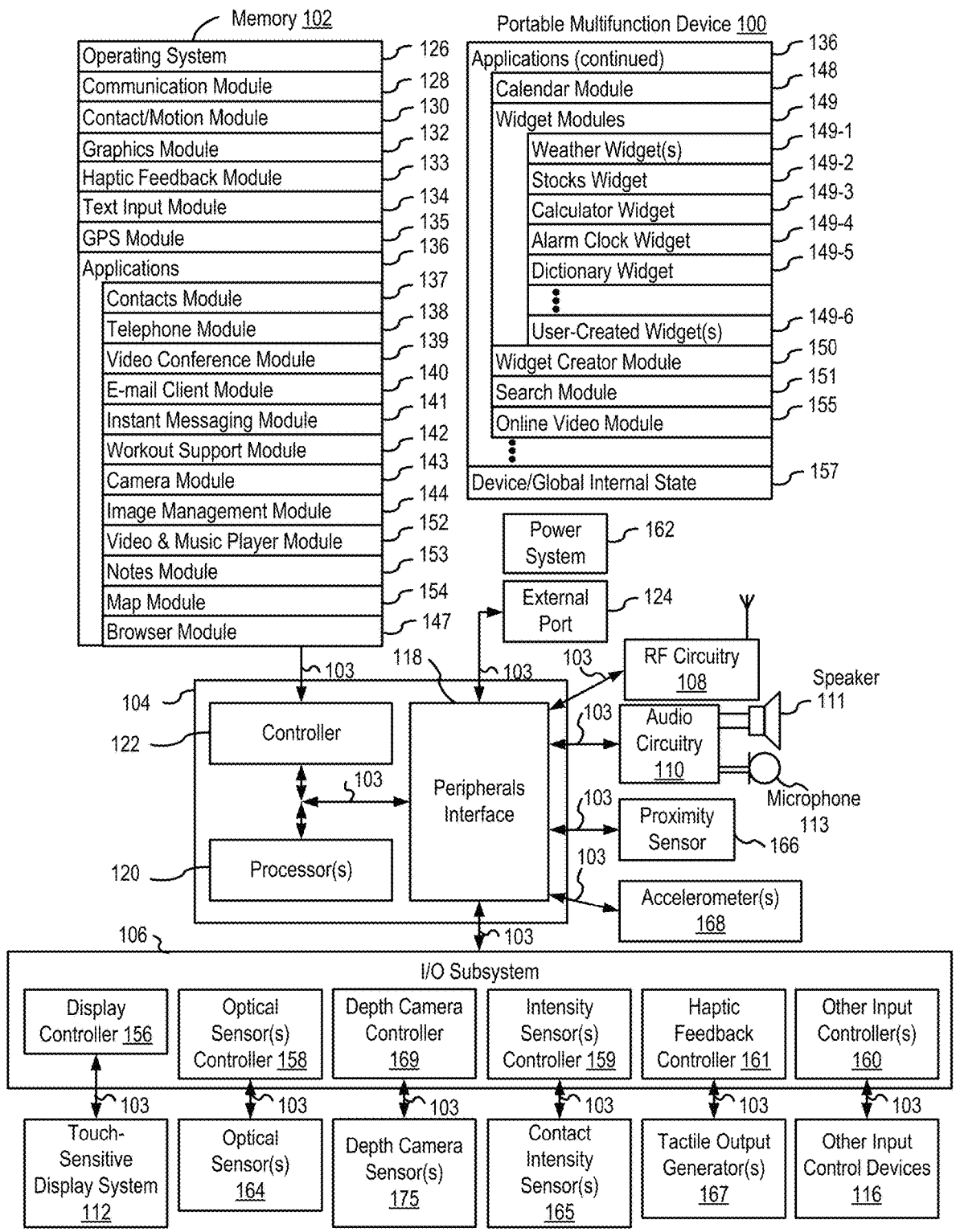
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying and editing images with depth information. Such techniques can reduce the cognitive burden on a user who views or edits the images with depth information, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for displaying and editing images with depth information. FIGS. 6A-6D illustrate an exemplary technique for applying simulated lighting to images with depth information. FIGS. 7A-7J illustrate exemplary user interfaces for displaying images with depth information. FIG. 8 is a flow diagram illustrating methods of displaying images with depth information in accordance with some embodiments. The user interfaces in FIGS. 7A-7J are used to illustrate the processes described below, including the processes in FIG. 8. FIGS. 9A-9K illustrate exemplary user interfaces for editing images with depth information. FIG. 10 is a flow diagram illustrating methods of editing images with depth information in accordance with some embodiments. The user interfaces in FIGS. 9A-9K are used to illustrate the processes described below, including the processes in FIG. 10.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaining application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface: One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300) These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser.

No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
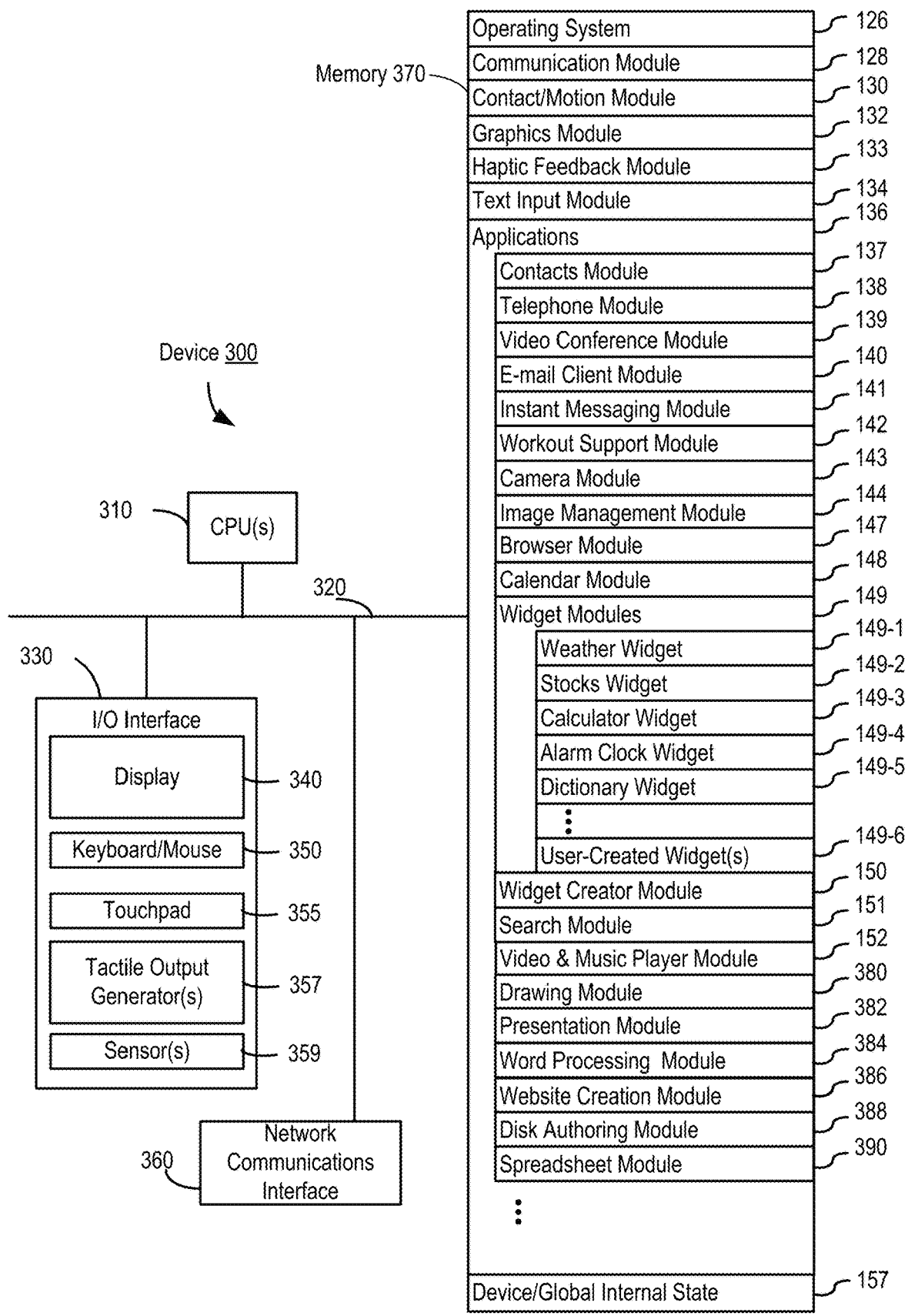
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation ofa predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
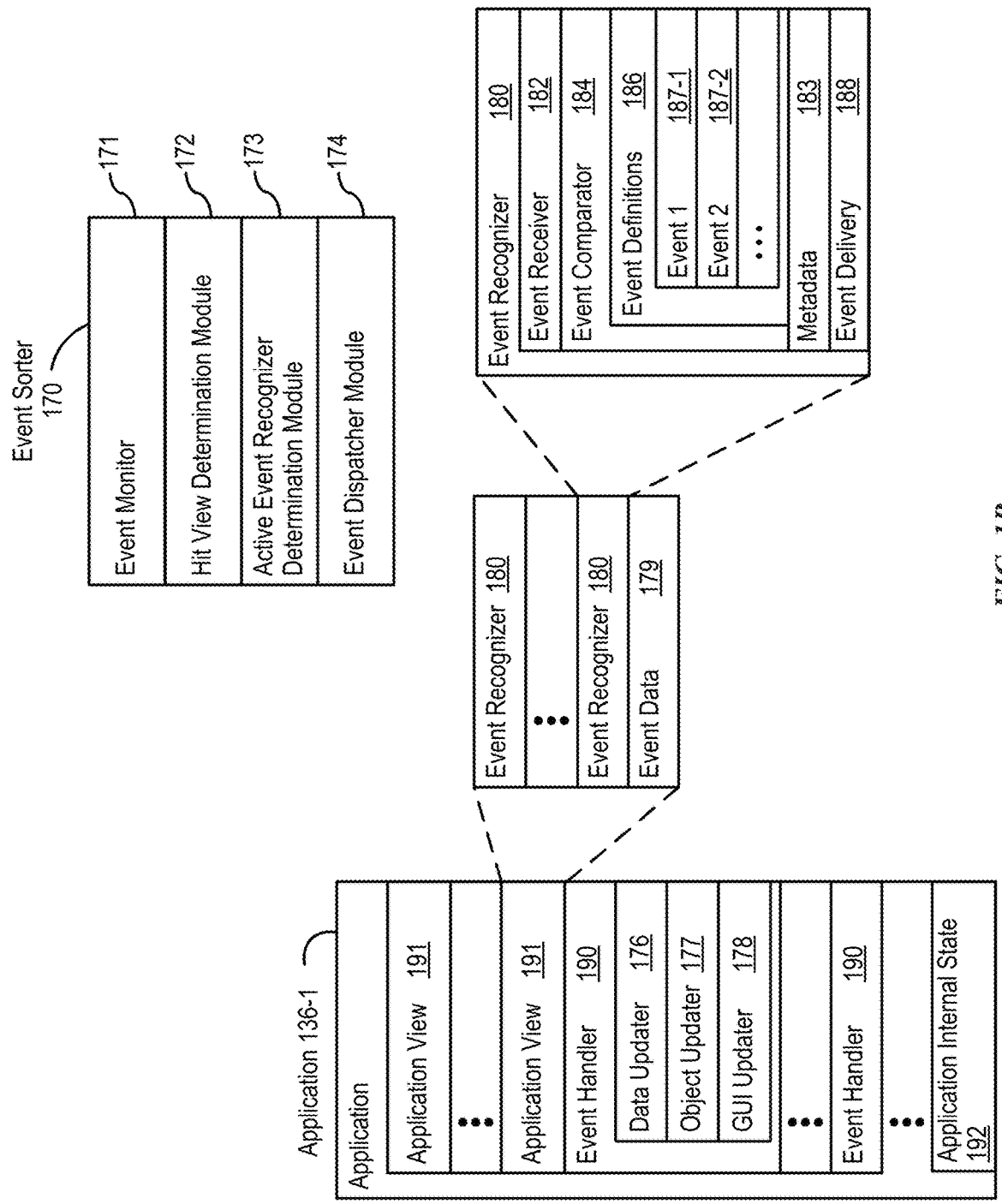
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
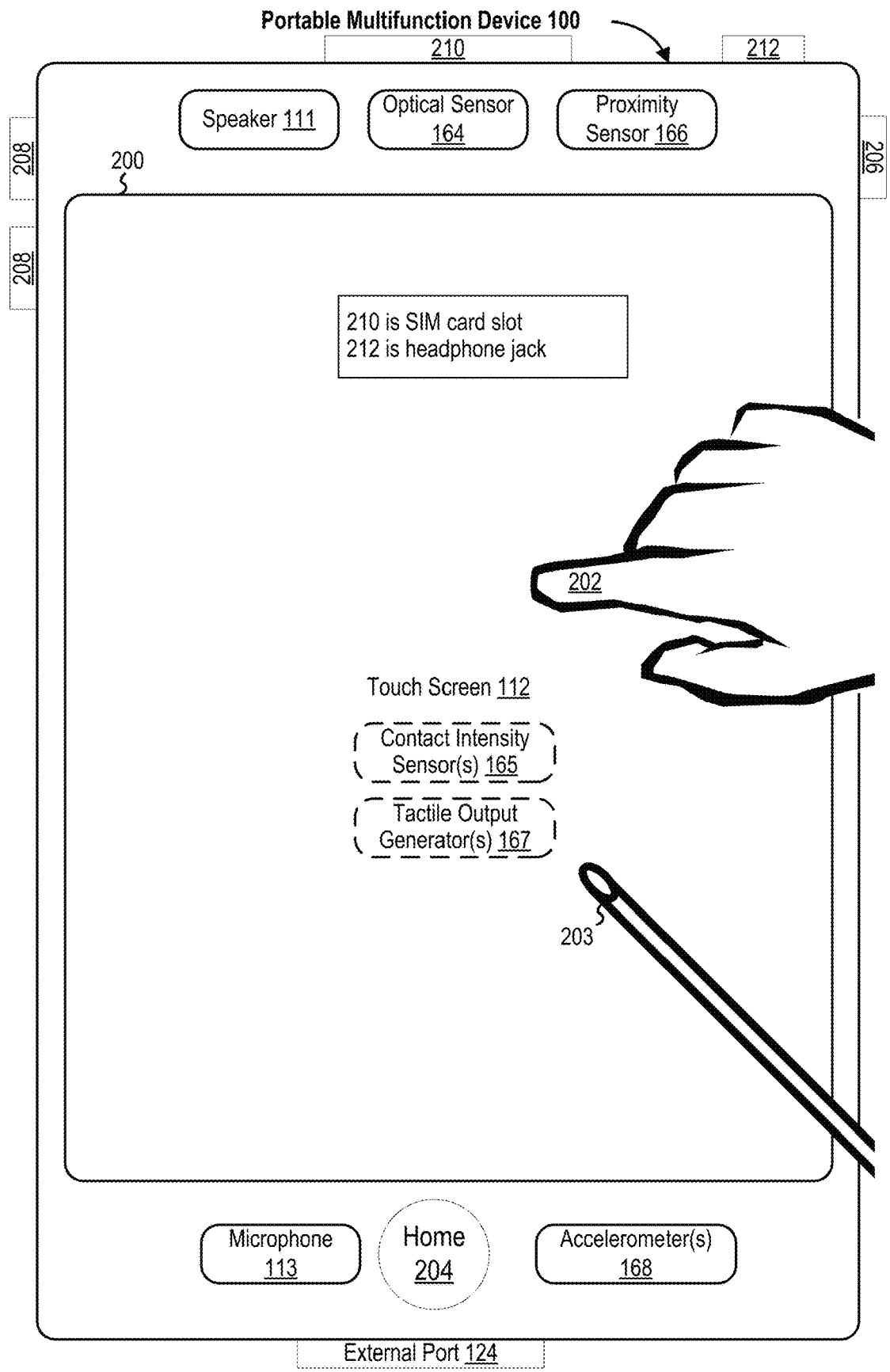
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
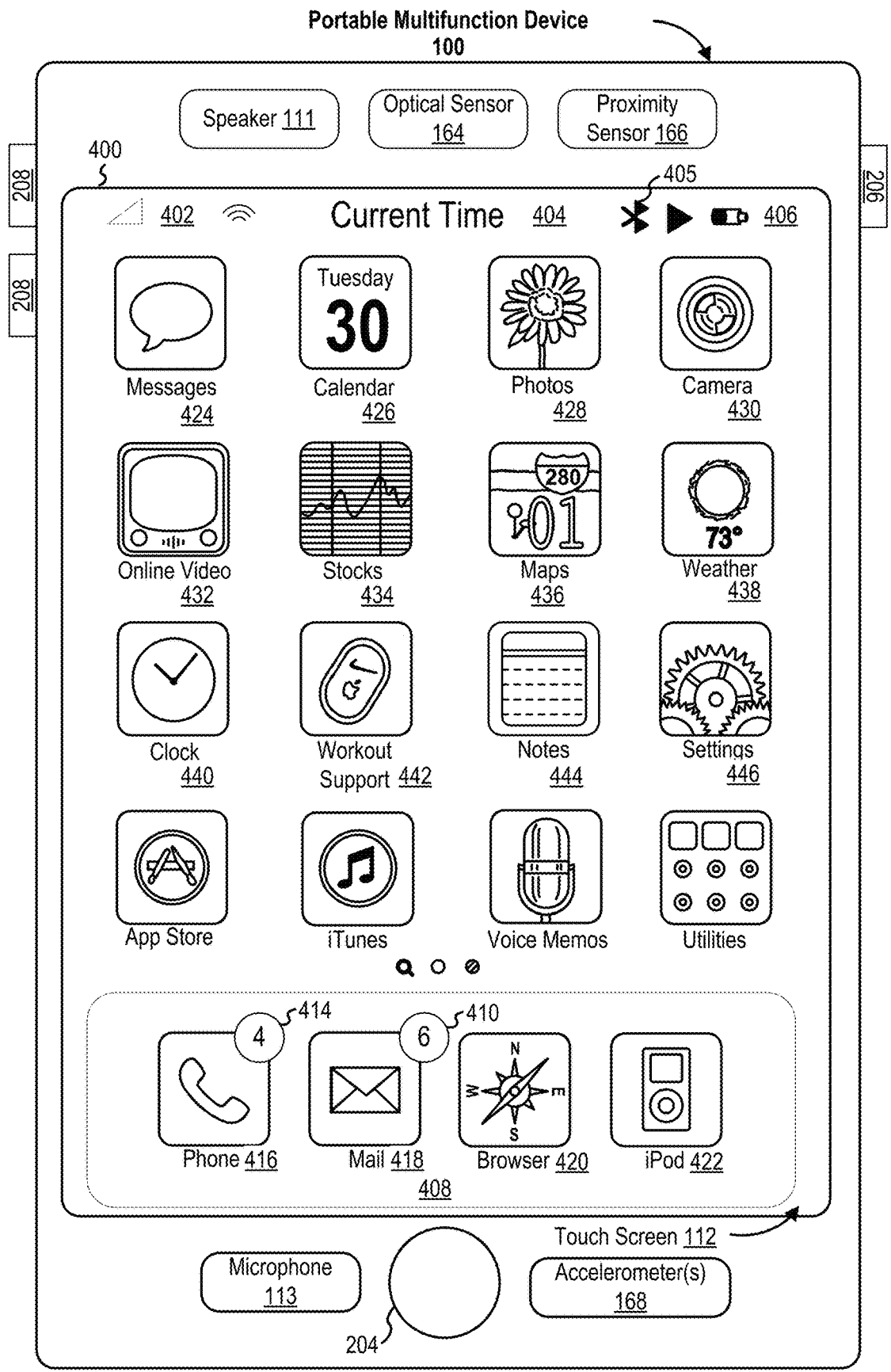
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages,
  Icon 418 for e-mail client module 140, labeled "Mail," which optionally includes an indicator 410 of the number of unread e-mails;
  Icon 420 for browser module 147, labeled "Browser," and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock,"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
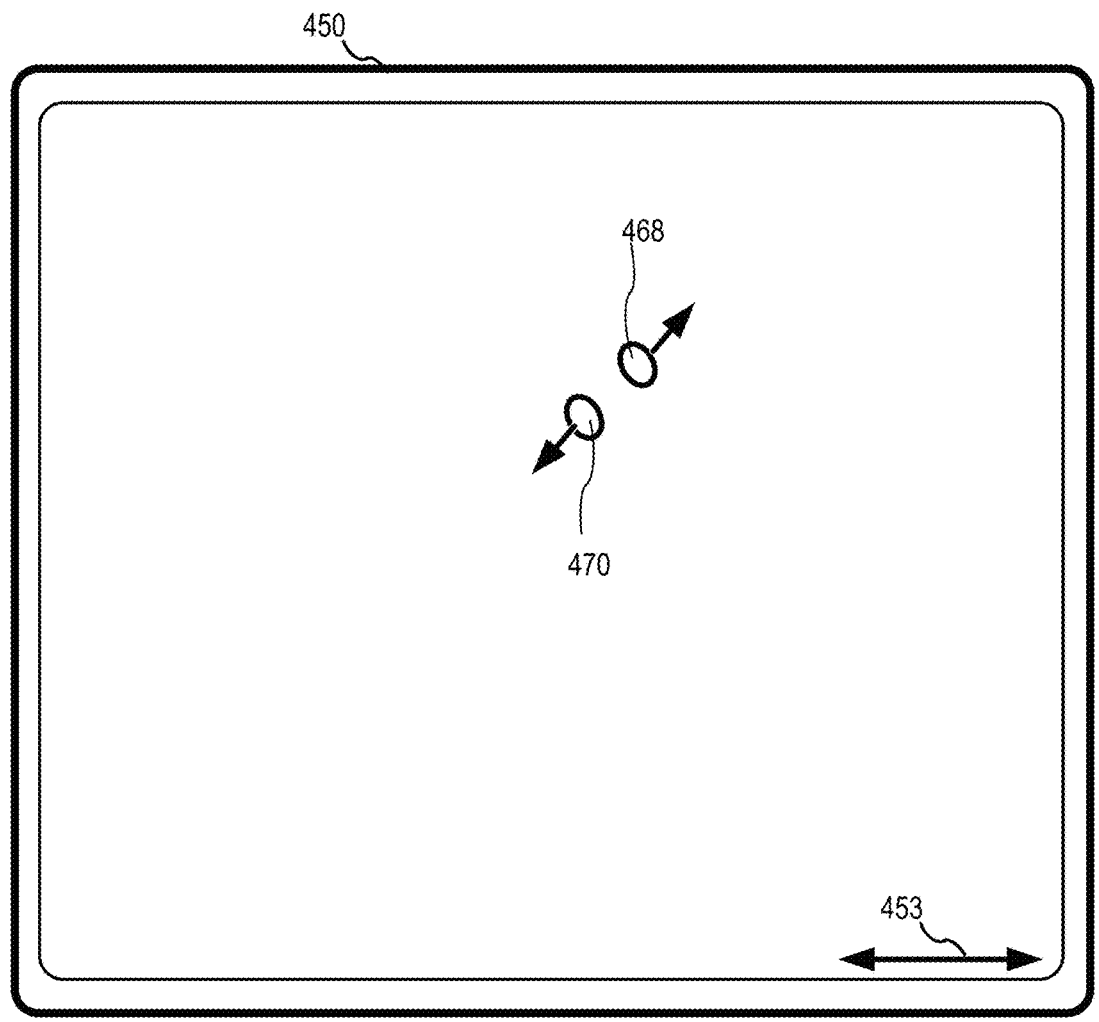
FIG. 4B illustrates an exemplary user interface for a multifunction device with a touch-sensitive surface that is separate from the display in accordance with some embodiments.
Figure 4B:
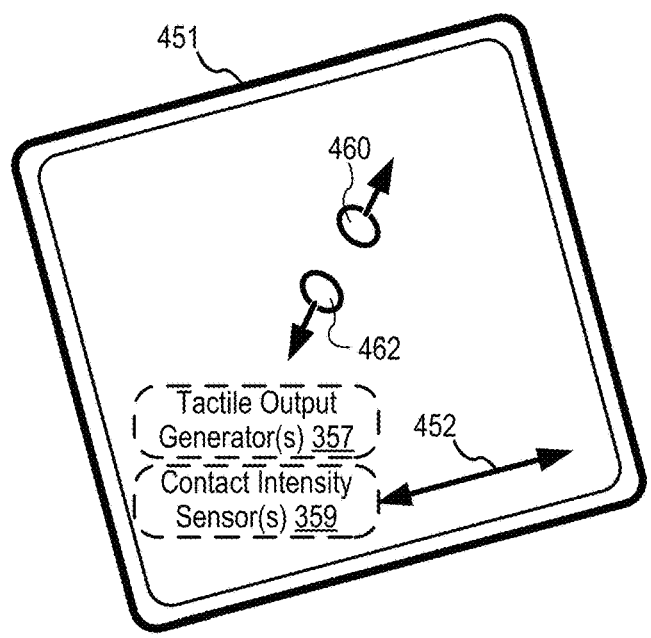

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
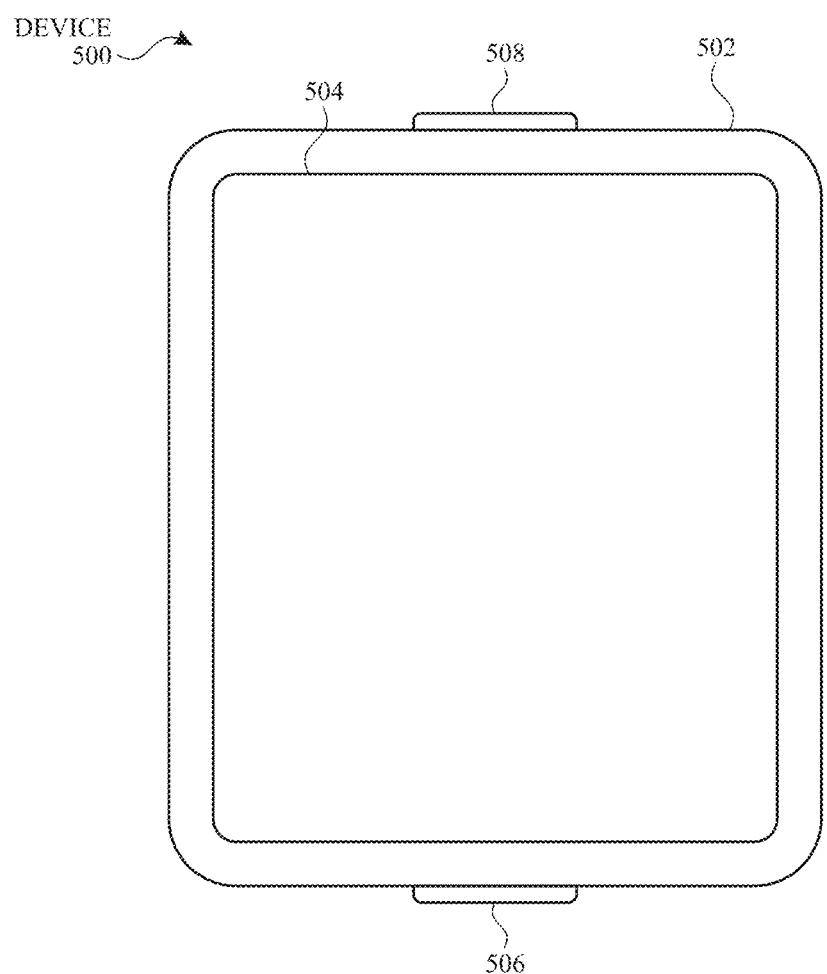
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
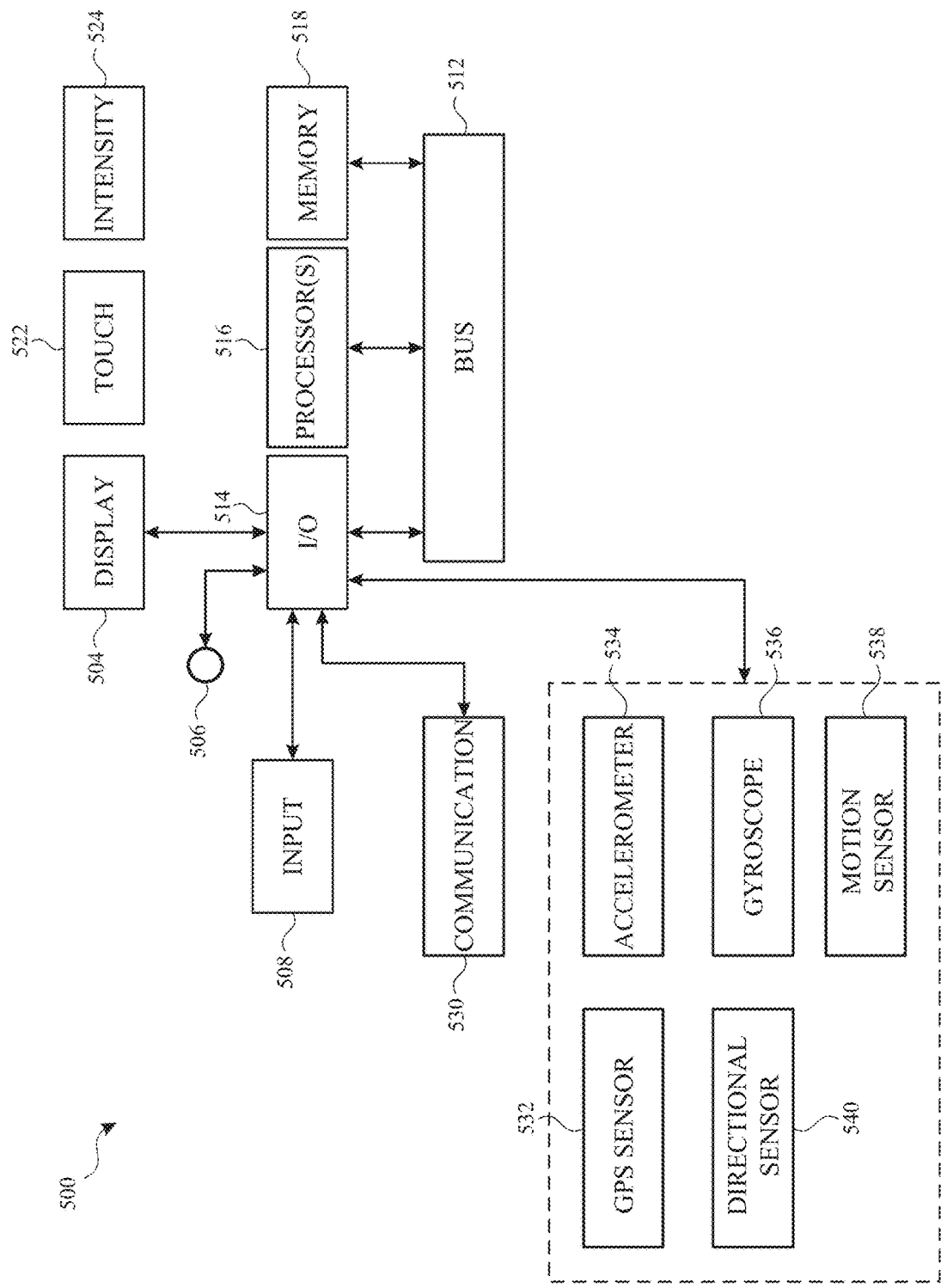
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800 and 1000 (FIGS. 8 and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
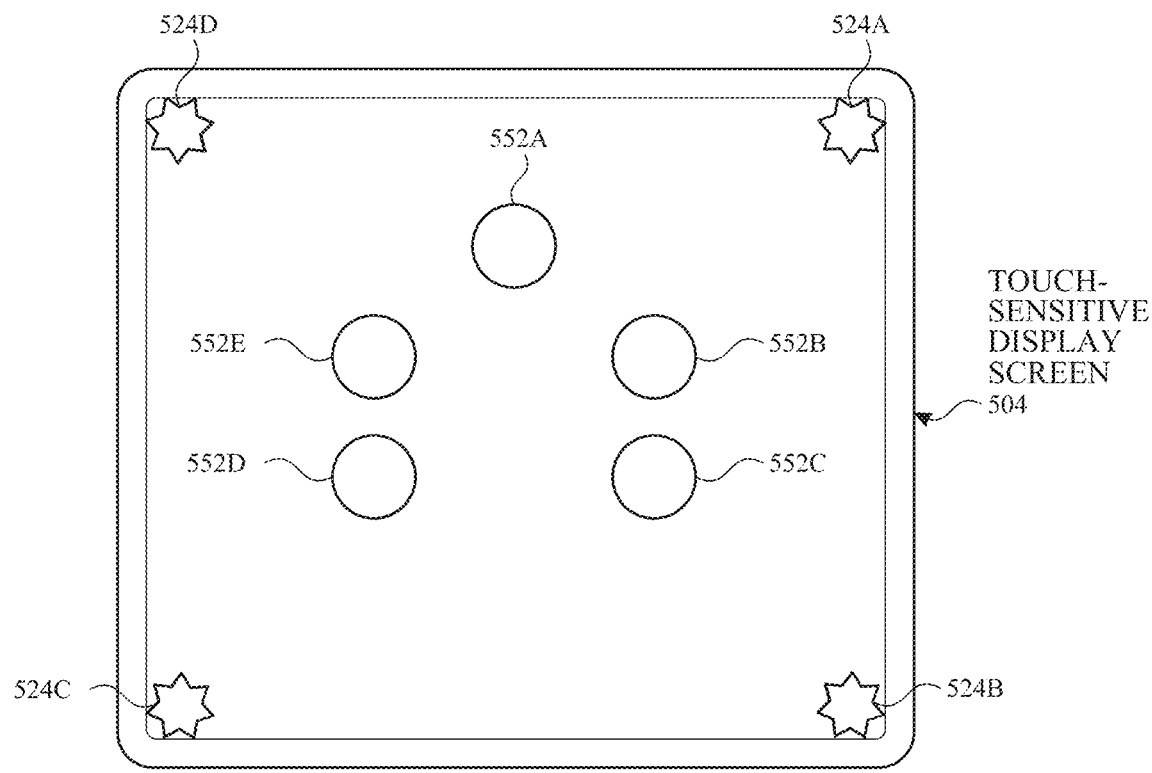
FIGS. 5C-5D illustrate exemplary components of a personal electronic device having a touch-sensitive display and intensity sensors in accordance with some embodiments.
Figure 5C:
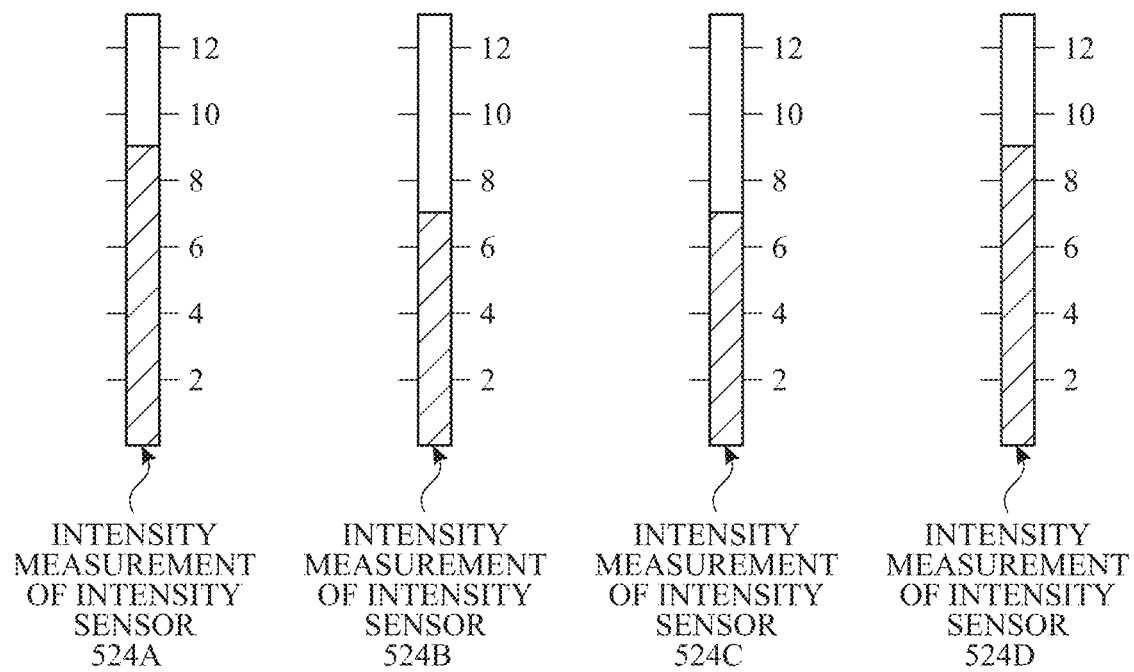
Figure 5D:
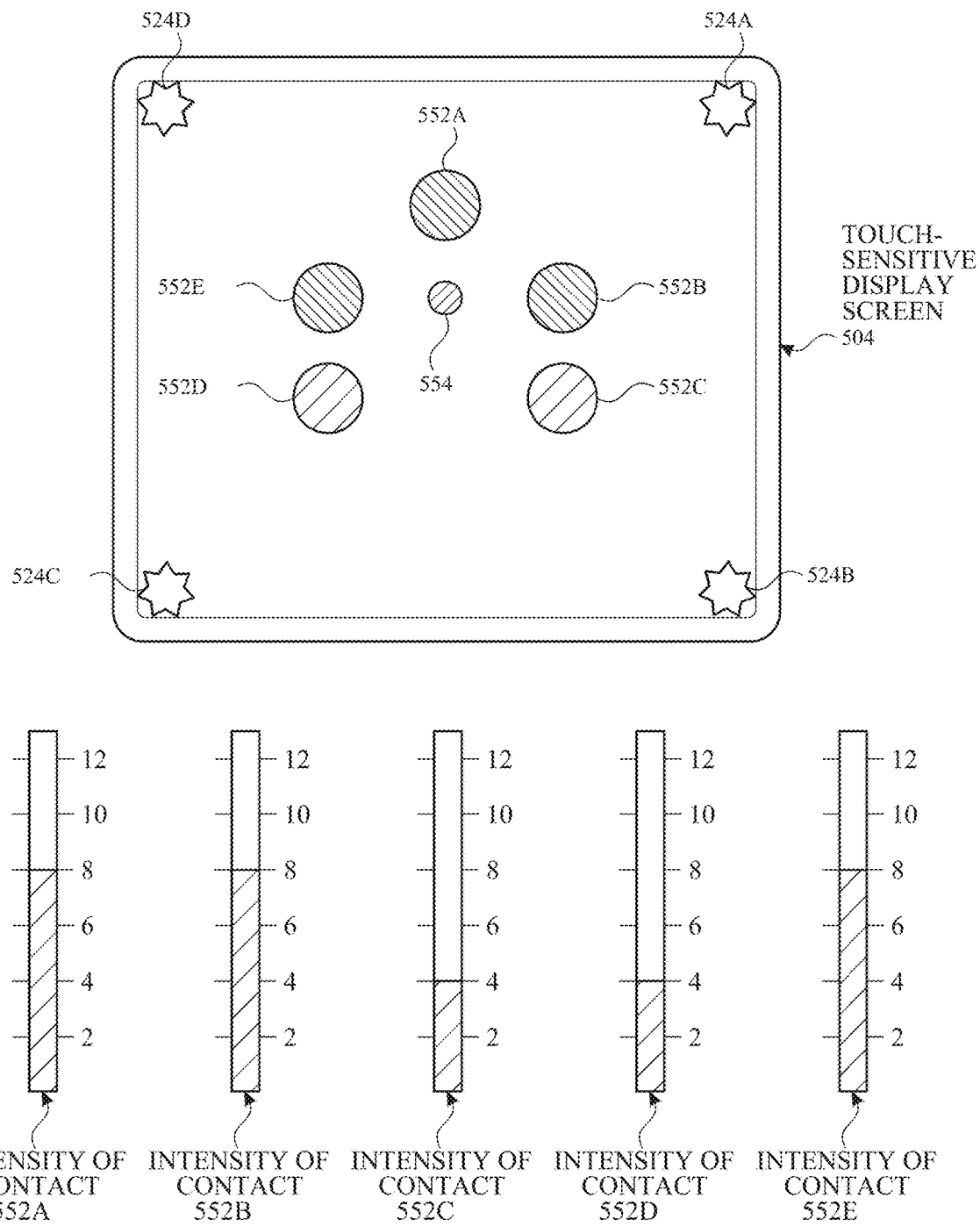

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
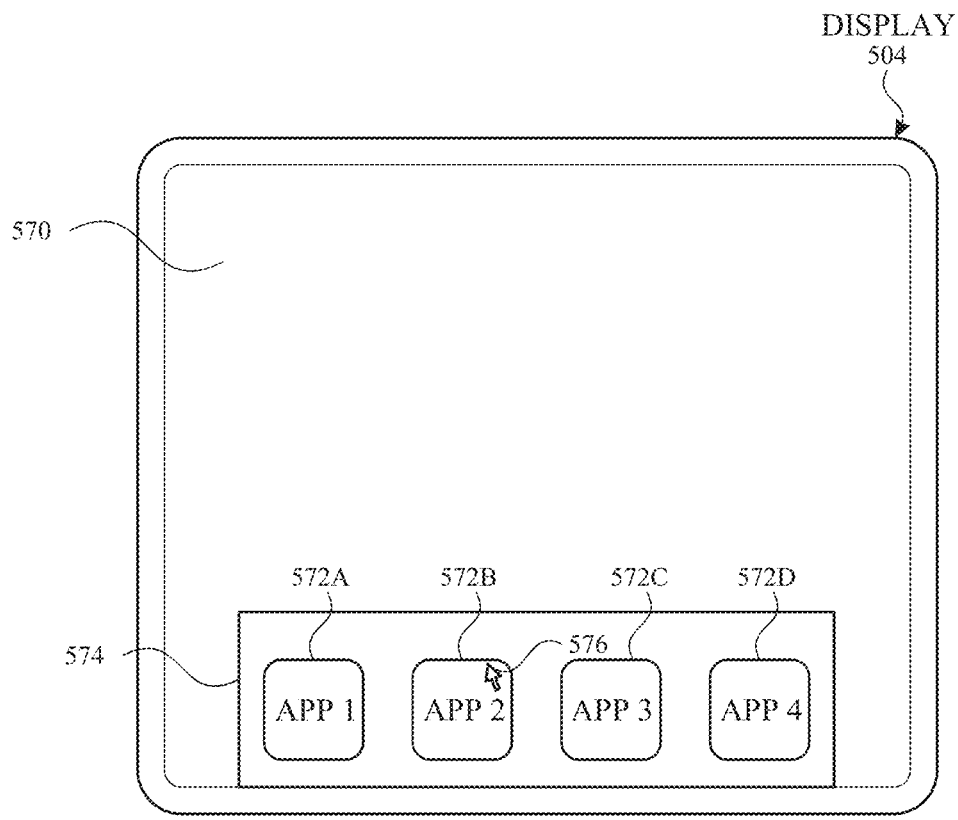
FIGS. 5E-5H illustrate exemplary components and user interfaces of a personal electronic device in accordance with some embodiments.
Figure 5E:
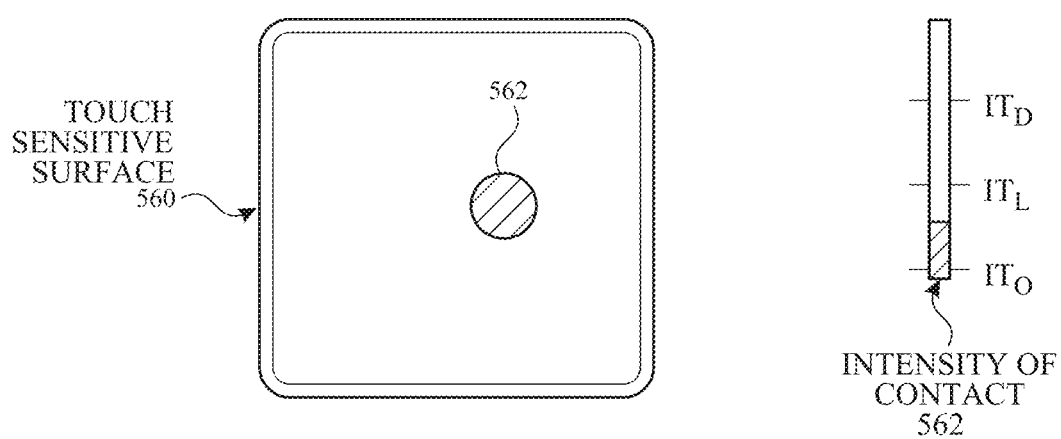
Figure 5F:
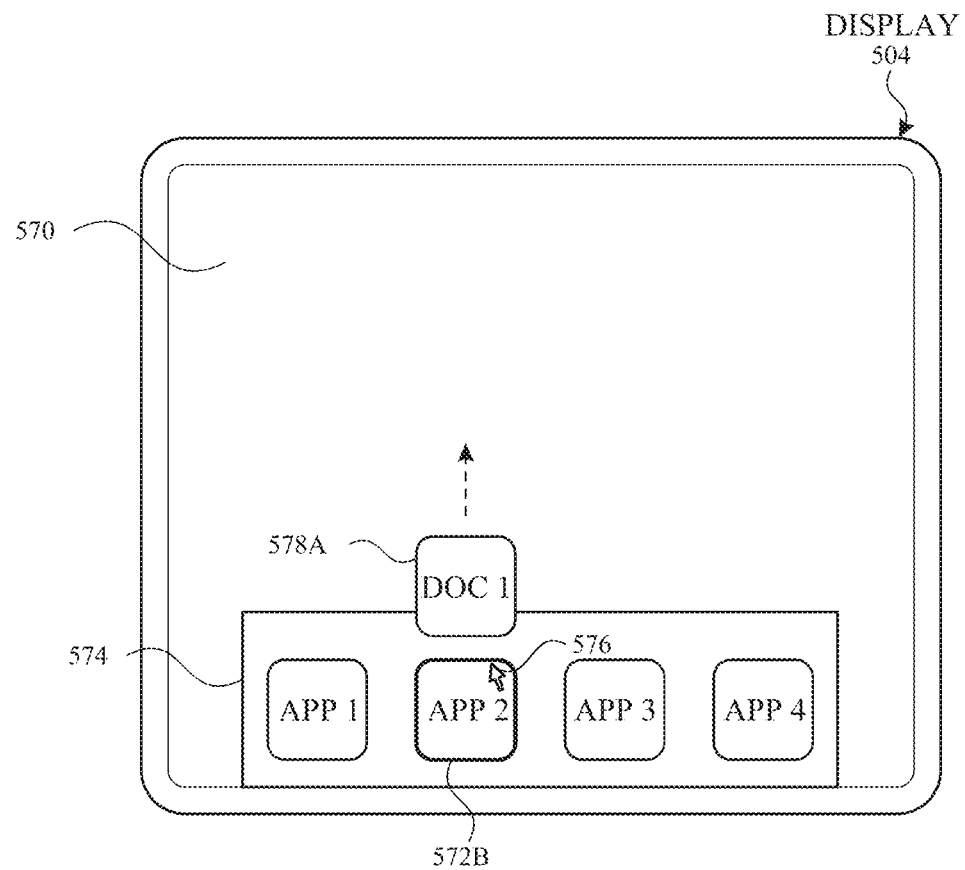
Figure 5F:
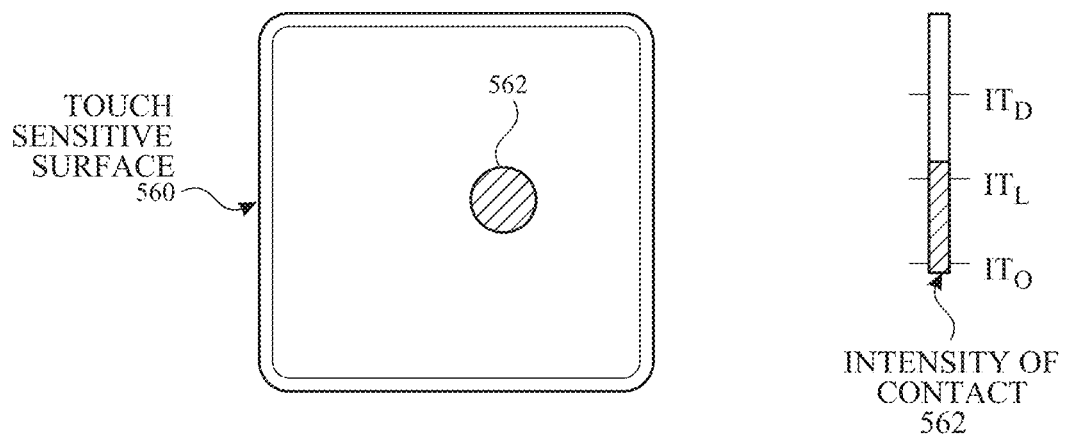
Figure 5G:
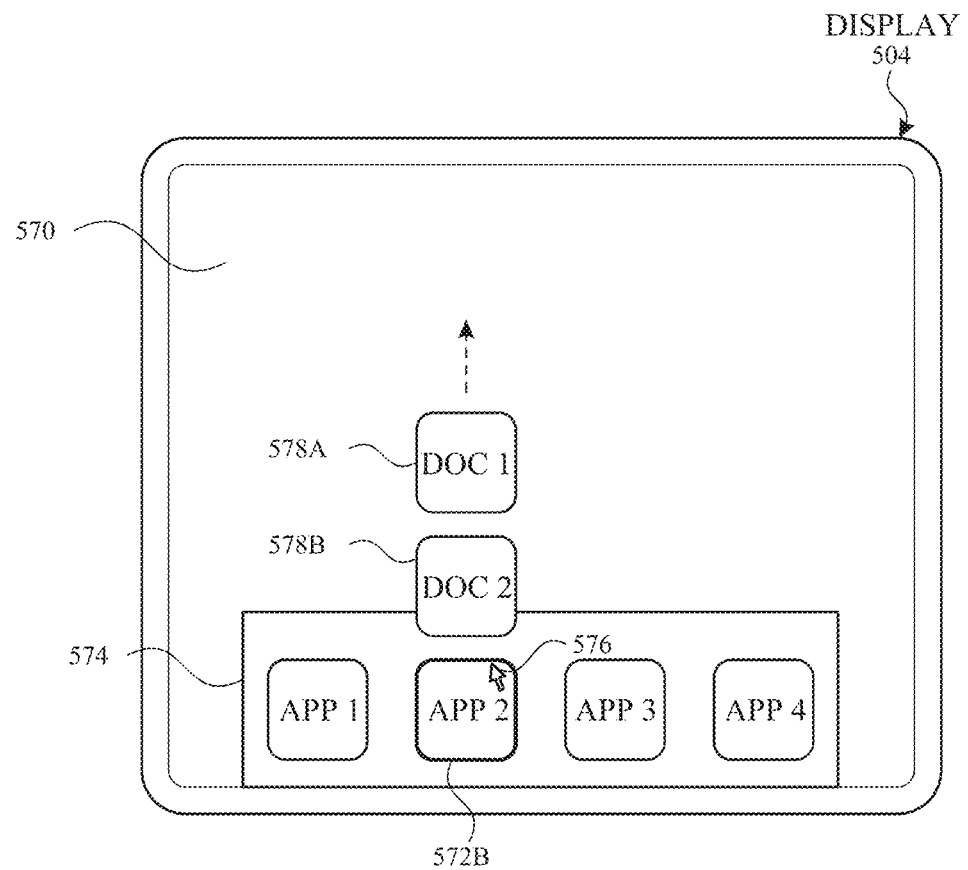
Figure 5G:
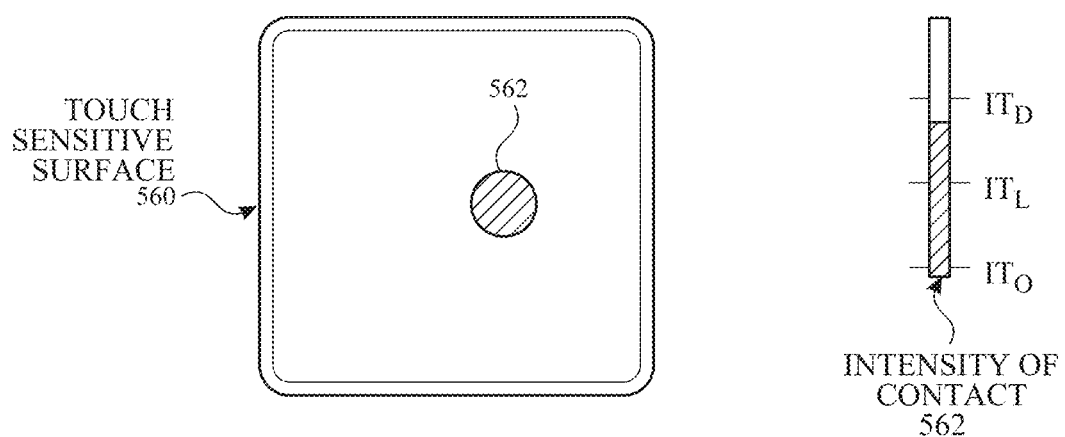
Figure 5H:
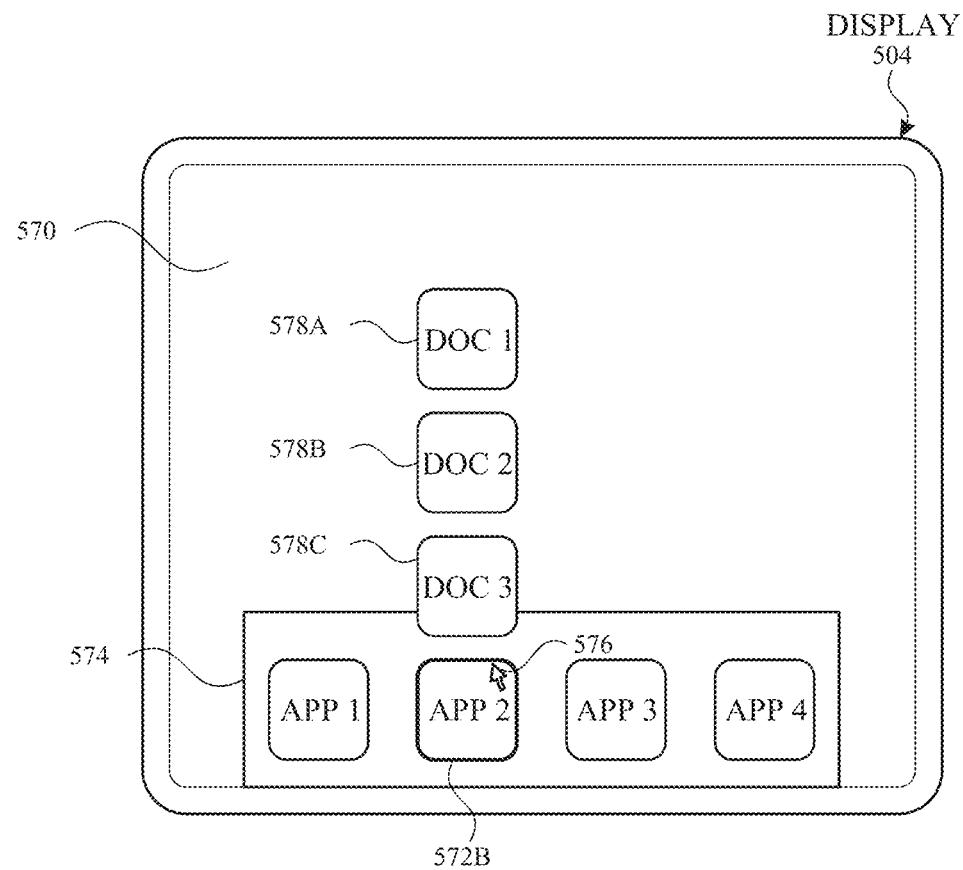
Figure 5H:
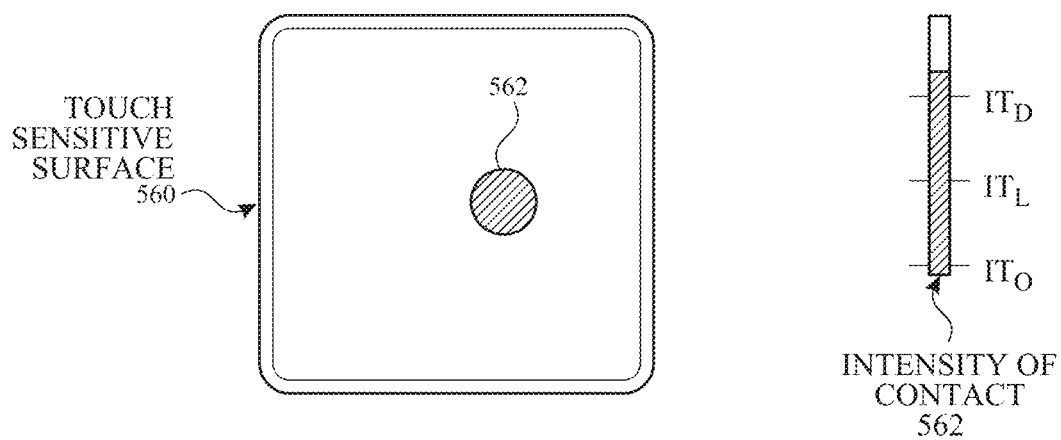

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6D illustrate an exemplary technique for applying simulated lighting to an image with depth information, in accordance with some embodiments. The technique illustrated in these figures is used in the processes described below, including the processes in FIGS. 8 and 10.

Figure 6A:
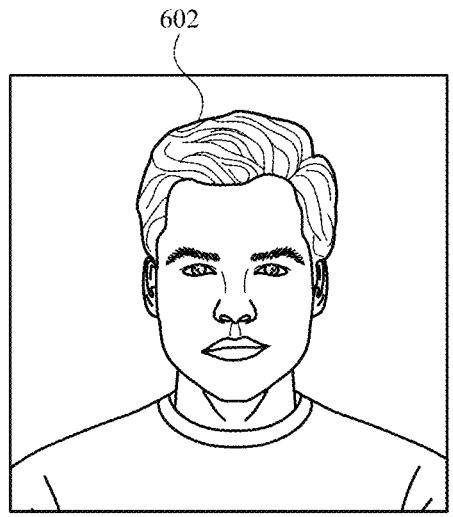
FIGS. 6A-6D illustrate an exemplary technique for applying simulated lighting to an image with depth information in accordance with some embodiments.

FIG. 6A illustrates an image of a face 602. When the image of the face 602 is captured, depth information corresponding to face 602 is captured with the image data. In some embodiments, depth information corresponding to face 602 is captured using one or more depth camera sensors (e.g., 175). Depth camera sensors receive data from the environment to create a three dimensional model of face 602.

Figure 6B:
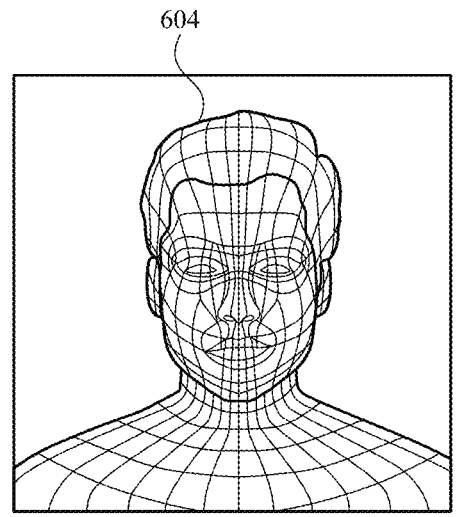

FIG. 6B illustrates a three dimensional model 604 of face 602. Three dimensional model 604 is based on the depth information captured with the image data of face 602. In some embodiments, three dimensional model 604 is based on a depth map (e.g., depth map image) of face 602. A depth map (e.g., depth map image) contains information (e.g., values) that relates to the distance of objects in a scene (e.g., face 602) from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene (e.g., face 602) and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Figure 6C:
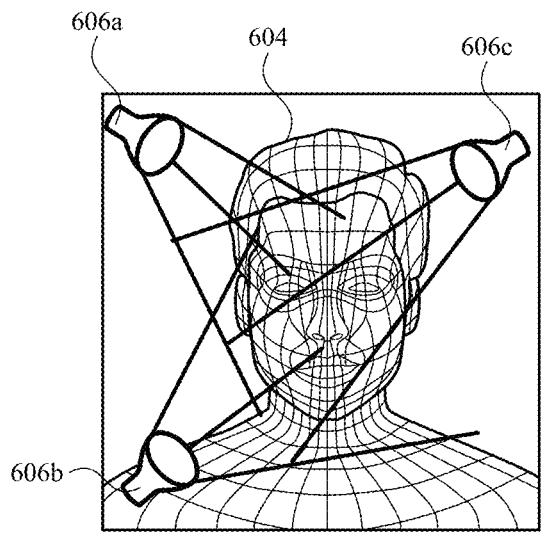

FIG. 6C illustrates simulated lighting being applied to three dimensional model 604. Simulated lighting is applied by positioning simulated light sources 606a, 606b, and 606c around three dimensional model 604. While shown with three simulated light sources, simulated lighting can be applied to three dimensional model 604 using various numbers of simulated light sources, such as one, two, or four or more. Simulated light sources 606a, 606b, and 606c cast light on three dimensional model 604 based on their position and direction relative to three dimensional model 604. In some embodiments, simulated light sources 606a, 606b, and 606c have brightness and color characteristics that effect the simulated lighting applied to three dimensional model 604.

When simulated lighting is applied to three dimensional model 604, the contours of the model cause the level of simulated lighting appearing on different portions of the model to vary. For example, simulated light source 606a positioned on the left side of three dimensional model 604 causes light to be cast primarily on the left side of three dimensional model 604 while less light is cast on the right side of three dimensional model 604. Furthermore, certain contours of three dimensional model 604 cause shadows to be cast on portions of three dimensional model 604 based on the position and direction of a simulated light source. For example, simulated light source 606b positioned below three dimensional model 604 causes the nose and cheekbones of three dimensional model 604 to cast shadows on other portions of three dimensional model 604.

Figure 6D:
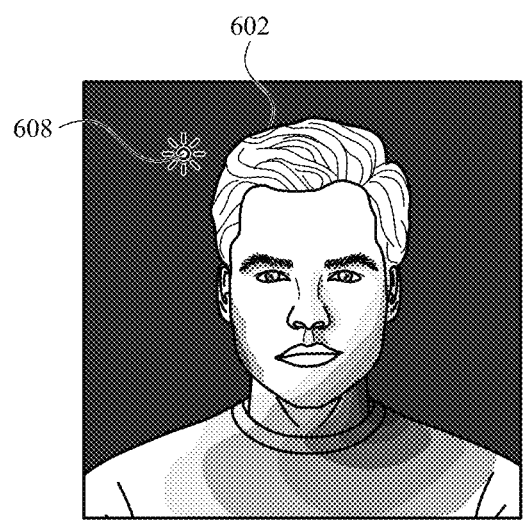

Using the three dimension model 604 of face 602, simulated lighting is applied to face 602, as shown in FIG. 6D. In FIG. 6D, the simulated lighting applied to face 602 appears to be emitted from a simulated light source located at simulated light source icon 608. Based on how light emitted from that location casts light and shadows on three dimensional model 604, face 602 is displayed with different levels of lighting on different portion of the face (e.g., the lighting of the three dimensional model 604 is mapped to face 602). Furthermore, using the depth information associated with the image of face 602, the face 602 is isolated from the background of the image (e.g., the original background is replaced with a black background). This allows the face 602 to be displayed with simulated lighting independently of the background, and/or allows face 602 to be displayed in front of different backgrounds.

FIGS. 7A-7J illustrate exemplary user interfaces for displaying an image with depth information, in accordance with some embodiments. The user interfaces in these figures are used to illustrate the processes described below, including the processes in FIG. 8.

Figure 7A:
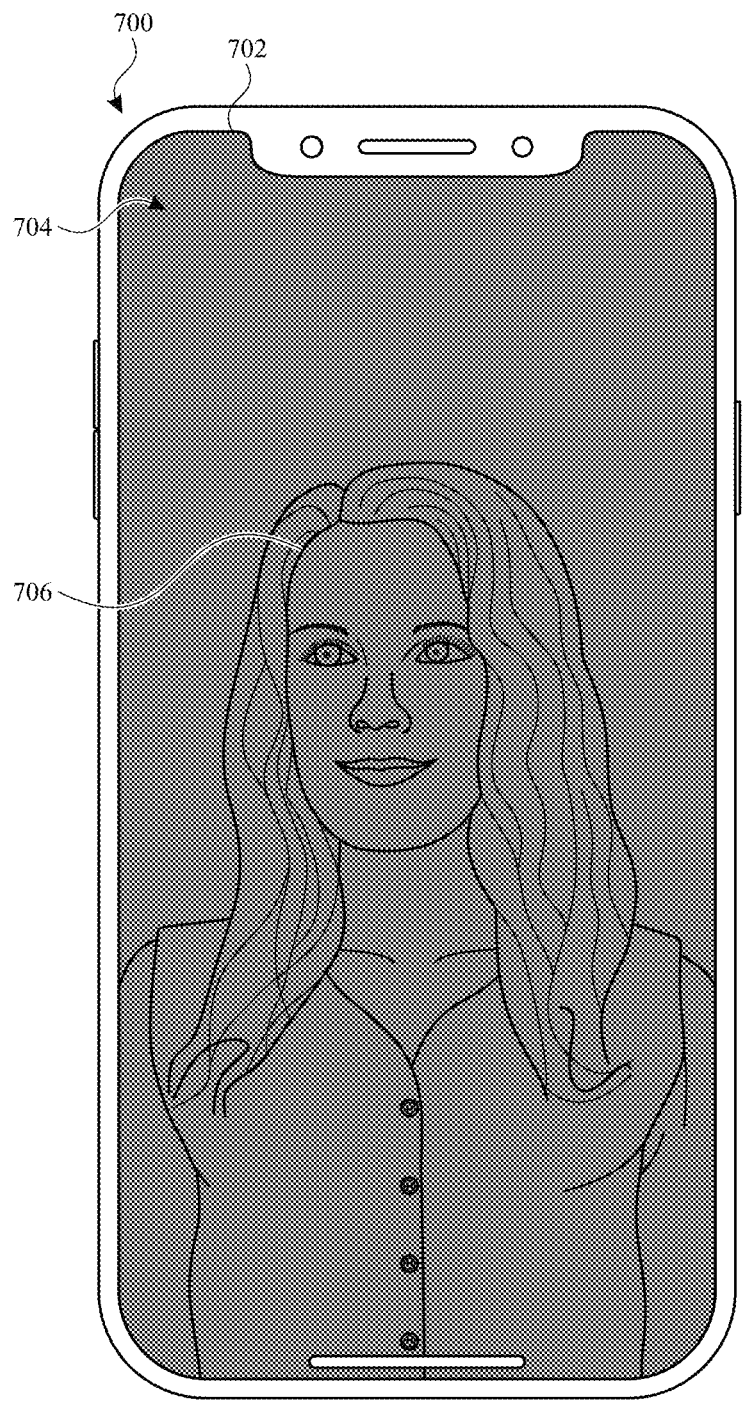
FIGS. 7A-7J illustrate exemplary user interfaces for displaying an image with depth information, in accordance with some embodiments.
Figure 7B:
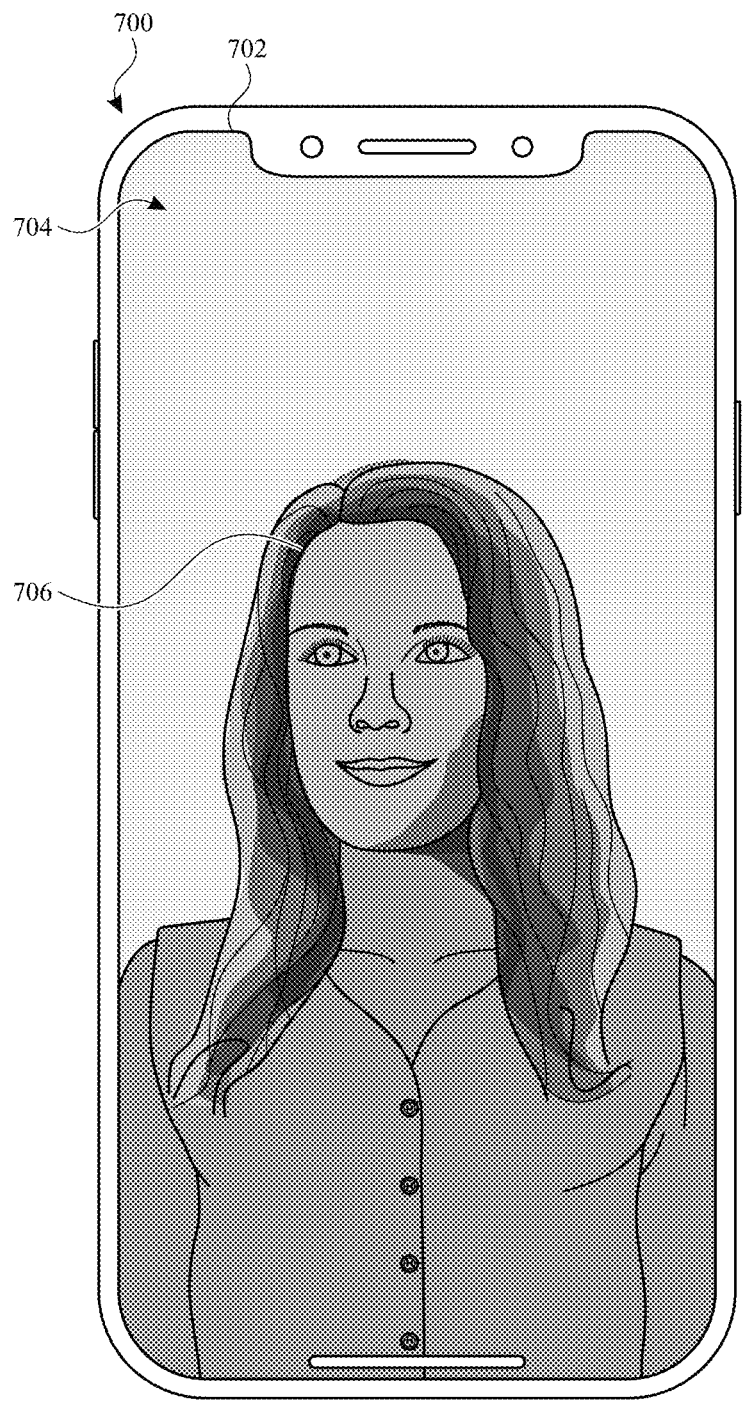
Figure 7C:
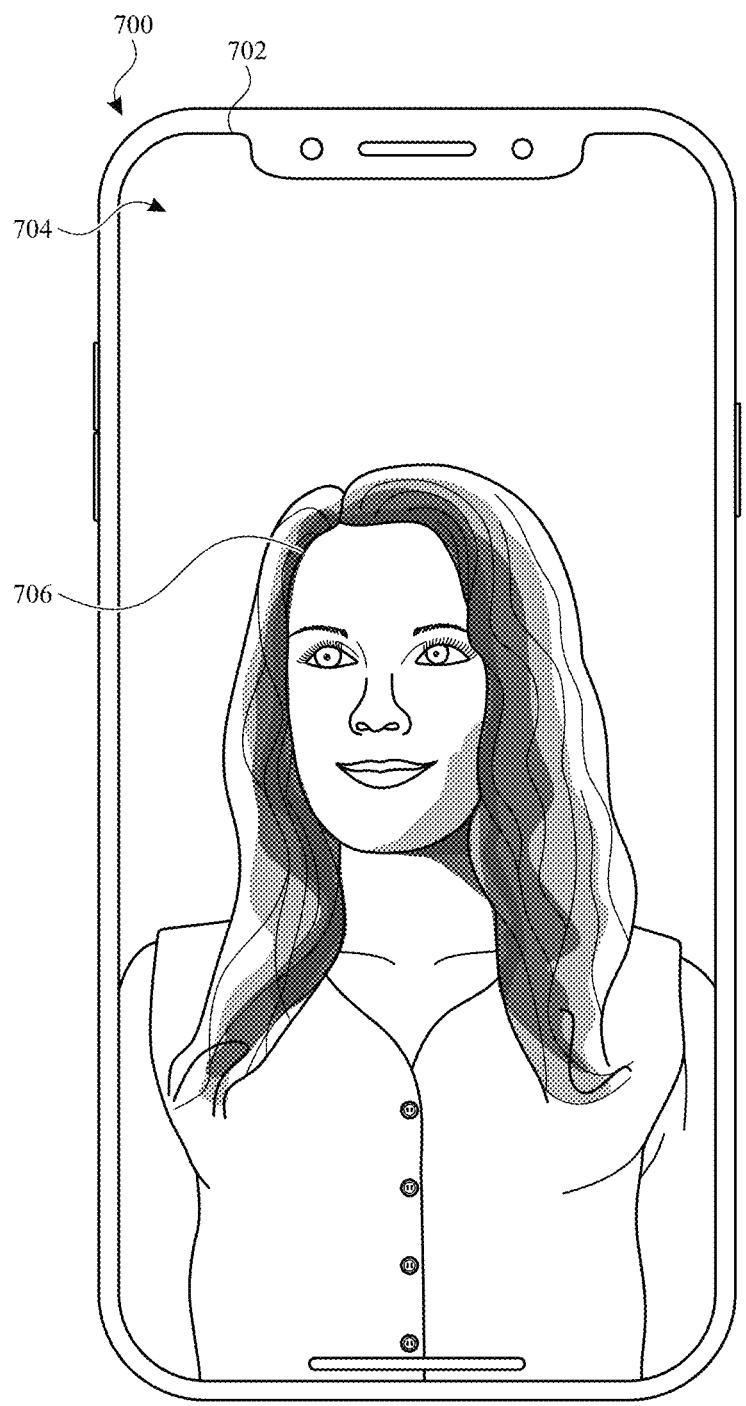
Figure 8:
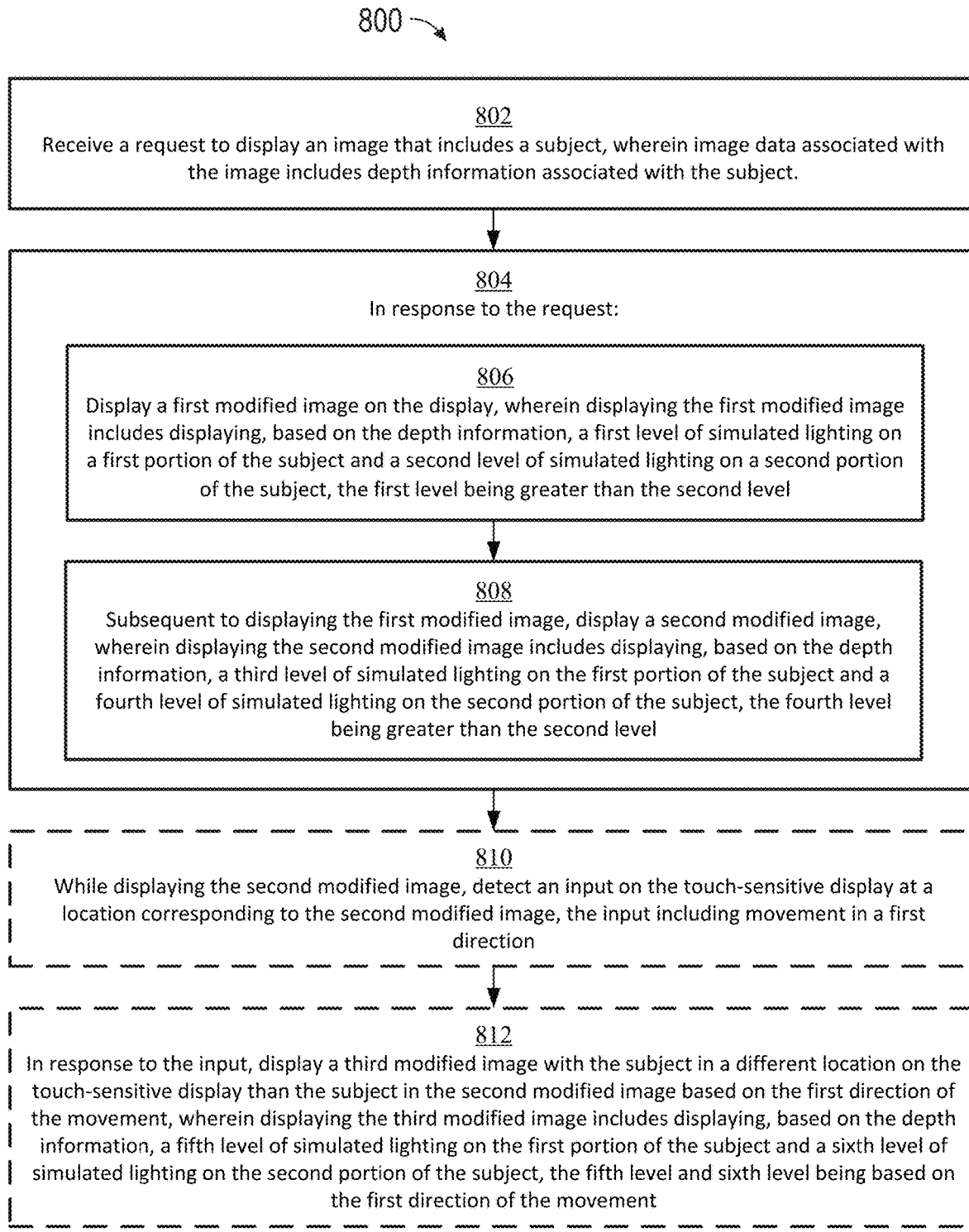
FIG. 8 is a flow diagram illustrating a method for displaying an image with depth information using an electronic device in accordance with some embodiments.

FIGS. 7A-7C illustrates an electronic device 700 including a display 702 (e.g., integrated with a touch-sensitive surface). In some embodiments, electronic device 700 includes one or more features of device 100, 300, or 500. Electronic device 700 displays, on display 702, a user interface 704 (e.g., an image viewer user interface). An image 706 is displayed in user interface 704. In some embodiments, image 706 is a portrait including a face of a person. In some embodiments, image 706 includes depth information corresponding to the face of the person. The depth information is captured with the image data for image 706 using one or more depth camera sensors (e.g., 175). In some embodiments, the depth information is a depth map (e.g., depth map image). A depth map (e.g., depth map image) contains information (e.g., values) that relates to the distance of objects in a scene (e.g., the face of the person) from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene (e.g., the face of the person) and the plane of the viewpoint. In some embodiments, the depth map includes information about the relative depth of various features of an object of interest in view of the depth camera (e.g., the relative depth of eyes, nose, mouth, ears of the face of the person). In some embodiments, the depth map includes information that enables the device to determine contours of the object of interest in a z direction.

As shown in FIGS. 7A-7C, image 706 is displayed using a reveal animation. The reveal animation includes displaying image 706 with varying levels and/or sources of simulated lighting. Image 706 is displayed with simulated lighting using the techniques described in reference to FIGS. 6A-6D. In some embodiments, image 706 is displayed using the reveal animation shown in FIGS. 7A-7C in response to a request to view image 706 (e.g., in response to image 706 being selected from a photo album of the electronic device 700).

At the beginning of the reveal animation (as shown in FIG. 7A), image 706 is displayed with low levels of simulated lighting (e.g., the face of the person in image 706 is dimly lit). In some embodiments, different portions of image 706 are lit with different levels of simulated lighting, due to the contours of the face of the person in image 706 (e.g., a first portion of the face is displayed with a first level of simulated lighting while a second portion of the face is displayed with a second, different level of simulated lighting). As the animation progresses (as shown in FIGS. 7B and 7C), image 706 is displayed with progressively greater levels of simulated lighting (e.g., the face of the person in image 706 appears brighter). In some embodiments, as the animation progresses, different portions of image 706 are lit with different levels of simulated lighting, due to the contours of the face of the person in image 706 and a perceived motion of simulated light source(s) during the reveal animation. In some embodiments, the simulated lighting is applied to image 706 during the reveal animation such that the face of the person in image 706 appears to emerge from darkness (e.g., a perceived position of a simulated light source moves during the reveal animation to appear as if the person steps underneath the simulated light source). In some embodiments, the simulated lighting is applied to image 706 during the reveal animation such that a simulated light source appears to move horizontally and/or vertically onto the face of the person in image 706 (e.g., the face of the person in image 706 appears to be lit with light from a flashlight or spotlight moving onto the face during the reveal animation).

In some embodiments, at the end of the reveal animation (as shown in FIG. 7C), image 706 is displayed with simulated lighting that substantially recreates the original lighting of image 706 (e.g., the natural lighting that was originally captured in the image data for image 706). In some embodiments, at the end of the reveal animation (as shown in FIG. 7C), the original image 706 is displayed without simulated lighting.

In some embodiments, at the end of the reveal animation (as shown in FIG. 7C), image 706 is displayed with simulated lighting based on a respective (e.g., current) time of day (e.g., brightness, color, angle with respect to subject are modified based on the time of day (e.g., less light on subject at night time). In some embodiments, time of day corresponds to the current time of electronic device 700 displaying image 706. In some embodiments, time of day corresponds to the current time where the person in image 706 is currently located. In some embodiments, time of day corresponds to the current time where image 706 was captured.

In some embodiments, at the end of the reveal animation (as shown in FIG. 7C), image 706 is displayed with simulated lighting based on a current weather information (e.g., less light on subject when cloudy). In some embodiments, the weather corresponds to current weather where electronic device 700 is located. In some embodiments, the weather corresponds to current weather where the person in image 706 is currently located. In some embodiments, the weather corresponds to the current weather where image 706 was captured. In some embodiments, the overall lighting at the end of the reveal animation (as shown in FIG. 7C) is based on one or more properties of the lighting at the time the image was captured (e.g., brightness, color, angle with respect to subject) combined with the current weather information.

Figure 7D:
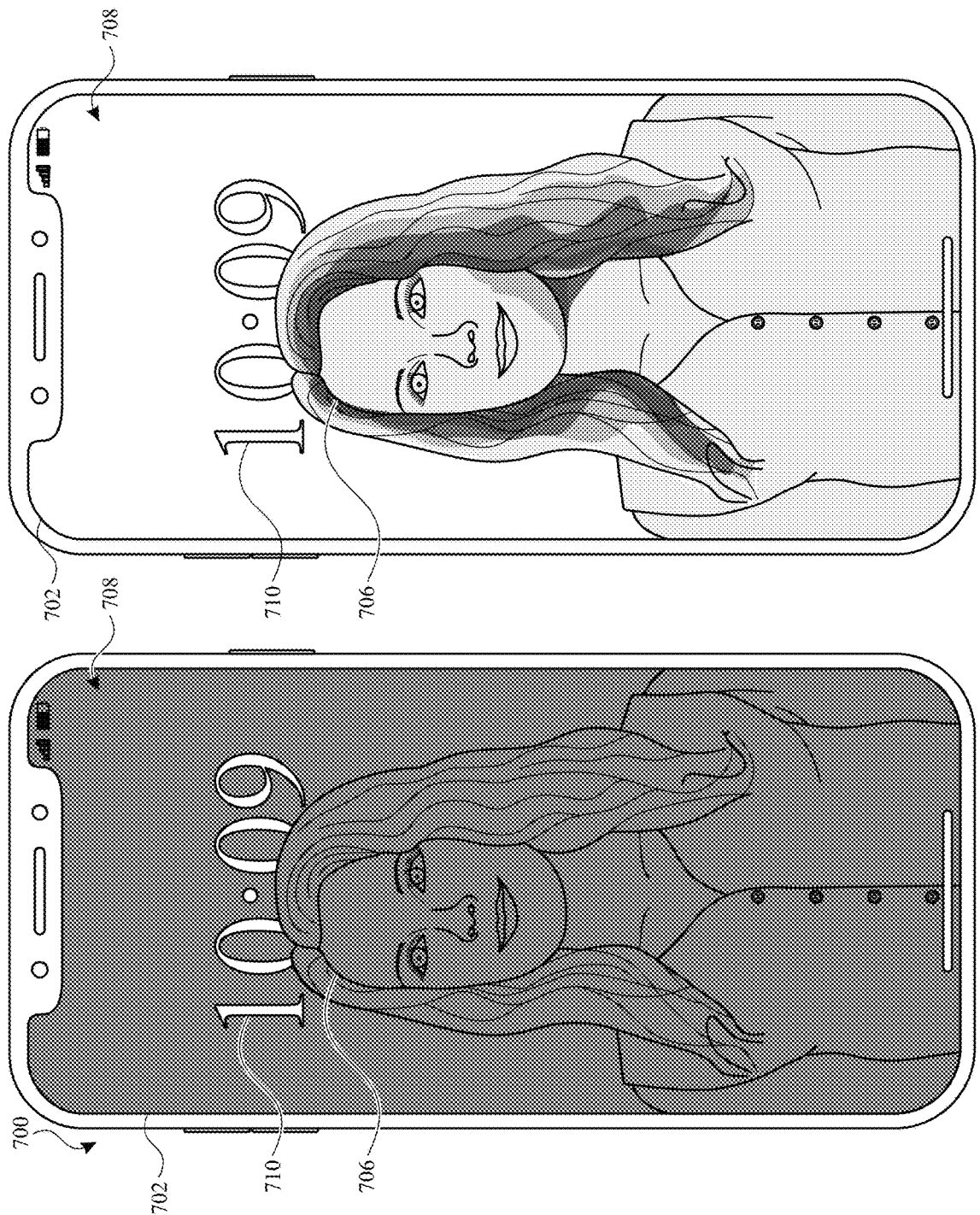

FIG. 7D illustrates electronic device 700 displaying lock-screen interface 708. Lock-screen interface 708 includes image 706 and time 710. As shown in FIG. 7D, image 706 is displayed overlaying a portion of time 710. As described in reference to FIGS. 6A-6D, based on depth information of image 706, the face of the person in image 706 can be separated from the background of image 706. This allows the face of the person in image 706 to overlay different backgrounds (e.g., time 710).

In some embodiments, when lock-screen interface 708 is displayed (e.g., when electronic device 700 wakes from a low-power (e.g., sleep) state), image 706 is displayed using the reveal animation described in reference to FIGS. 7A-7C. The left drawing of FIG. 7D illustrates lock-screen interface 708 at the beginning of the reveal animation (e.g., image 706 is displayed with a low level of simulated lighting). The right drawing of FIG. 7D illustrates lock-screen interface 708 at the end of the reveal animation (e.g., image 706 is displayed with a greater level of simulated lighting).

In some embodiments, image 706 is displayed in lock-screen interface 708 using the reveal animation in response to an unlocking of electronic device 700. For example, image 706 is initially displayed in lock-screen interface 708 with a low level of simulated lighting (as shown in the left drawing of FIG. 7D). Image 706 continues to be displayed with the low level of simulated lighting in lock-screen interface 708 until electronic device 700 is unlocked (e.g., until an authorized user is detected, such as through facial recognition or fingerprint recognition). When electronic device 700 is unlocked, the reveal animation proceeds, as described in reference to FIGS. 7A-7C. After the reveal animation ends (e.g., after image 706 is displayed with a greater level simulated lighting as shown in the right drawing of FIG. 7D), an unlocked user interface is displayed (such as shown in FIG. 4A).

Figure 7E:

FIG. 7E illustrates electronic device 700 displaying incoming call interface 712. Incoming call interface 712 includes image 706, accept affordance 714, and decline affordance 716. As shown in FIG. 7E, accept affordance 714 and decline affordance 716 are shown overlaying image 706.

In some embodiments, when incoming call interface 712 is displayed (e.g., when a request to join a telephone call is detected), image 706 is displayed using the reveal animation described in reference to FIGS. 7A-7C. In some embodiments, image 706 is associated with a user sending the request to join the telephone call (e.g., the person in image 706 is the person calling electronic device 700). The left drawing of FIG. 7E illustrates incoming call interface 712 at the beginning of the reveal animation (e.g., image 706 is displayed with a low level of simulated lighting). The right drawing of FIG. 7E illustrates incoming call interface 712 at the end of the reveal animation (e.g., image 706 is displayed with a greater level of simulated lighting). In some embodiments, the image 706 as displayed at the end of the reveal animation continues to be displayed until an input on the accept affordance 714 or decline affordance 716 is detected, or until the incoming call interface 712 otherwise ceases to be displayed (e.g., the request to join the telephone call times out).

In some embodiments, image 706 is displayed in incoming call interface 712 using the reveal animation in response to detecting an input (e.g., a finger contact) on accept affordance 714. For example, image 706 is initially displayed in incoming call interface 712 with a low level of simulated lighting (as shown in the left drawing of FIG. 7E). Image 706 continues to be displayed with the low level of simulated lighting in incoming call interface 712 until an input (e.g., a finger contact) is detected on accept affordance 714. When the input is detected on accept affordance 714, the reveal animation proceeds, as described in reference to FIGS. 7A-7C. After the reveal animation ends, an active call interface is displayed. In some embodiments, image 706 continues to be displayed with the higher level of simulated lighting (e.g., as shown in the right drawing of FIG. 7E) in the active call interface while the telephone call is active.

FIGS. 7F-7I illustrate a photo viewing interface 718. In some embodiments, when image 706 is selected to be viewed in the photo viewing interface 718 (e.g., when image 706 is selected from a photo album of electronic device 700), image 706 is displayed with the reveal animation, as described in reference to FIGS. 7A-7C.

Figure 7F:
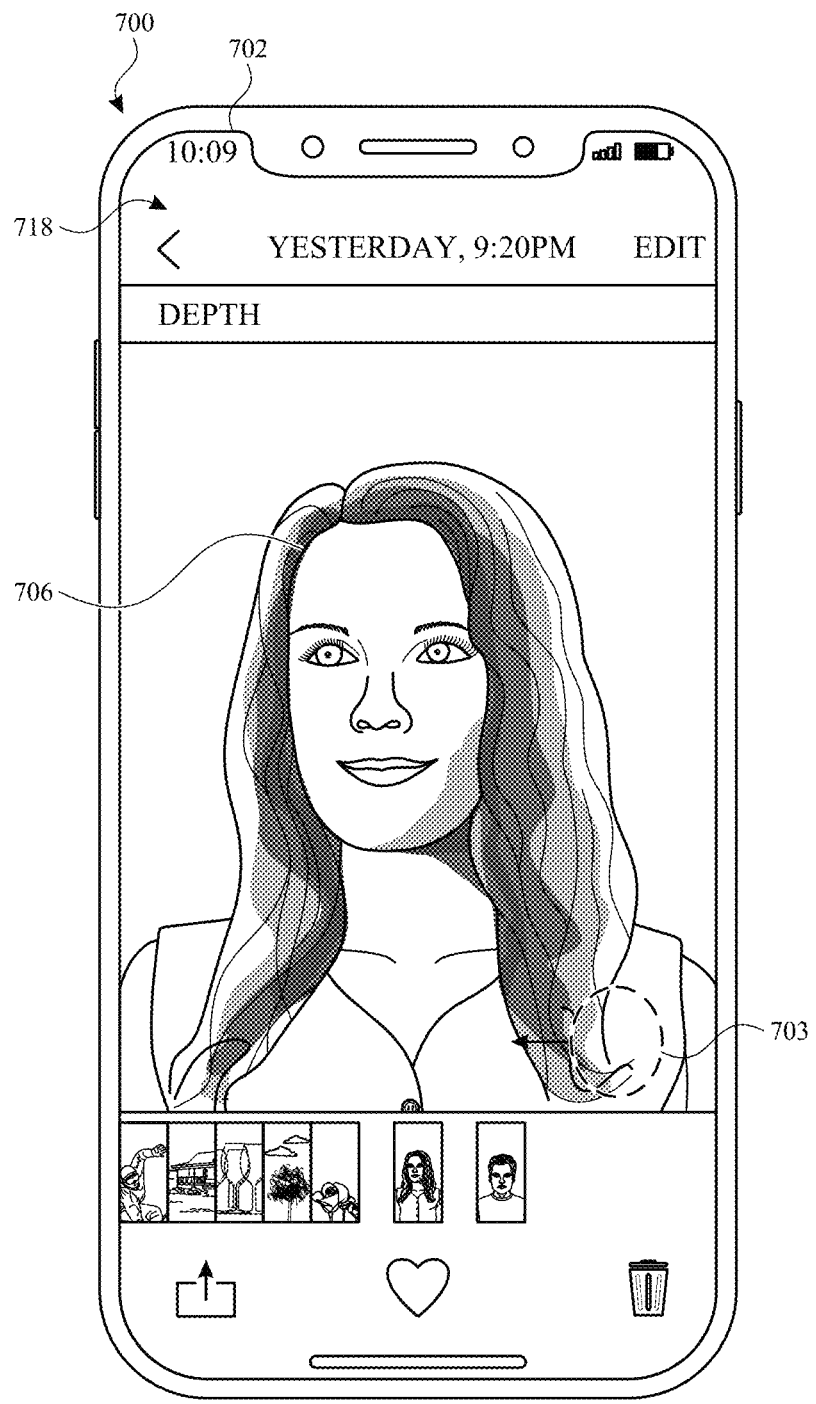

After the reveal animation, image 706 is displayed in photo viewing interface 718 as shown in FIG. 7F. In some embodiments, image 706 is displayed in photo viewing interface 718 with simulated lighting that substantially recreates the original lighting of image 706 (e.g., the natural lighting that was originally captured in the image data for image 706) (e.g., amount of light, color of the light, direction(s) of source(s) of light). In some embodiments, image 706 is displayed in photo viewing interface 718 with simulated lighting that corresponds to one or more simulated light source(s) in fixed position(s).

Figure 7G:
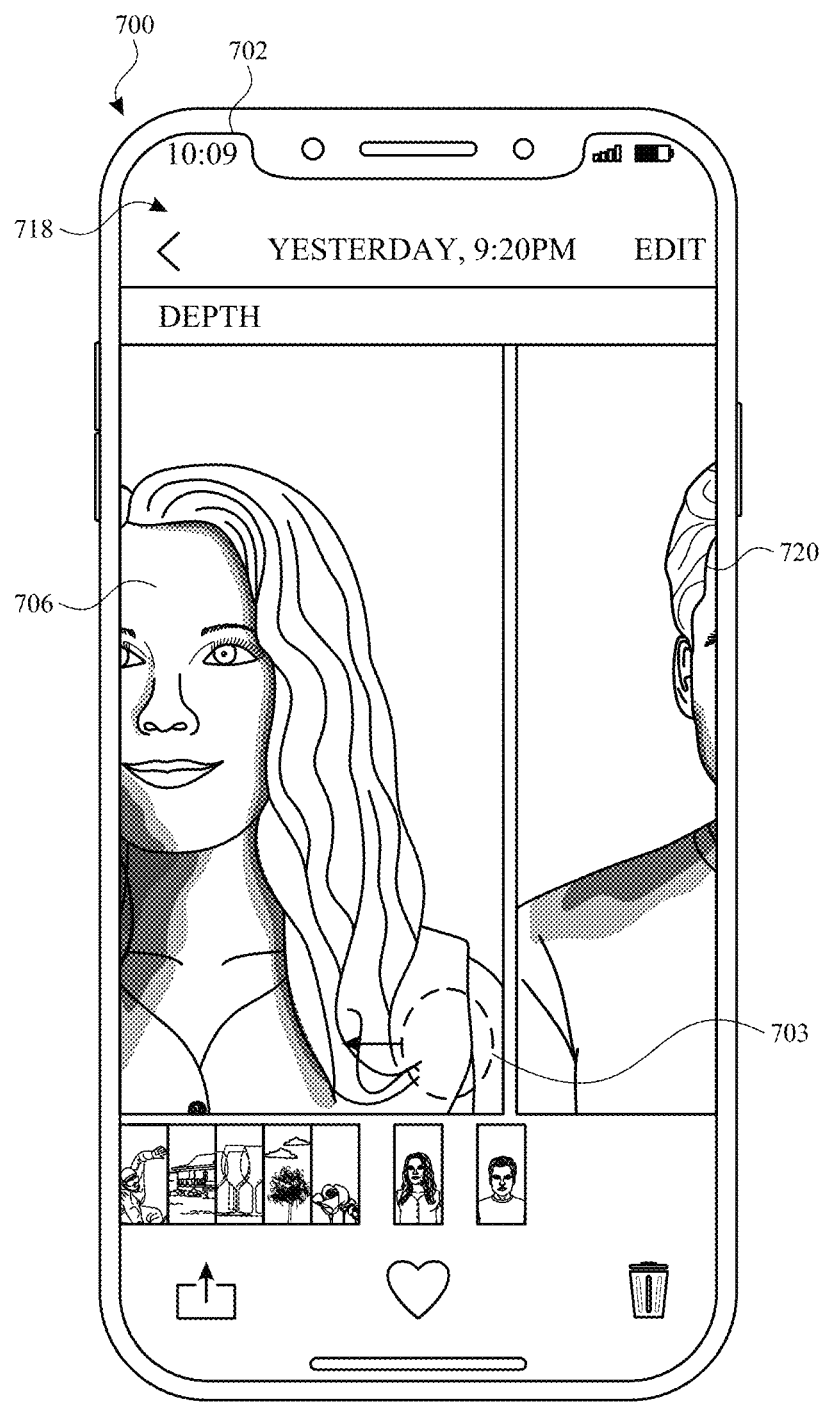
Figure 7H:
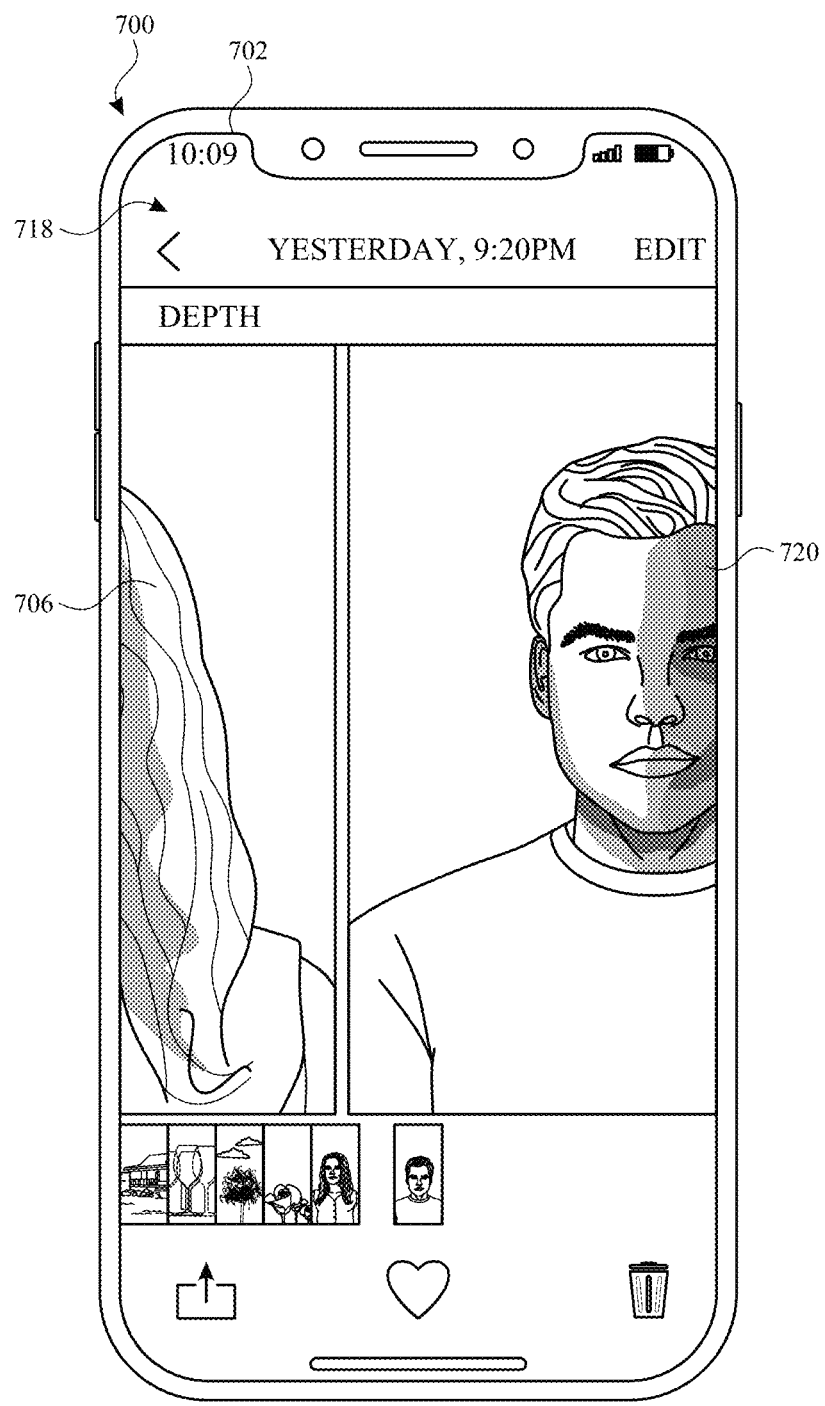

While image 706 is displayed in photo viewing interface 718, a swipe input 703 (e.g., a finger contact moving in left/right direction) is detected on image 706, as shown in FIGS. 7F-7G. In response to detecting the swipe input 703, image 706 is animated moving in a direction off of display 702 based on the direction of the swipe input 703. For example, a swipe input 703 in a left direction results in image 706 moving to the left off of the edge of display 702, as shown in FIGS. 7G-7H. As image 706 moves off of display 702, image 706 is displayed with varying levels of simulated lighting. In some embodiments, image 706 is displayed with simulated lighting such that one or more simulated light source(s) appear to be in fixed position(s) as image 706 moves.

Figure 7I:
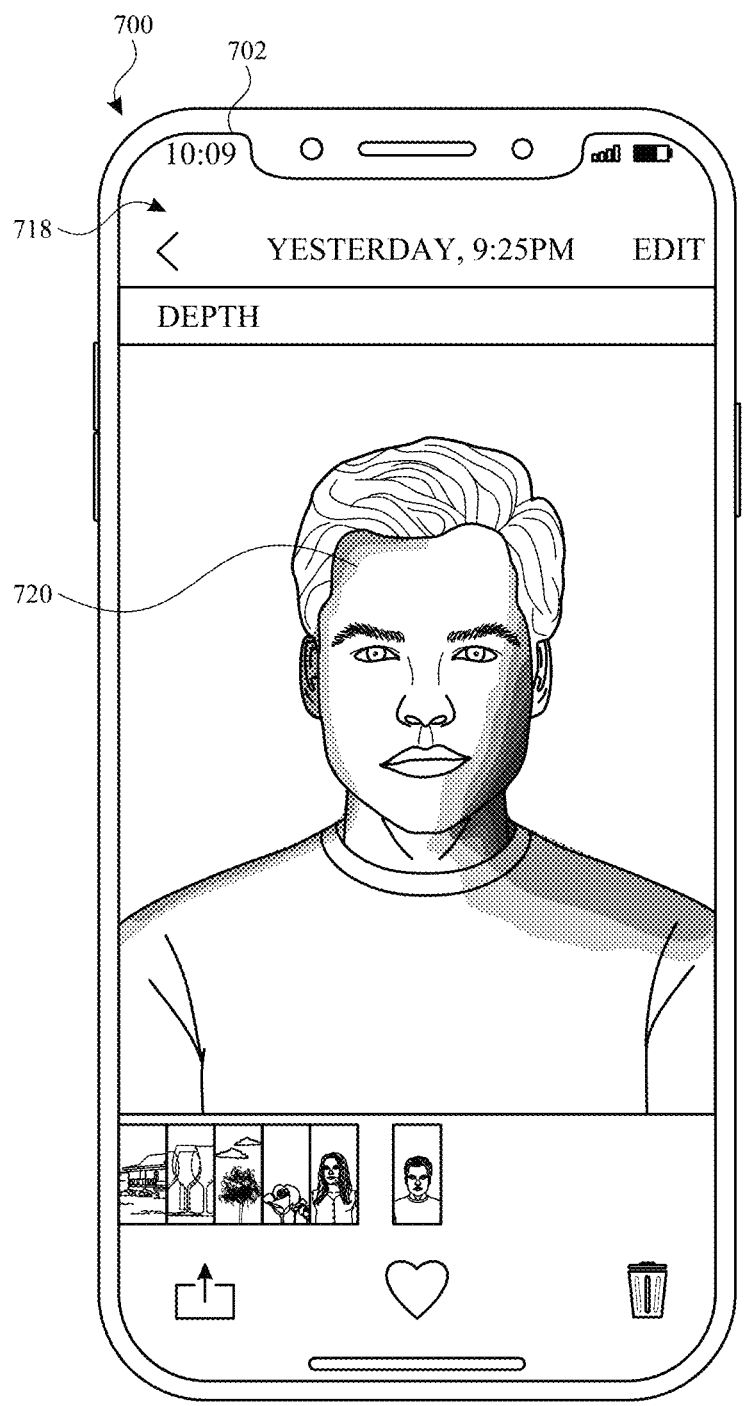

In some embodiments, as image 706 moves off of display 702, a second image 720 moves onto display 702 in the same direction of movement, as shown in FIGS. 7G-7I. As image 720 moves onto display 702, image 720 is displayed with varying levels of simulated lighting. In some embodiments, image 720 is displayed such that image 720 appears to be lit with the same simulated light source(s) as image 706 (e.g., the one or more simulated light source(s) remain in the same fixed position(s) as image 720 moves onto display 702).

Figure 7J:
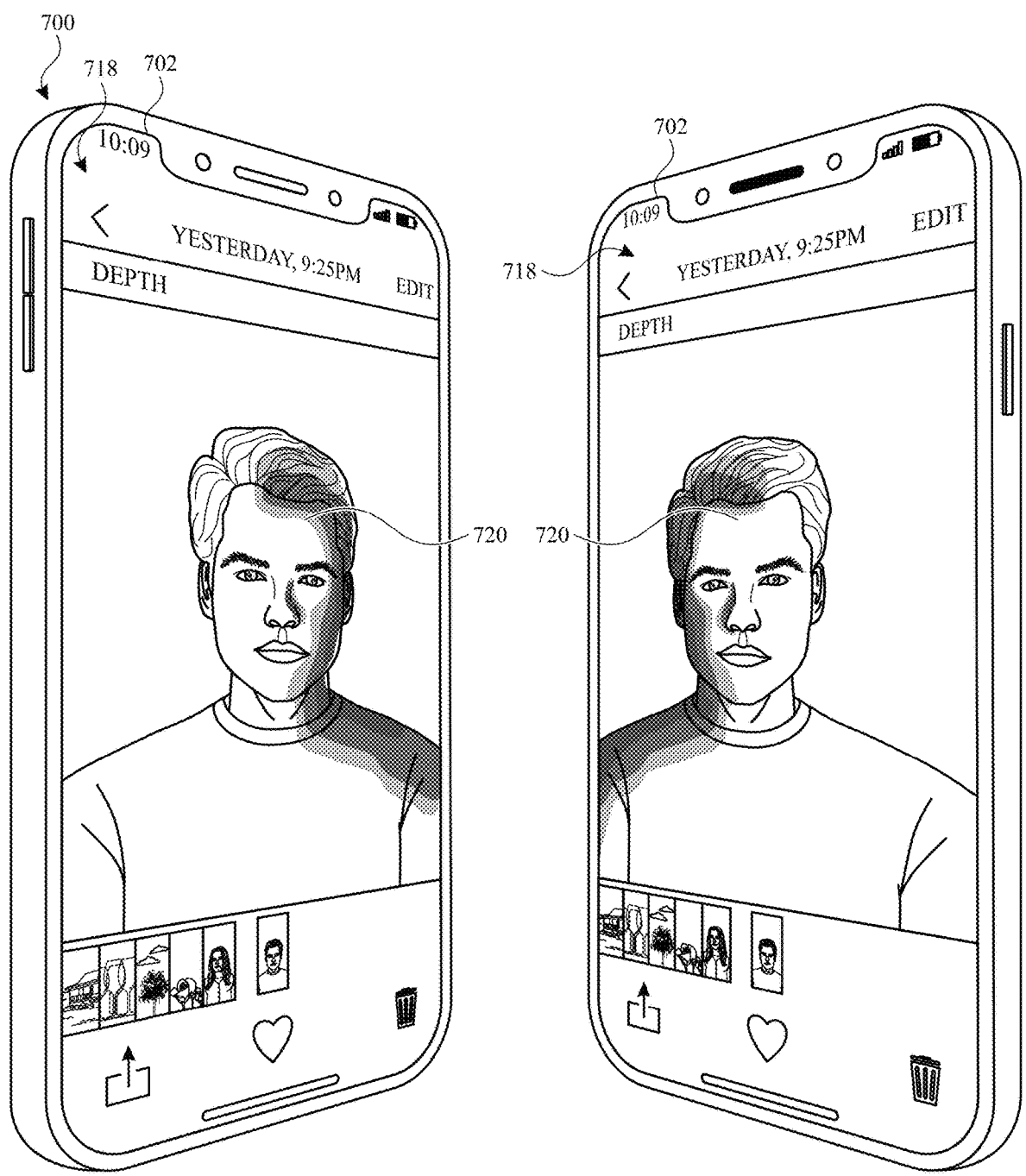

FIG. 7J illustrates image 720 displayed in photo viewing interface 718. In some embodiments, image 720 is selected to be viewed in photo viewing interface 718 (e.g., image 720 is selected from a photo album of electronic device 700). In response to selecting image 720 for viewing, image 720 is displayed with the reveal animation, as described in reference to FIGS. 7A-7C. In some embodiments, image 720 is displayed in photo viewing interface 718 in response to a swipe input on another photo displayed in photo viewing interface 718, as described in reference to FIGS. 7F-7I.

In some embodiments, image 720 is displayed with simulated lighting that corresponds to one or more simulated light source(s) in fixed position(s). While image 720 is displayed, a change in orientation of electronic device 700 is detected (e.g., using a gyroscope and/or accelerometer). In some embodiments, in response to the change in orientation of electronic device 700, image 720 is displayed with different simulated lighting, as shown in FIG. 7J, such that the one or more simulated light source(s) appear to remain in fixed position(s) as the orientation of electronic device 700 changes. In some embodiments, in response to the change in orientation of electronic device 700, image 720 is displayed with different simulated lighting such that the one or more simulated light source(s) appear to change position(s) based on the change in orientation of electronic device 700 (e.g., the position(s) of the simulated light source(s) is based on the orientation of electronic device 700).

FIG. 8 is a flow diagram illustrating a method for displaying an image with depth information using an electronic device in accordance with some embodiments. Method 800 is performed at an electronic device (e.g., 100, 300, 500, 700, 900) with a display (e.g., 702). Some operations in method 800 are, optionally, combined, the orders of some operations are, optionally, changed, and some operations are, optionally, omitted.

As described below, method 800 provides an intuitive way for displaying an image with depth information. The method reduces the cognitive burden on a user for recognizing the subject of an image, thereby creating a more efficient human-machine interface. For battery-operated computing devices, enabling a user to recognize the subject of an image faster and more efficiently conserves power and increases the time between battery charges.

Electronic device (e.g., 700) receives (802) a request to display an image (e.g., 706) that includes a subject (e.g., an authorized user of the device or another person who is the subject of the image). Image data associated with the image includes depth information associated with the subject.

In response (804) to the request, electronic device displays (806) a first modified image on the display (e.g., the first frame of a reveal animation, such as as shown in FIG. 7A). Displaying the first modified image includes displaying, based on the depth information, a first level of simulated lighting on a first portion of the subject and a second level of simulated lighting on a second portion of the subject, the first level being greater than the second level. For example, one side of the subject's face is lit with a dim simulated light source, while the other side of the subject's face appears to be in shadow.

Further in response (804) to the request, and subsequent to displaying the first modified image, the electronic device (e.g., 700) displays (808) a second modified image (e.g., the second frame of a reveal animation, such as shown in FIG. 7B). Displaying the second modified image includes displaying, based on the depth information, a third level of simulated lighting on the first portion of the subject and a fourth level of simulated lighting on the second portion of the subject, the fourth level being greater than the second level. For example, the simulated light source appears brighter and/or appears to move toward the center of the subject's face. Displaying an image with simulated lighting improves visual feedback by enabling a user to more easily recognize the subject of the image (e.g., by emphasizing the contours of the subject's face). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the depth information is obtained during a biometric enrollment process wherein one or more portions of the subject's face are captured for purposes of biometric authentication. In some embodiments, the image data includes at least two components: an RGB component that encodes the visual characteristics of a captured image, and depth data that encodes information about the relative spacing relationship of elements within the captured image (e.g., the depth data encodes that a user is in the foreground, and background elements, such as a tree positioned behind the user, are in the background). In some embodiments, the depth data is a depth map. In some embodiments, a depth map (e.g., depth map image) contains information (e.g., values) that relates to the distance of objects in a scene from a viewpoint (e.g., a camera). In some examples of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the depth data has a second depth component (e.g., a second portion of depth data that encodes a spatial position of the background in the camera display region; a plurality of depth pixels that form a discrete portion of the depth map, such as a background), separate from the first depth component, the second depth aspect including the representation of the background in the camera display region. In some embodiments, the first depth aspect and second depth aspect are used to determine a spatial relationship between the subject in the camera display region and the background in the camera display region. This spatial relationship can be used to distinguish the subject from the background. This distinction can be exploited to, for example, apply different visual effects (e.g., visual effects having a depth component) to the subject and background.

In accordance with some embodiments, the first portion of the subject corresponds to content of the image at a first depth (e.g., an eye socket) and the second portion of the subject corresponds to content of the image at a second depth (e.g., a cheekbone).

In accordance with some embodiments, the third level of simulated lighting is less than the first level of simulated lighting. For example, the first portion of the subject appears less bright as the second portion appears brighter, such as when the simulated light source pans or rotates from the side of the subject's face toward the center of the subject's face.

In accordance with some embodiments, the third level of simulated lighting is greater than the first level of simulated lighting (e.g., all portions of the subject appear brighter in the second modified image).

In accordance with some embodiments, the request to display the image is received in response to the electronic device exiting a low power mode (e.g., when a phone wakes from a sleep mode, such as shown in FIG. 7D).

In accordance with some embodiments, the request to display the image is received in response to the electronic device detecting biometric information associated with an authorized user (e.g., detecting the face of an authorized user).

In accordance with some embodiments, displaying the first modified image (e.g., 706, as shown in FIG. 7A) further includes displaying the subject in front of one or more graphical elements (e.g., lock icon, notifications, time, date, etc.) (e.g., 710) associated with a lock screen of the electronic device.

In accordance with some embodiments, the request to display the image is received in response to receiving a communication (e.g., phone call, instant message, video chat, such as shown in FIG. 7E) from the subject of the image. Displaying an image with simulated lighting when receiving a communication from the subject of the image improves visual feedback by enabling a user to more easily recognize the subject of the image (e.g., by emphasizing the contours of the subject's face). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the request to display the image is received in response to an input selecting the image for viewing (e.g., tapping on a thumbnail of the image in a photo gallery).

In accordance with some embodiments, while displaying the second modified image (e.g., 706, as shown in FIG. 7B), electronic device (e.g., 700) detects (810) an input (e.g., 703) on the touch-sensitive display (e.g., 702) at a location corresponding to the second modified image (e.g., 706). The input includes movement in a first direction.

In accordance with some embodiments, in response to the input, the electronic device (e.g., 700) displays (812) a third modified image (e.g., 706, such as shown in FIG. 7G) with the subject in a different location on the touch-sensitive display than the subject in the second modified image based on the first direction of the movement. Displaying the third modified image includes displaying, based on the depth information, a fifth level of simulated lighting on the first portion of the subject and a sixth level of simulated lighting on the second portion of the subject, the fifth level and sixth level being based on the first direction of the movement. For example, light appears to be emitted from a stationary light source as subject of photo moves across screen in response to a swipe input or the light changes angle or distance relative to the subject as the swipe gesture proceeds.

In accordance with some embodiments, in response to the input, the electronic device (e.g., 700) displays at least a portion of a second image (e.g., 720) on the touch-sensitive display (e.g., 702). The second image (e.g., 720) includes a second subject and second image data associated with the second image includes second depth information associated with the second subject. In some embodiments, displaying at least the portion of the second image includes displaying, based on the second depth information, a seventh level of simulated lighting on a first portion of the second subject and a eighth level of simulated lighting on a second portion of the second subject, the seventh level and eighth level being based on the first direction of the movement (e.g., 720, such as shown in FIG. 7H). For example, simulated lighting is applied to the next photo in a camera roll as it slides onto the display, where the simulated lighting appears to be emitted from the stationary light source. In some embodiments, the seventh level of simulated lighting is the same as the first, second, third, fourth, fifth, or sixth levels of simulated lighting. In accordance with some embodiments, the eighth level of simulated lighting is the same as the first, second, third, fourth, fifth, or sixth levels of simulated lighting. Displaying the second image with simulated lighting improves visual feedback by enabling a user to more easily recognize the subject of the second image (e.g., by emphasizing the contours of the subject's face). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device (e.g., 700) includes an orientation sensor (e.g., accelerometer 168, gyroscope). While displaying the second modified image, the electronic device detects a change in orientation of the electronic device. In response to detecting the change in orientation, the electronic device displays a fourth modified image (e.g., 720, such as shown in FIG. 7J). Displaying the fourth modified image optionally includes displaying, based on the depth information, a ninth level of simulated lighting on the first portion of the subject and a tenth level of simulated lighting on the second portion of the subject, the ninth level and tenth level being based on the change in orientation of the electronic device (e.g., location of simulated light source is moved relative to the subject of the photo based on tilt of the device).

In accordance with some embodiments, after displaying the second modified image, the electronic device (e.g., 700) displays a fifth modified image (e.g., 706, as shown in FIG. 7C). Displaying the fifth modified image optionally includes displaying, based on lighting information determined from the image data (e.g., information representing the original lighting conditions (e.g., amount of light, color of the light, direction(s) of source(s) of light) at the time the image was taken), an eleventh level of simulated lighting on the first portion of the subject and a twelfth level of simulated lighting on the second portion of the subject. The eleventh level corresponds to an original level of lighting of the first portion of the subject and the twelfth level corresponds to an original level of lighting of the second portion of the subject (e.g., simulated lighting aligns with original lighting of the photo.) In some examples, the overall lighting is based on one or more properties of the lighting at the time the photo was taken combined with other user input. In some examples, the top/bottom angle of the simulated light source is determined based on the original lighting of the photo at the time it was taken while the left/right angle of the simulated light source is determined based on user input (e.g., swiping), or vice versa.

In accordance with some embodiments, after displaying the second modified image, the electronic device (e.g., 700) displays a sixth modified image (e.g., 706, as shown in FIG. 7C). Displaying the sixth modified image optionally includes displaying, based on the depth information, a thirteenth level of simulated lighting on the first portion of the subject and a fourteenth level of simulated lighting on the second portion of the subject. The thirteenth level and fourteenth level are optionally based on a respective (e.g., current) time of day (e.g., brightness, color, angle with respect to subject are modified based on the time of day (e.g., less light on subject at night time). In some embodiments, time of day corresponds to current time of the device viewing the photo or current time where the subject of the photo is located. Displaying an image with simulated lighting corresponding to a time of day improves visual feedback by enabling a user to quickly and easily recognize the time of day. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, after displaying the second modified image, the electronic device (e.g., 700) displays a seventh modified image. Displaying the seventh modified image optionally includes displaying, based on the depth information, a fifteenth level of simulated lighting on the first portion of the subject and a sixteenth level of simulated lighting on the second portion of the subject. The fifteenth level and sixteenth level are optionally based on a current weather information (e.g., less light on subject when cloudy). In some embodiments, the weather corresponds to current weather where the electronic device displaying the photo is located, or current weather where the subject of the photo is located. In some embodiments, the overall lighting is based on one or more properties of the lighting at the time the photo was taken (e.g., brightness, color, angle with respect to subject) combined with the current weather information. Displaying an image with simulated lighting corresponding to the current weather improves visual feedback by enabling a user to quickly and easily recognize the current weather. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 800 (e.g., FIG. 8) are also applicable in an analogous manner to the methods described below. For example, method 1000 optionally includes one or more of the characteristics of the various methods described above with reference to method 800. For example, simulated lighting effects can be applied to an image during editing of the image. For brevity, these details are not repeated below.

FIGS. 9A-9K illustrate exemplary user interfaces for editing an image with depth information, in accordance with some embodiments. The user interfaces in these figures are used to illustrate the processes described below, including the processes in FIG. 10.

Figure 9A:
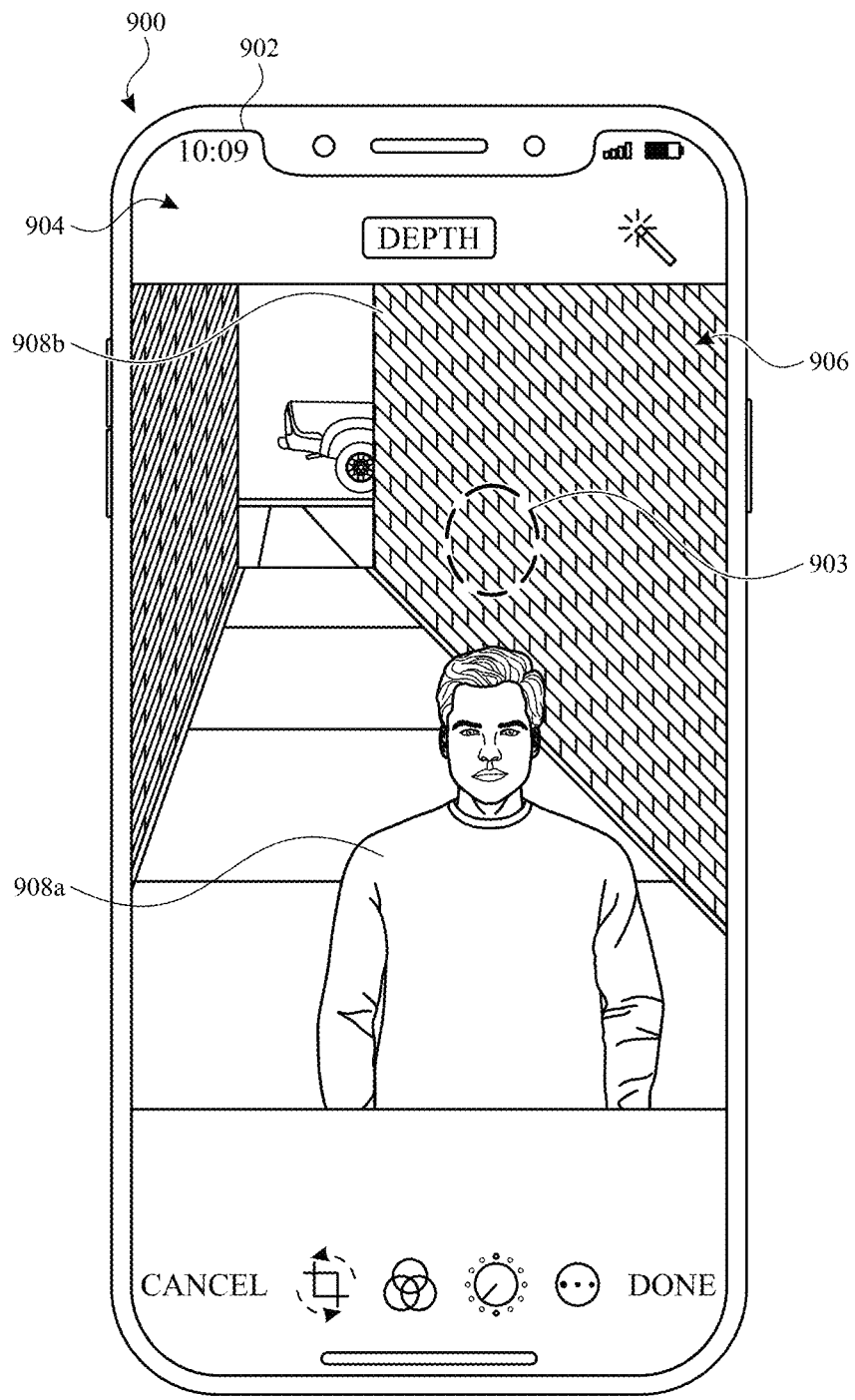
FIGS. 9A-9K illustrate exemplary user interfaces for editing an image with depth information, in accordance with some embodiments.
Figure 10:
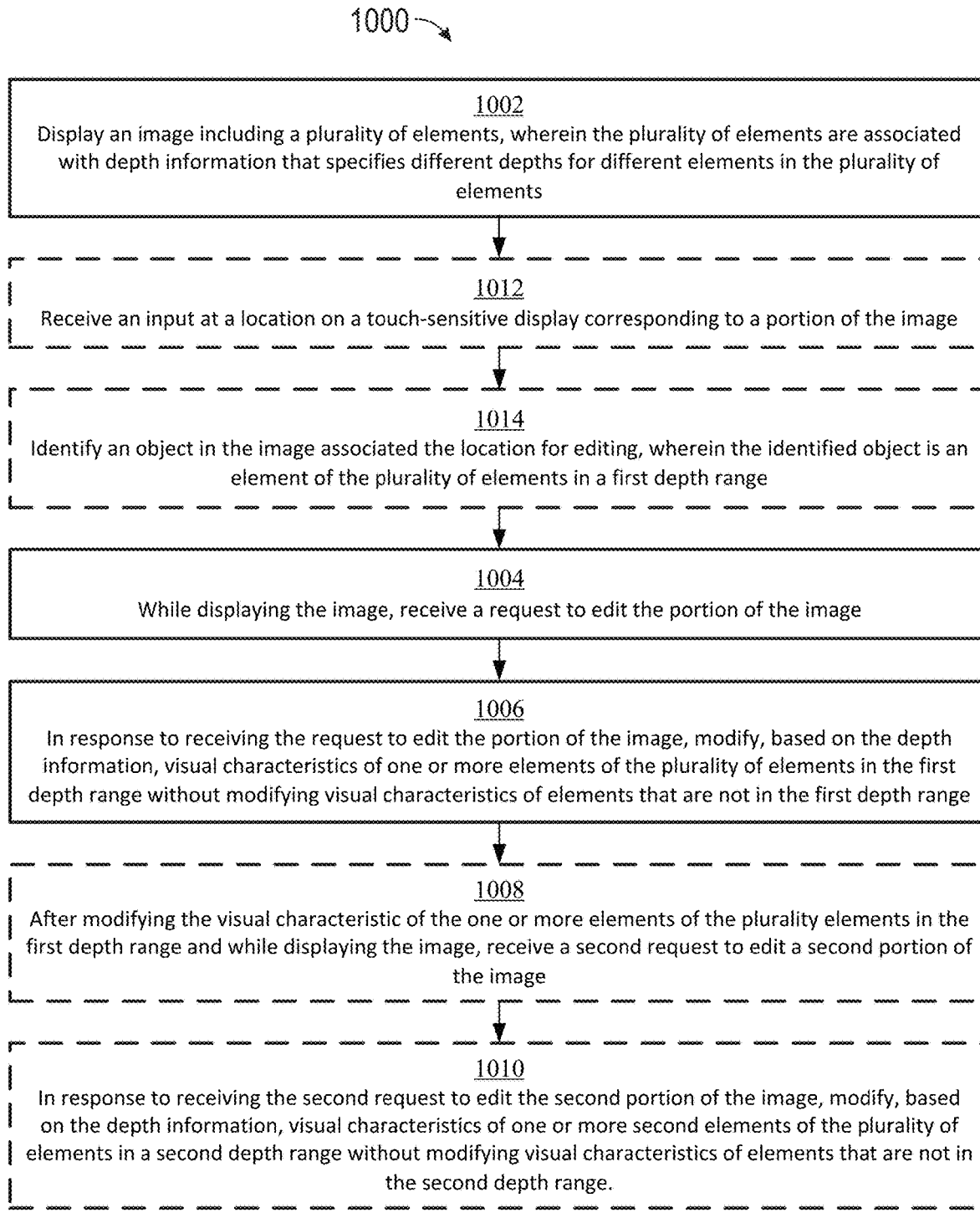
FIG. 10 is a flow diagram illustrating a method for editing an image with depth information using an electronic device in accordance with some embodiments.

FIG. 9A illustrates an electronic device 900 including a display 902 (e.g., integrated with a touch-sensitive surface). In some embodiments, electronic device 700 includes one or more features of device 100, 300, or 500. In some embodiments, electronic device 900 is electronic device 700. Electronic device 900 displays, on display 902, a user interface 904 for editing an image 906. Image 906 includes a foreground element 908a (e.g., a person) and a background element 908b (e.g., a wall). In some embodiments, image 906 includes depth information corresponding to the scene captured in image 906. The depth information is captured with the image data for image 906 using one or more depth camera sensors (e.g., 175). In some embodiments, the depth information is a depth map (e.g., depth map image). A depth map (e.g., depth map image) contains information (e.g., values) that relates to the distance of objects in a scene (e.g., foreground element 908a, background element 908b) from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene (e.g., foreground element 908a, background element 908b) and the plane of the viewpoint. In some embodiments, the depth map includes information about the relative depth of various features of an object of interest in view of the depth camera (e.g., the relative depth of eyes, nose, mouth, ears of a person). In some embodiments, the depth map includes information that enables the device to determine contours of the object of interest in a z direction.

While displaying image 906 in user interface 904, an input 903 (e.g., a finger contact) is detected at a location on image 906 corresponding to background element 908b. Using the depth information associated with image 906, a depth range corresponding to the location of input 903 is determined.

Figure 9B:
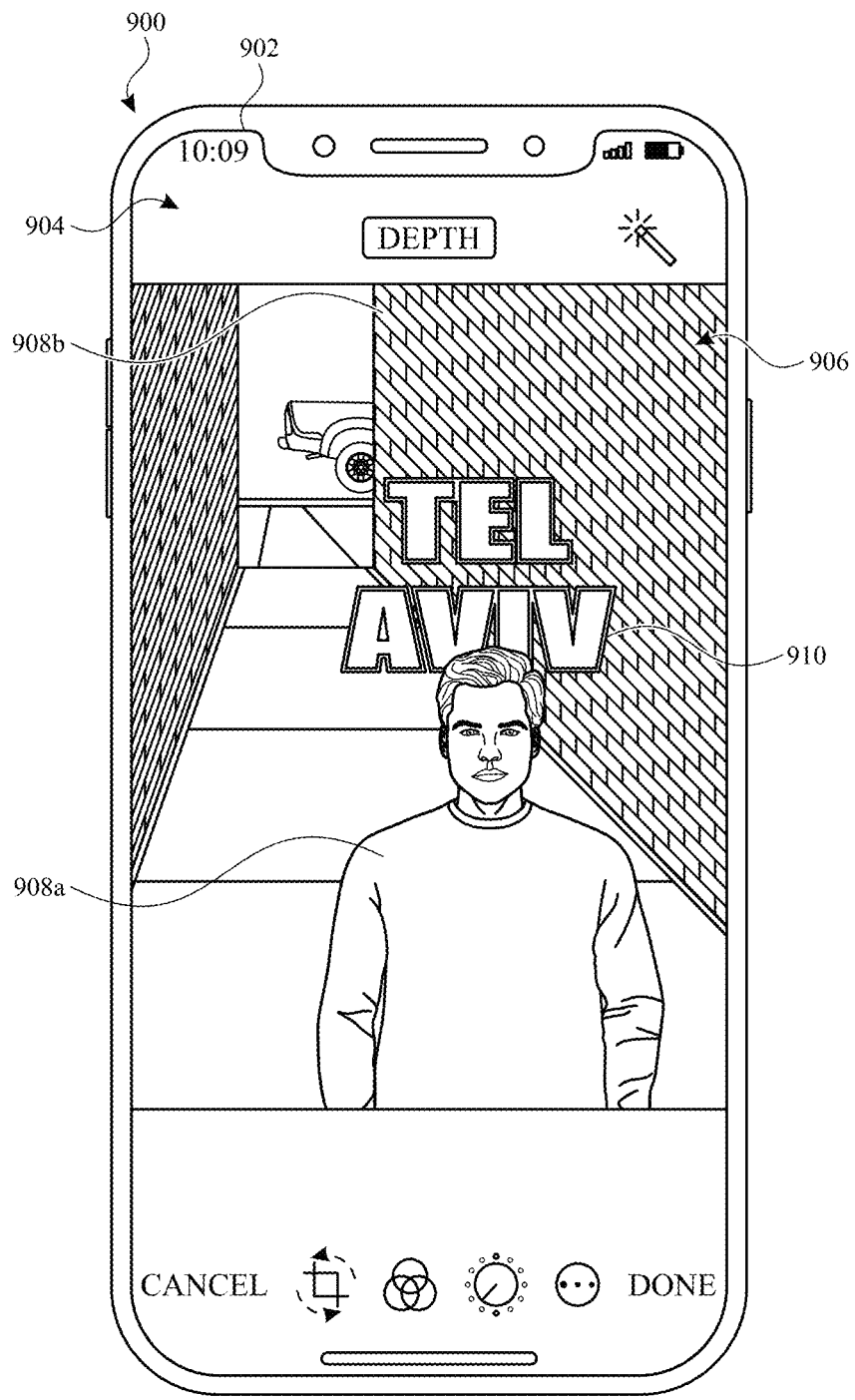

As shown in FIG. 9B, in response to detecting input 903, a graphical object 910 (e.g., text) is inserted into image 906 at a depth corresponding to the depth range of input 903. Elements in image 906 with a shallower depth (e.g., foreground element 908a) than the depth range of input 903 are displayed in front of inserted graphical object 910, while elements in image 906 with a deeper depth (e.g., background element 908b) than the depth range of input 903 are displayed behind inserted graphical object 910. In this way, graphical object 910 appears to be an element present within the captured scene of image 906.

In some embodiments, a simulated depth effect (e.g., a visual effect having a depth component) is applied to the inserted graphical object 910. The simulated depth effect is associated with a focal plane of the depth range of input 903 such that the inserted graphical object 910 appears with a similar focus as other elements in the depth range (e.g., the inserted graphical object 910 is visually modified to have a different degree of blurriness/sharpness, size, degree of brightness, degree of saturation, and/or degree of shape-distortion in order to simulate a depth effect, such as a bokeh effect). In some embodiments, the simulated depth effect is "simulated" in that the effect is generated (e.g., artificially generated) based on a manipulation of the underlying image data for the graphical object 910 to create and apply the effect to the graphical object 910 (e.g., as opposed to being a "natural" effect that is based on underlying data as originally captured via one or more cameras based on the optical properties of light passing through one or more lenses to reach the image sensor of the camera).

In some embodiments, the location of inserted graphical object 910 is modified in response to detecting a change in orientation (e.g., with an accelerometer and/or gyroscope) of the electronic device 900. For example, the location of inserted graphical object 910 can be modified as the orientation of electronic device 900 changes to create a parallax between graphical object 910 and other elements of image 906.

Figure 9C:
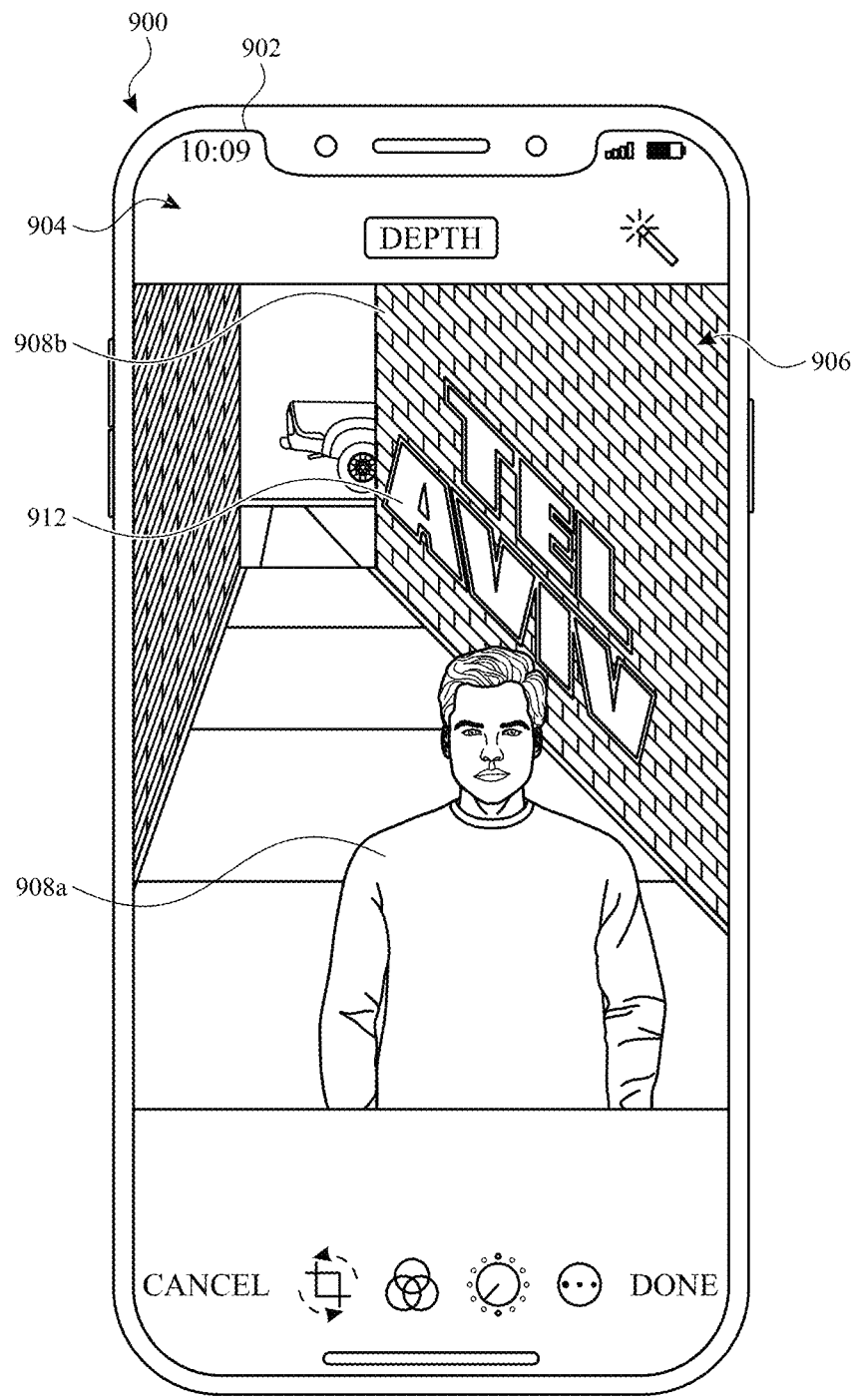

As shown in FIG. 9C, in response to detecting input 903 on background element 908b (as shown in FIG. 9A), a skewed graphical object 912 (e.g., skewed text) is inserted into image 906 to align with the surface of background element 908b.

Figure 9D:
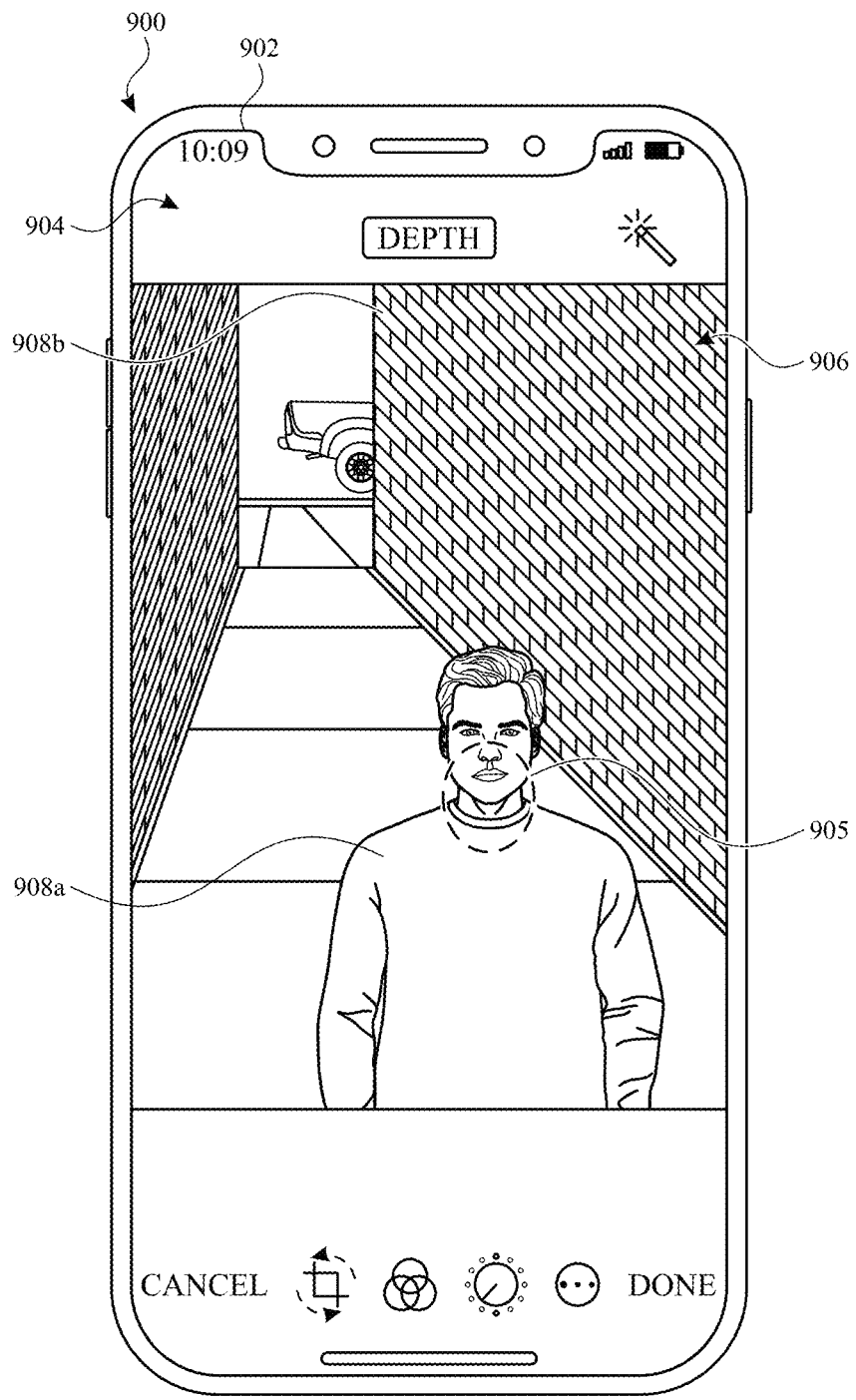

As shown in FIG. 9D, while displaying image 906 in user interface 904, an input 905 (e.g., a finger contact) is detected at a location on image 906 corresponding to foreground element 908a. Using the depth information associated with image 906, a depth range corresponding to the location of input 905 is determined.

Figure 9E:
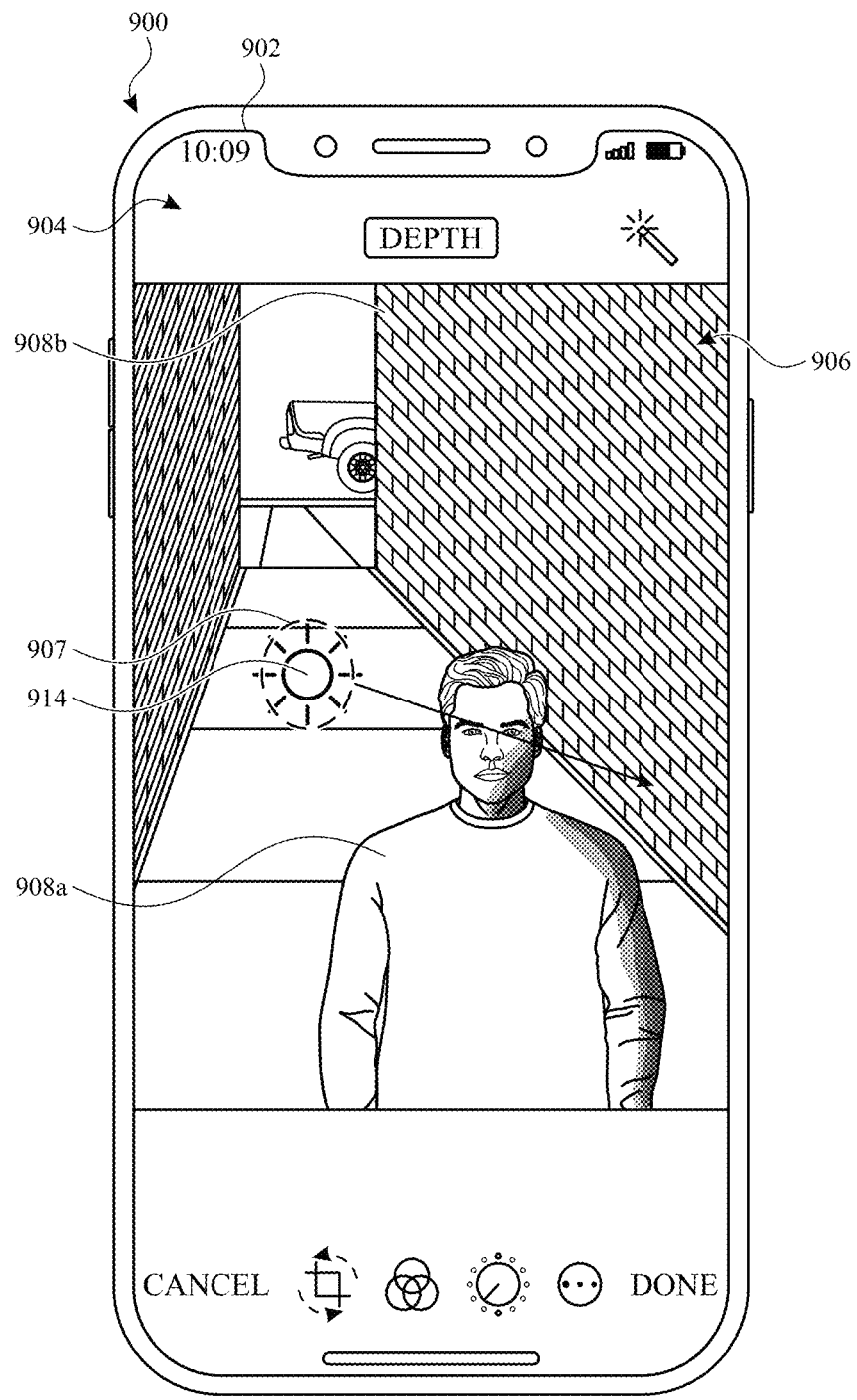

As shown in FIG. 9E, in response to detecting input 905, a simulated light source is inserted into image 906 at a depth corresponding to the depth range of input 905 (e.g., at the depth of foreground element 908a). As a result of inserting the simulated light source, foreground element 908a is displayed with simulated lighting (e.g., the face of the person in image 906 is lit with simulated lighting) (e.g., as described in reference to FIGS. 6A-6D). In some embodiments, different levels of simulated lighting are applied to different portions of foreground element 908a based on depth information associated with foreground element 908a (e.g., a first portion of the face is displayed with a first level of simulated lighting while a second portion of the face is displayed with a second, different level of simulated lighting due to the contours of the face of the person in image 906).

In some embodiments, the simulated light source is initially positioned to substantially recreate the original lighting of image 906 (e.g., the natural lighting that was originally captured in the image data for image 906) (e.g., amount of light, color of the light, direction(s) of source(s) of light).

In some embodiments, the simulated lighting corresponds to a predetermined lighting style (e.g., the simulated lighting source changes location over time in a predefined pattern, multiple simulated lighting sources are positioned at predefined locations, and/or additional filter effects applied to image 906).

A position of the simulated light source is indicated by light icon 914. In some embodiments, the size of light icon 914 further indicates the intensity (e.g., brightness) of the simulated light source. In some embodiments, the horizontal/vertical position (e.g., x/y position) of the simulated light source is changed in response to input 907 moving light icon 914 to a different location. In some embodiments, input 907 is also associated with a characteristic intensity. In some embodiments, an intensity of the simulated light source (e.g., brightness) is changed based on the characteristic intensity of input 907. In some embodiments, a depth of the simulated light source (e.g., z position) is changed based on the characteristic intensity of input 907.

In some embodiments, input 907 is also associated with a duration. In some embodiments, an intensity of the simulated light source (e.g., brightness) is changed based on the duration of input 907.

Figure 9F:
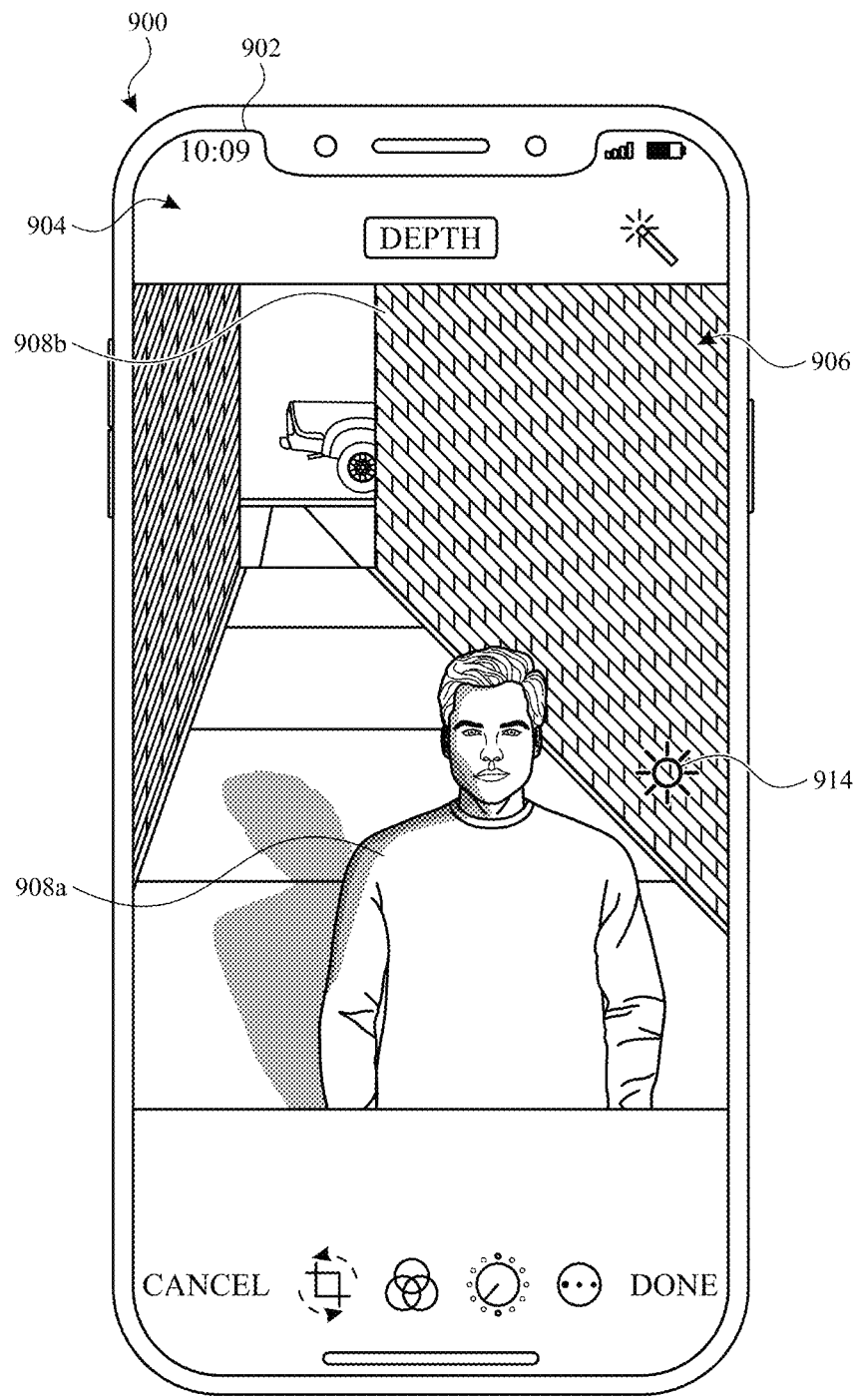

As shown in FIG. 9F, the horizontal/vertical position (e.g., x/y position) of light icon 914 is changed in response to input 907 shown in FIG. 9E. As the position of the simulated light source changes, foreground element 908a is displayed with different simulated lighting corresponding to the changing position of the simulated light source. Furthermore, as shown in FIG. 9F, the intensity of the simulated light source (e.g., brightness) is changed in response to input 907, as indicated be the reduced size of light icon 914. In some embodiments, the intensity of the simulated light source (e.g., brightness) is changed based on a characteristic intensity of input 907 (e.g., a light press results in less brightness, a deep press results in more brightness). In some embodiments, the intensity of the simulated light source (e.g., brightness) is changed based on the duration of input 907 (e.g., short press results in less brightness, long press results in more brightness).

Figure 9G:
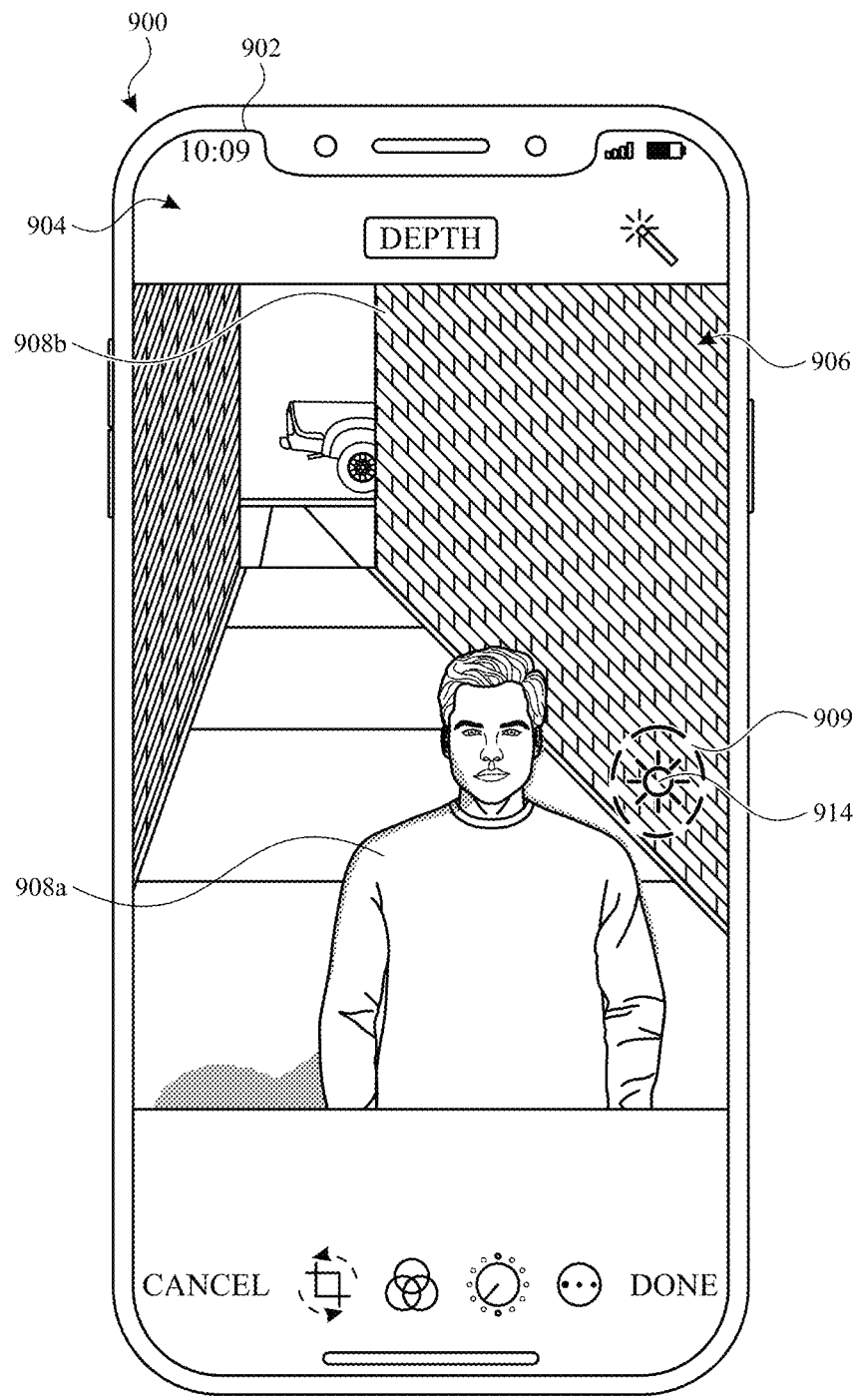

As shown in FIG. 9G, an input 909 is detected on light icon 914. In response to input 909 a depth of the simulated light source (e.g., z position) associated with light icon 914 is changed based on a characteristic intensity of input 909 (e.g., the simulated light source is pushed to a deeper depth range of image 906).

Figure 9H:
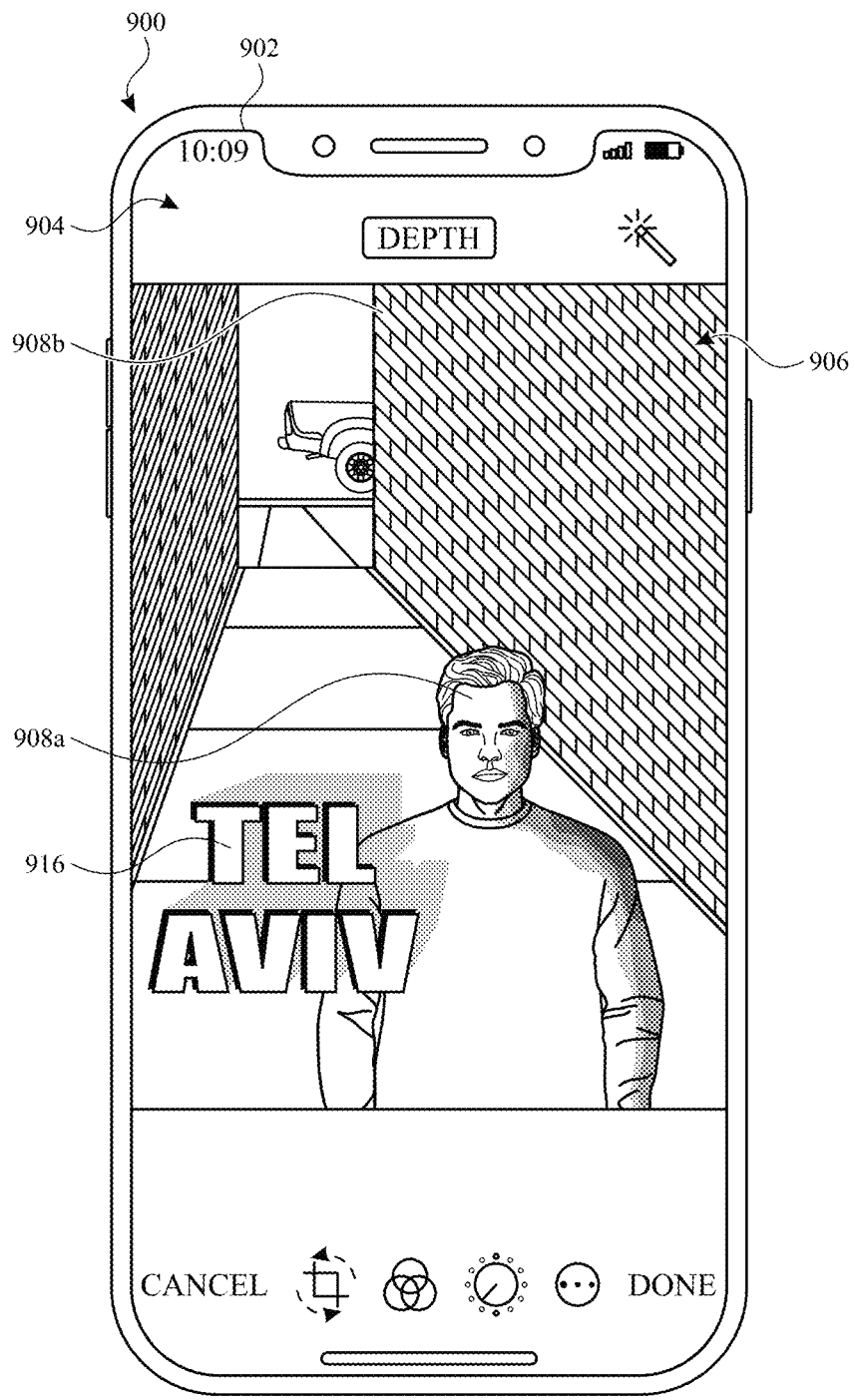

As shown in FIG. 9H, a graphical object 916 (e.g., text) is inserted into image 906 at a depth corresponding to the depth range of input 905 (e.g., at the depth of foreground element 908a). In some embodiments, inserted graphical object 916 is a simulated light source (e.g., light appears to be emitted by graphical object 916). In response to inserting graphical object 916, foreground element 908a is displayed with simulated lighting (e.g., the face of the person in image 906 is lit with simulated lighting) (e.g., as described in reference to FIGS. 6A-6D). In some embodiments, different levels of simulated lighting are applied to different portions of foreground element 908a based on depth information associated with foreground element 908a (e.g., a first portion of the face is displayed with a first level of simulated lighting while a second portion of the face is displayed with a second, different level of simulated lighting due to the contours of the face of the person in image 906).

In some embodiments, simulated lighting is applied to the inserted graphical object 916 (e.g., the lighting of the inserted graphical object is based on position(s) of one or more light source(s) (real or simulated) in image 906 and relative positions of other elements in the image (e.g., other elements cast shadows on the inserted graphical object 916)).

Figure 9I:
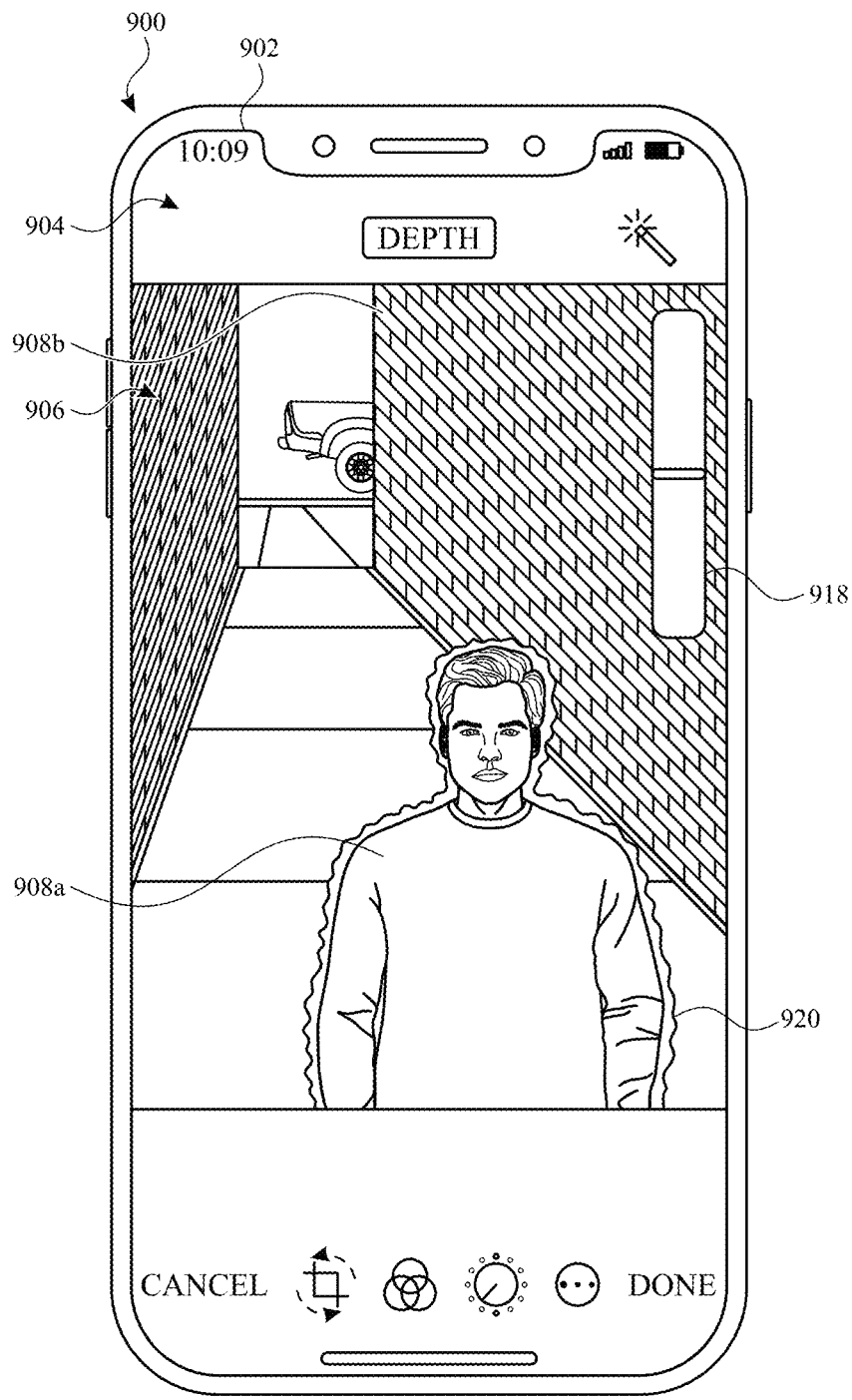

As shown in FIG. 9I, in response to input 905 on foreground element 908a, an option 918 is displayed to modify one or more visual characteristics of foreground element 908a (e.g., brightness, saturation, contrast) without modifying visual characteristics of other elements in image

906. In some embodiments, when one or more visual characteristics of foreground element 908*a* are modified, an indication 920 (e.g., outline, glowing effect) is displayed to indicate foreground element 908*a* has been modified.

Figure 9J:
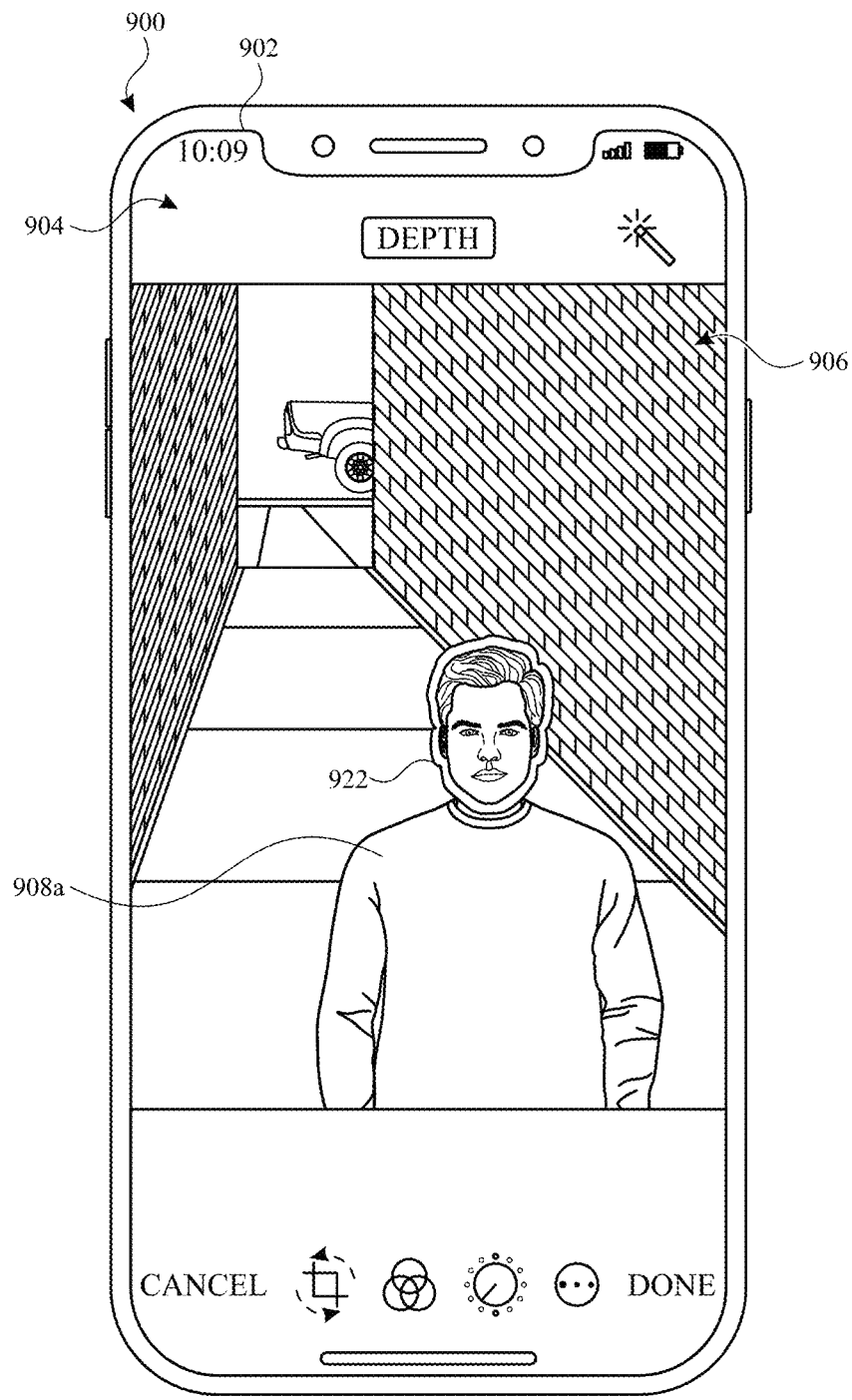

As shown in FIG. 9J, in response to input 905 on foreground element 908*a*, a face 922 of foreground element 908*a* is identified. Face 922 is identified based in part on depth information associated with image 906. After face 922 is identified, face 922 is separated from other elements of image 906. In some embodiments, after face 922 is separated from other elements of image 906, face 922 is used as a graphical object (e.g., a sticker) in other applications of electronic device 900.

Figure 9K:
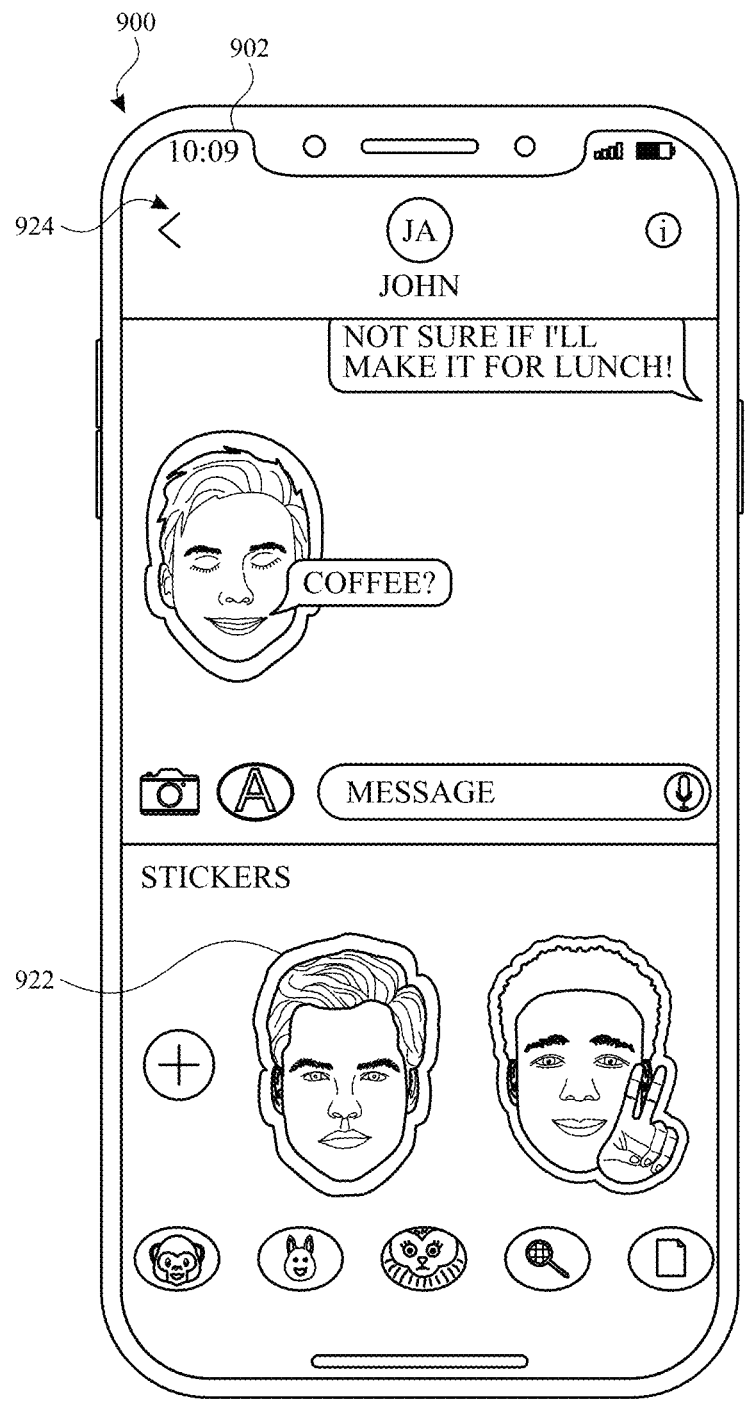

FIG. 9K illustrates electronic device 900 displaying an instant messaging interface 924. Instant messaging interface includes an option for inserting stickers into an instant messaging conversation. As shown in FIG. 9K, face 922 from image 906 (shown in FIG. 9J) is included as a sticker for insertion in the instant messaging conversation.

FIG. 10 is a flow diagram illustrating a method for editing an image with depth information using an electronic device in accordance with some embodiments. Method 1000 is performed at an electronic device (e.g., 100, 300, 500, 700, 900) with a display (e.g., 902). Some operations in method 1000 are, optionally, combined, the orders of some operations are, optionally, changed, and some operations are, optionally, omitted.

As described below, method 1000 provides an intuitive way for editing an image with depth information. The method reduces the cognitive burden on a user for editing the image, thereby creating a more efficient human-machine interface. For battery-operated computing devices, enabling a user to edit an image faster and more efficiently conserves power and increases the time between battery charges.

Electronic device (e.g., 900) displays (1002), on the display (e.g., 902), an image (e.g., 906) (e.g., a photograph or video) including a plurality of elements (e.g., 908*a*, 908*b*). The plurality of elements are associated with depth information that specifies different depths for different elements in the plurality of elements. In some embodiments, the depth information is obtained with a depth sensor used in conjunction with a camera of the electronic device. In some embodiments, the depth information is determined based on image data from multiple cameras using parallax to generate a depth map.

In accordance with some embodiments, the display (e.g., 902) is a touch-sensitive display. Optionally, prior to receiving a request (e.g., 1004) to edit a portion of the image (e.g., 906), the electronic device (e.g., 900) receives (1012) an input at a location on the touch-sensitive display corresponding to the portion of the image. The electronic device identifies (1014) an object in the image (e.g., 908*a*) associated the location for editing. The identified object is an element of the plurality of elements in a first depth range.

In accordance with some embodiments, the electronic device (e.g., 900) isolates the identified object (e.g., 922) from one or more (e.g., all remaining) other elements in the image (e.g., 908*a*, 908*b*). The electronic device displays the isolated object separately from (e.g., as a cut out, in isolation without displaying the one or more other elements) the one or more other of elements in the image. In some examples, the object (e.g., 922) is displayed and edited independently of the rest of the image (e.g., as a sticker in an instant messaging application, such as shown in FIG. 9K).

While displaying the image on the display (e.g., 902), the electronic device (e.g., 900) receives (1004) a request (e.g., 905, 907) to edit a portion of the image. For example, the electronic device receives an input instructing how the image is to be edited (e.g., dragging a slider after selecting a particular person to apply a color filter to that person or increase/decrease saturation of that person).

In response to receiving the request (e.g., 905, 907) to edit the portion of the image, the electronic device (e.g., 900) modifies (1006), based on the depth information, visual characteristics of one or more elements (e.g., a wall, a face, a location in space (e.g., where text is to be inserted)) of the plurality of elements in the first depth range (e.g., a range of distances (e.g., 2-4 feet) from the camera used to the capture the image) without modifying visual characteristics of elements that are not in (e.g., that are outside of) the first depth range. Modifying visual characteristics in a selected depth range without modifying visual characteristics outside the selected depth range allows a user to edit an image more efficiently. Performing an optimized operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the image data for the image (e.g., 906) includes at least two components: an RGB component that encodes the visual characteristics of a captured image, and depth data that encodes information about the relative spacing relationship of elements within the captured image (e.g., the depth data encodes that a user is in the foreground, and background elements, such as a tree positioned behind the user, are in the background). In accordance with some embodiments, the depth data is a depth map. In some embodiments, a depth map (e.g., depth map image) contains information (e.g., values) that relates to the distance of objects in a scene from a viewpoint (e.g., a camera). In some embodiments of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the electronic device to determine contours of the object of interest in a z direction. In some embodiments, the depth data has a second depth component (e.g., a second portion of depth data that encodes a spatial position of the background in the camera display region; a plurality of depth pixels that form a discrete portion of the depth map, such as a background), separate from the first depth component. The second depth aspect includes the representation of the background in the camera display region. In some embodiments, the first depth aspect and second depth aspect are used to determine a spatial relationship between the subject in the camera display region and the background in the camera display region. The electronic device optionally uses this spatial relationship to distinguish the subject from the background. This distinction can be exploited to, for example, apply different visual effects (e.g., visual effects having a depth component) to the subject and background.

In accordance with some embodiments, after modifying the visual characteristic of the one or more elements of the plurality elements in the first depth range and while displaying the image (e.g., 906) on the display (e.g., 902), the electronic device (e.g., 900) receives (1008) a second request (e.g., 905) to edit a second portion (e.g., 908a) of the image (e.g., an input instructing how the image is to be edited). In some examples, the electronic device receives input dragging a slider while a particular person is selected to apply a color filter to that person or increase/decrease saturation of that person.

In accordance with some embodiments, in response to receiving the second request to edit the second portion of the image, the electronic device (e.g., 900) modifies (1010), based on the depth information, visual characteristics of one or more second elements (e.g., a wall, a face, a location in space (e.g., where text is to be inserted)) of the plurality of elements in a second depth range without modifying visual characteristics of elements that are not in (e.g., that are outside of) the second depth range. Modifying visual characteristics in a selected depth range without modifying visual characteristics outside the selected depth range allows a user to edit an image more efficiently. Performing an optimized operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, modifying the visual characteristics of the one or more elements in the first depth range includes modifying one or more of brightness, saturation, or contrast of the one or more elements without modifying the brightness, saturation, or contrast of elements not in the first depth range.

In accordance with some embodiments, after modifying the visual characteristics of the one or more elements, the electronic device (e.g., 900) displays an indication (e.g., 920) associated with the modification (e.g., outline or glowing effect around a modified element).

In accordance with some embodiments, modifying the visual characteristics of the one or more elements in the first depth range includes applying simulated lighting to the one or more elements (e.g., 908a) in the first depth range (e.g., as shown in FIG. 9E). In some embodiments, an initial location of the simulated lighting source aligns with the location of original light source of the image (e.g., information representing the original lighting conditions (e.g., amount of light, color of the light, direction(s) of source(s) of light) at the time the image was taken).

In accordance with some embodiments, the request to edit the portion of the image (e.g., 906) includes a touch input (e.g., 907) on a touch-sensitive surface. The level of simulated lighting applied to the one or more elements is based on one or more characteristics of the touch input (e.g., duration or characteristic intensity of the touch input changes the level of simulated lighting).

In accordance with some embodiments, the display (e.g., 902) is a touch-sensitive display and the request to edit the portion of the image includes a touch input (e.g., 907) on the touch-sensitive display corresponding to a location in the image. The simulated lighting is applied to the one or more elements based on the location of the touch input (e.g., the source of the simulated lighting appears to be at the location). In some embodiments, the source of the simulated lighting is moved to different locations by dragging the touch input to different locations of the display (e.g., as shown in FIG. 9E).

In accordance with some embodiments, the display (e.g., 902) is a touch-sensitive display and the request to edit the portion of the image includes a touch input (e.g., 909) on the touch-sensitive display with a characteristic intensity (e.g., the electronic device detects a touch input and the touch input has a characteristic intensity). The simulated lighting is applied to the one or more elements based on the characteristic intensity of the touch input. In some embodiments, the source of the simulated lighting appears to at a depth associated with the characteristic intensity of the touch input. In some embodiments, the source of the simulated lighting is moved to forward or backward in depth by changing the intensity of the touch input. In some embodiments, the amount of movement of the simulated light is determined based on the magnitude of the intensity of the touch input and/or the duration for which the intensity of the touch input is maintained at a particular level of intensity (e.g., the simulated light moves back farther as the intensity increases and/or as the intensity is maintained over a threshold intensity for a period of time and/or the simulated light moves forward as the intensity decreases and/or as the intensity is maintained below the threshold intensity for a period of time).

In accordance with some embodiments, the electronic device (e.g., 900) displays an indication (e.g., 914) (e.g., light or sun icon) of a one or more characteristics (e.g., location, intensity) of a simulated source of the simulated lighting. In some embodiments, the indication (e.g., 914) also indicates the brightness level of the simulated lighting (e.g., with the size of the icon, brightness of the icon, or additional visual elements). Displaying an indication of a simulated light source improves visual feedback by enabling a user to quickly and easily recognize location and brightness of the simulated light source. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the simulated lighting corresponds to a predetermined lighting style (e.g., the simulated light source(s) for the simulated lighting changes location over time in a predefined pattern, the simulated light source(s) includes multiple simulated light sources at predefined locations, and/or additional filter effects are applied to the image).

In accordance with some embodiments, modifying the visual characteristics of the one or more elements in the first depth range includes inserting a graphical object (e.g., 910, 912, 916) (e.g., text) into the image at the first depth range. In some embodiments, the graphical object is displayed in front of elements at deeper depth and behind elements at shallower depths. In some embodiments, such as with video, the inserted graphical object optionally appears to remain stationary as the camera moves (e.g., inserted text appears to be fixed to a location in the image). Inserting a graphical object in a selected depth range allows a user to edit an image more efficiently. Performing an optimized operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the inserted graphical object (e.g., 910, 912) is obstructed by at least one element (e.g., 908a) not in the first depth range (e.g., the inserted graphical object appears behind an element at a shallower depth). In some embodiments, a second graphical object is inserted to appear in front of the element obstructing the other graphical object. For example, text is optionally inserted to appear behind and in front of a person in the image.

In accordance with some embodiments, simulated lighting is applied (e.g., by the electronic device 900) to the inserted graphical object (e.g., 910, 912, 916). In some examples, the lighting of the inserted graphical object is based on location(s) of light source(s) (real or simulated) in the image and relative positions of other elements in the image (e.g., other elements cast shadows on the inserted graphical object).

In accordance with some embodiments, simulated lighting applied to one or more elements in the image (e.g., 906) is affected by the inserted graphical object (e.g., 916) in the image. In some embodiments, the lighting of other elements in the image is modified based on light or shadows cast by the inserted graphical object. In some embodiments, the inserted graphical object is a source for simulated lighting (e.g., as shown in FIG. 9H).

In accordance with some embodiments, a simulated depth effect (e.g., a visual effect having a depth component) is applied (e.g., by electronic device 900) to the inserted graphical object. The simulated depth effect is associated with a focal plane of the first depth range such that the inserted graphical object (e.g., 910, 912, 916) appears with a similar focus as other elements in the first depth range (e.g., the inserted graphical object is visually modified to have a different degree of blurriness/sharpness, size, degree of brightness, degree of saturation, and/or degree of shape-distortion in order to simulate a depth effect, such as a bokeh effect). In some embodiments, the simulated depth effect is "simulated" in that the effect is generated (e.g., artificially generated) based on a manipulation of the underlying image data for the graphical object to create and apply the effect to the graphical object (e.g., as opposed to being a "natural" effect that is based on underlying data as originally captured via one or more cameras based on the optical properties of light passing through one or more lenses to reach the image sensor of the camera).

In accordance with some embodiments, the electronic device (e.g., 900) identifies an object (e.g., 908b) (e.g., a wall) in the image at the first depth range. The graphical object (e.g., 912) is inserted to align with a surface of the object in the image (e.g., inserted text is angled to appear on the surface of the wall).

In accordance with some embodiments, the electronic device (e.g., 900) includes an orientation sensor (e.g., accelerometer 168, gyroscope). The electronic device detects a change in orientation of the electronic device. The electronic device modifies a location of the inserted graphical object (e.g., 910, 916) relative to the other elements of the image based on the change in orientation (e.g., a parallax effect occurs when changing the viewing angle of the device).

Note that details of the processes described above with respect to method 1000 (e.g., FIG. 10) are also applicable in an analogous manner to the methods described above. For example, method 800 optionally includes one or more of the characteristics of the various methods described above with reference to method 1000. For example, after an image is displayed with simulated lighting effects, the image can be edited. For brevity, these details are not repeated above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to display and edit images. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to recognize a person or subject within a displayed image. Accordingly, use of such personal information data enables users to more easily recognize the person or subject in the image. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of recognition of a person or subject within an image, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, images can be displayed or edited based on non-personal information data or a bare minimum amount of personal information, such as the content being requested by the device associated with a user, other non-personal information available to the device, or publicly available information.

What is claimed is:

1. An electronic device, comprising:
   a display;
   one or more processors; and
   memory storing one or more programs configured to be executed by the one or more processors, the one or more programs including instructions for:
   displaying, on the display, an image including a plurality of elements, wherein the plurality of elements are associated with depth information that specifies different depths for different elements in the plurality of elements;
   while displaying the image on the display, receiving a request to edit a portion of the image;
   in response to receiving the request to edit the portion of the image, modifying, based on the depth information, visual characteristics of one or more elements of the plurality of elements in a first depth range without modifying visual characteristics of elements that are not in the first depth range;
   after modifying the visual characteristic of the one or more elements of the plurality elements in the first depth range and while displaying the image on the display, receiving a second request to edit a second portion of the image; and
   in response to receiving the second request to edit the second portion of the image, modifying, based on the depth information, visual characteristics of one or more second elements of the plurality of elements in a second depth range without modifying visual characteristics of elements that are not in the second depth range.

2. An electronic device, comprising:
   a touch-sensitive display;
   one or more processors; and
   memory storing one or more programs configured to be executed by the one or more processors, the one or more programs including instructions for:
   displaying, on the touch-sensitive display, an image including a plurality of elements, wherein the plurality of elements are associated with depth information that specifies different depths for different elements in the plurality of elements;
   while displaying the image on the touch-sensitive display, receiving an input at a location on the touch-sensitive display corresponding to a portion of the image;
   identifying an object in the image associated with the location for editing, wherein the identified object includes one or more elements of the plurality of elements in a first depth range;
   isolating the identified object from one or more other elements in the image;
   displaying the isolated object separately from the one or more other of elements in the image;
   receiving a request to edit a portion of the isolated object; and
   in response to receiving the request to edit the portion of the isolated object, modifying, based on the depth information, visual characteristics of the one or more elements of the plurality of elements in the first depth range without modifying visual characteristics of elements that are not in the first depth range.

3. The electronic device of claim 1, wherein modifying the visual characteristics of the one or more elements in a first depth range includes modifying one or more of brightness, saturation, or contrast of the one or more elements without modifying the brightness, saturation, or contrast of elements not in the first depth range.

4. The electronic device of claim 1, wherein the one or more programs further include instructions for:
   after modifying the visual characteristics of the one or more elements, displaying an indication associated with the modification.

5. An electronic device, comprising:
a display;
one or more processors; and
memory storing one or more programs configured to be executed by the one or more processors, the one or more programs including instructions for:
  displaying, on the display, an image including a plurality of elements, wherein the plurality of elements are associated with depth information that specifies different depths for different elements in the plurality of elements;
  while displaying the image on the display, receiving a request to edit a portion of the image; and
  in response to receiving the request to edit the portion of the image, modifying, based on the depth information, visual characteristics of one or more elements of the plurality of elements in a first depth range without modifying visual characteristics of elements that are not in the first depth range, wherein modifying the visual characteristics of the one or more elements in the first depth range includes applying simulated lighting to the one or more elements in the first depth range.

6. The electronic device of claim 5, wherein the request to edit the portion of the image includes a touch input on a touch-sensitive surface, and wherein the level of simulated lighting applied to the one or more elements is based on one or more characteristics of the touch input.

7. The electronic device of claim 5, wherein the display is a touch-sensitive display, wherein the request to edit the portion of the image includes a touch input on the touch-sensitive display corresponding to a location in the image, and wherein the simulated lighting is applied to the one or more elements based on the location of the touch input.

8. The electronic device of claim 5, wherein the display is a touch-sensitive display, wherein the request to edit the portion of the image includes a touch input on the touch-sensitive display with a characteristic intensity, and wherein the simulated lighting is applied to the one or more elements based on the characteristic intensity of the touch input.

9. The electronic device of claim 5, wherein the one or more programs further include instructions for:
  displaying an indication of a one or more characteristics of a simulated source of the simulated lighting.

10. The electronic device of claim 5, wherein the simulated lighting corresponds to a predetermined lighting style.

11. An electronic device, comprising:
a display;
one or more processors; and
memory storing one or more programs configured to be executed by the one or more processors, the one or more programs including instructions for:
  displaying, on the display, an image including a plurality of elements, wherein the plurality of elements are associated with depth information that specifies different depths for different elements in the plurality of elements;
  while displaying the image on the display, receiving a request to edit a portion of the image; and
  in response to receiving the request to edit the portion of the image, modifying, based on the depth information, visual characteristics of one or more elements of the plurality of elements in a first depth range without modifying visual characteristics of elements that are not in the first depth range, wherein modifying the visual characteristics of the one or more elements in the first depth range includes inserting a graphical object into the image at the first depth range.

12. The electronic device of claim 11, wherein the inserted graphical object is obstructed by at least one element not in the first depth range.

13. The electronic device of claim 11, wherein simulated lighting is applied to the inserted graphical object.

14. The electronic device of claim 11, wherein simulated lighting applied to one or more elements in the image is affected by the inserted graphical object in the image.

15. The electronic device of claim 11, wherein a simulated depth effect is applied to the inserted graphical object, the simulated depth effect being associated with a focal plane of the first depth range.

16. The electronic device of claim 11, wherein the one or more programs further include instructions for:
  identifying an object in the image at the first depth range, wherein the graphical object is inserted to align with a surface of the object in the image.

17. The electronic device of claim 11, wherein the electronic device includes an orientation sensor, and wherein the one or more programs further include instructions for:
  detecting a change in orientation of the electronic device; and
  modifying a location of the inserted graphical object relative to the other elements of the image based on the change in orientation.

18. A non-transitory computer-readable storage medium storing one or more programs configured to be executed by one or more processors of an electronic device with a display, the one or more programs including instructions for:
  displaying, on the display, an image including a plurality of elements, wherein the plurality of elements are associated with depth information that specifies different depths for different elements in the plurality of elements;
  while displaying the image on the display, receiving a request to edit a portion of the image;
  in response to receiving the request to edit the portion of the image, modifying, based on the depth information, visual characteristics of one or more elements of the plurality of elements in a first depth range without modifying visual characteristics of elements that are not in the first depth range;
  after modifying the visual characteristic of the one or more elements of the plurality elements in the first depth range and while displaying the image on the display, receiving a second request to edit a second portion of the image; and
  in response to receiving the second request to edit the second portion of the image, modifying, based on the depth information, visual characteristics of one or more second elements of the plurality of elements in a second depth range without modifying visual characteristics of elements that are not in the second depth range.

19. The non-transitory computer-readable storage medium of claim 18, wherein modifying the visual characteristics of the one or more elements in a first depth range includes modifying one or more of brightness, saturation, or contrast of the one or more elements without modifying the brightness, saturation, or contrast of elements not in the first depth range.

20. The non-transitory computer-readable storage medium of claim 18, wherein the one or more programs further include instructions for:

after modifying the visual characteristics of the one or more elements, displaying an indication associated with the modification.

21. A method comprising:
at an electronic device with a display:
displaying, on the display, an image including a plurality of elements, wherein the plurality of elements are associated with depth information that specifies different depths for different elements in the plurality of elements;
while displaying the image on the display, receiving a request to edit a portion of the image;
in response to receiving the request to edit the portion of the image, modifying, based on the depth information, visual characteristics of one or more elements of the plurality of elements in a first depth range without modifying visual characteristics of elements that are not in the first depth range;
after modifying the visual characteristic of the one or more elements of the plurality elements in the first depth range and while displaying the image on the display, receiving a second request to edit a second portion of the image; and
in response to receiving the second request to edit the second portion of the image, modifying, based on the depth information, visual characteristics of one or more second elements of the plurality of elements in a second depth range without modifying visual characteristics of elements that are not in the second depth range.

22. The method of claim 21, wherein modifying the visual characteristics of the one or more elements in a first depth range includes modifying one or more of brightness, saturation, or contrast of the one or more elements without modifying the brightness, saturation, or contrast of elements not in the first depth range.

23. The method of claim 21, further comprising:
after modifying the visual characteristics of the one or more elements, displaying an indication associated with the modification.

24. A non-transitory computer-readable storage medium storing one or more programs configured to be executed by one or more processors of an electronic device with a touch-sensitive display, the one or more programs including instructions for:
displaying, on the touch-sensitive display, an image including a plurality of elements, wherein the plurality of elements are associated with depth information that specifies different depths for different elements in the plurality of elements;
while displaying the image on the touch-sensitive display, receiving an input at a location on the touch-sensitive display corresponding to a portion of the image;
identifying an object in the image associated with the location for editing, wherein the identified object includes one or more elements of the plurality of elements in a first depth range;
isolating the identified object from one or more other elements in the image;
displaying the isolated object separately from the one or more other of elements in the image;
receiving a request to edit a portion of the isolated object; and
in response to receiving the request to edit the portion of the isolated object, modifying, based on the depth information, visual characteristics of the one or more elements of the plurality of elements in the first depth range without modifying visual characteristics of elements that are not in the first depth range.

25. A non-transitory computer-readable storage medium storing one or more programs configured to be executed by one or more processors of an electronic device with a display, the one or more programs including instructions for:
displaying, on the display, an image including a plurality of elements, wherein the plurality of elements are associated with depth information that specifies different depths for different elements in the plurality of elements;
while displaying the image on the display, receiving a request to edit a portion of the image; and
in response to receiving the request to edit the portion of the image, modifying, based on the depth information, visual characteristics of one or more elements of the plurality of elements in a first depth range without modifying visual characteristics of elements that are not in the first depth range, wherein modifying the visual characteristics of the one or more elements in the first depth range includes applying simulated lighting to the one or more elements in the first depth range.

26. The non-transitory computer-readable storage medium of claim 25, wherein the request to edit the portion of the image includes a touch input on a touch-sensitive surface, and wherein the level of simulated lighting applied to the one or more elements is based on one or more characteristics of the touch input.

27. The non-transitory computer-readable storage medium of claim 25, wherein the display is a touch-sensitive display, wherein the request to edit the portion of the image includes a touch input on the touch-sensitive display corresponding to a location in the image, and wherein the simulated lighting is applied to the one or more elements based on the location of the touch input.

28. The non-transitory computer-readable storage medium of claim 25, wherein the display is a touch-sensitive display, wherein the request to edit the portion of the image includes a touch input on the touch-sensitive display with a characteristic intensity, and wherein the simulated lighting is applied to the one or more elements based on the characteristic intensity of the touch input.

29. The non-transitory computer-readable storage medium of claim 25, wherein the one or more programs further include instructions for:
displaying an indication of a one or more characteristics of a simulated source of the simulated lighting.

30. The non-transitory computer-readable storage medium of claim 25, wherein the simulated lighting corresponds to a predetermined lighting style.

31. A non-transitory computer-readable storage medium storing one or more programs configured to be executed by one or more processors of an electronic device with a display, the one or more programs including instructions for:
displaying, on the display, an image including a plurality of elements, wherein the plurality of elements are associated with depth information that specifies different depths for different elements in the plurality of elements;
while displaying the image on the display, receiving a request to edit a portion of the image; and
in response to receiving the request to edit the portion of the image, modifying, based on the depth information, visual characteristics of one or more elements of the plurality of elements in a first depth range without modifying visual characteristics of elements that are not in the first depth range, wherein modifying the visual characteristics of the one or more elements in the first depth range includes inserting a graphical object into the image at the first depth range.

32. The non-transitory computer-readable storage medium of claim 31, wherein the inserted graphical object is obstructed by at least one element not in the first depth range.

33. The non-transitory computer-readable storage medium of claim 31, wherein simulated lighting is applied to the inserted graphical object.

34. The non-transitory computer-readable storage medium of claim 31, wherein simulated lighting applied to one or more elements in the image is affected by the inserted graphical object in the image.

35. The non-transitory computer-readable storage medium of claim 31, wherein a simulated depth effect is applied to the inserted graphical object, the simulated depth effect being associated with a focal plane of the first depth range.

36. The non-transitory computer-readable storage medium of claim 31, wherein the one or more programs further include instructions for:
identifying an object in the image at the first depth range, wherein the graphical object is inserted to align with a surface of the object in the image.

37. The non-transitory computer-readable storage medium of claim 31, wherein the electronic device includes an orientation sensor, and wherein the one or more programs further include instructions for:
detecting a change in orientation of the electronic device; and
modifying a location of the inserted graphical object relative to the other elements of the image based on the change in orientation.

38. A method comprising:
at an electronic device with a touch-sensitive display:
displaying, on the touch-sensitive display, an image including a plurality of elements, wherein the plurality of elements are associated with depth information that specifies different depths for different elements in the plurality of elements;
while displaying the image on the touch-sensitive display, receiving an input at a location on the touch-sensitive display corresponding to a portion of the image;
identifying an object in the image associated with the location for editing, wherein the identified object includes one or more elements of the plurality of elements in a first depth range;
isolating the identified object from one or more other elements in the image;
displaying the isolated object separately from the one or more other of elements in the image;
receiving a request to edit a portion of the isolated object; and
in response to receiving the request to edit the portion of the isolated object, modifying, based on the depth information, visual characteristics of the one or more elements of the plurality of elements in the first depth range without modifying visual characteristics of elements that are not in the first depth range.

39. A method comprising:
at an electronic device with a display:
displaying, on the display, an image including a plurality of elements, wherein the plurality of elements are associated with depth information that specifies different depths for different elements in the plurality of elements;
while displaying the image on the display, receiving a request to edit a portion of the image; and
in response to receiving the request to edit the portion of the image, modifying, based on the depth information, visual characteristics of one or more elements of the plurality of elements in a first depth range without modifying visual characteristics of elements that are not in the first depth range, wherein modifying the visual characteristics of the one or more elements in the first depth range includes applying simulated lighting to the one or more elements in the first depth range.

40. The method of claim 39, wherein the request to edit the portion of the image includes a touch input on a touch-sensitive surface, and wherein the level of simulated lighting applied to the one or more elements is based on one or more characteristics of the touch input.

41. The method of claim 39, wherein the display is a touch-sensitive display, wherein the request to edit the portion of the image includes a touch input on the touch-sensitive display corresponding to a location in the image, and wherein the simulated lighting is applied to the one or more elements based on the location of the touch input.

42. The method of claim 39, wherein the display is a touch-sensitive display, wherein the request to edit the portion of the image includes a touch input on the touch-sensitive display with a characteristic intensity, and wherein the simulated lighting is applied to the one or more elements based on the characteristic intensity of the touch input.

43. The method of claim 39, further comprising:
displaying an indication of a one or more characteristics of a simulated source of the simulated lighting.

44. The method of claim 39, wherein the simulated lighting corresponds to a predetermined lighting style.

45. A method comprising:
at an electronic device with a display:
displaying, on the display, an image including a plurality of elements, wherein the plurality of elements are associated with depth information that specifies different depths for different elements in the plurality of elements;
while displaying the image on the display, receiving a request to edit a portion of the image; and
in response to receiving the request to edit the portion of the image, modifying, based on the depth information, visual characteristics of one or more elements of the plurality of elements in a first depth range without modifying visual characteristics of elements that are not in the first depth range, wherein modifying the visual characteristics of the one or more elements in the first depth range includes inserting a graphical object into the image at the first depth range.

46. The method of claim 45, wherein the inserted graphical object is obstructed by at least one element not in the first depth range.

47. The method of claim 45, wherein simulated lighting is applied to the inserted graphical object.

48. The method of claim 45, wherein simulated lighting applied to one or more elements in the image is affected by the inserted graphical object in the image.

49. The method of claim 45, wherein a simulated depth effect is applied to the inserted graphical object, the simulated depth effect being associated with a focal plane of the first depth range.

50. The method of claim 45, further comprising:
- identifying an object in the image at the first depth range, wherein the graphical object is inserted to align with a surface of the object in the image.

51. The method of claim 45, wherein the electronic device includes an orientation sensor, and wherein the method further comprises:
- detecting a change in orientation of the electronic device; and
- modifying a location of the inserted graphical object relative to the other elements of the image based on the change in orientation.

* * * * *

UNITED STATES PATENT AND TRADEMARK OFFICE
CERTIFICATE OF CORRECTION

PATENT NO.         : 11,321,857 B2
APPLICATION NO.    : 16/528257
DATED              : May 3, 2022
INVENTOR(S)        : Matan Stauber et al.

Page 1 of 1

It is certified that error appears in the above-identified patent and that said Letters Patent is hereby corrected as shown below:

In the Claims

In Column 52, Line 15, Claim 1, after "plurality" insert -- of --.

In Column 54, Line 48, Claim 18, after "plurality" insert -- of --.

In Column 55, Line 20, Claim 21, after "plurality" insert -- of --.

Signed and Sealed this
Twenty-fourth Day of January, 2023

Katherine Kelly Vidal
*Director of the United States Patent and Trademark Office*